(12) United States Patent
Yamauchi et al.

(10) Patent No.: US 7,935,920 B2
(45) Date of Patent: May 3, 2011

(54) ILLUMINATION OPTICAL SYSTEM INCLUDING LUMINOUS FLUX CONVERSION SYSTEM

(75) Inventors: Yu Yamauchi, Utsunomiya (JP);
Atsushi Okuyama, Tokorozawa (JP);
Hiroyuki Kodama, Utsunomiya (JP);
Takashi Sudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 656 days.

(21) Appl. No.: 11/760,128

(22) Filed: Jun. 8, 2007

(65) Prior Publication Data

US 2007/0291344 A1    Dec. 20, 2007

(30) Foreign Application Priority Data

Jun. 8, 2006  (JP) ................. 2006-160000
May 1, 2007  (JP) ................. 2007-120515
Jun. 6, 2007  (JP) ................. 2007-150814

(51) Int. Cl.
*H01J 3/14* (2006.01)
(52) U.S. Cl. ..................... 250/216; 250/208.1
(58) Field of Classification Search ............. 250/208.1, 250/216; 349/5–9; 353/74–77, 85–87, 101, 353/20, 38, 97; 359/40–62, 855–891; 362/257–311, 362/317–361
See application file for complete search history.

(56) References Cited

U.S. PATENT DOCUMENTS

| | | | | |
|---|---|---|---|---|
| 6,527,393 | B1 * | 3/2003 | Ogawa | 353/38 |
| 7,588,337 | B2 * | 9/2009 | Koide | 353/38 |
| 2002/0018184 | A1 | 2/2002 | Ito | |

FOREIGN PATENT DOCUMENTS

| | | |
|---|---|---|
| CN | 1307244 A | 8/2001 |
| EP | 0 395 156 | 10/1990 |
| EP | 1 122 580 | 8/2001 |
| EP | 1 648 177 | 4/2006 |
| EP | 1 772 766 | 4/2007 |
| JP | 07-181392 | 7/1995 |
| JP | 2001-305485 | 10/2001 |
| JP | 2004-206146 | 7/2004 |
| JP | 2006-133641 | 5/2006 |
| JP | 2006-184676 | 7/2006 |
| JP | 2007-065016 | 3/2007 |

OTHER PUBLICATIONS

Chinese Patent Office Notification of First Office Action concerning Appln 200710110222.9 dated Jul. 25, 2008 and partial translation.
European Patent Office Communication including European Search Report dated Oct. 30, 2007.

* cited by examiner

*Primary Examiner* — Que T Le
(74) *Attorney, Agent, or Firm* — Rossi, Kimms & McDowell LLP

(57) ABSTRACT

An optical system for image projection is disclosed which is easy to be manufactured and designed and capable of projecting a bright image with high contrast. The optical system includes an illumination optical system introducing a luminous flux emitted from a light source to an image-forming element through an optical surface having a light-splitting function, and a projection optical system projecting the luminous flux from the image-forming element through the optical surface onto a projection surface. The illumination optical system includes a conversion system which respectively converts the widths of the luminous flux in first and second cross-sections into widths different from those before entering thereinto. Conversion rates in the first and second cross-sections are different from each other.

4 Claims, 38 Drawing Sheets

ILLUMINATION OPTICAL SYSTEM INCLUDING LUMINOUS FLUX CONVERSION SYSTEM

BACKGROUND OF THE INVENTION

The present invention relates to an optical system used for an image projection apparatus using an image-forming element such as a liquid crystal panel.

In such an image projection apparatus, it is important that the apparatus is capable of projecting a bright image with a high contrast and a substantially even brightness over the entire image.

An illumination optical system for an image projection apparatus (a projector) using a reflective image-forming element such as a reflective liquid crystal panel generates a substantially parallel luminous flux by reflecting a luminous flux from a light source by a parabolic reflector. This parallel luminous flux is divided and collected by a first fly-eye lens, and each of the divided luminous fluxes forms an image of the light source (a secondary light source image) at the vicinity of a second fly-eye lens. Each of minute lenses (lens cells) constituting the fly-eye lens has a rectangular shape similar to the image-forming element that is an illuminated surface.

The divided luminous fluxes emerging from the second fly-eye lens are condensed by a condenser lens to be superposed with each other and illuminate the image-forming element through a color separation/combination optical system. The color separation/combination optical system uses an optical element having a dichroic film or a polarization beam splitting film (a dichroic prism or a polarization beam splitter).

In such an image projection apparatus, increasing use efficiency of light from the light source generally makes an angular distribution of a luminous flux large. Thus, when using an optical element with a sensitive angular characteristic, that is, an optical element having a dichroic film or a polarization beam splitting film that is inclined with respect to an optical axis in the color separation/combination optical system, deterioration of image quality is caused such as unevenness of brightness (unevenness of color) or reduction of contrast.

FIGS. 20 and 21 show examples of angular dependent characteristics (transmittance characteristic and reflectance characteristic) of a polarization beam splitting film, respectively. The characteristics for light incident on the polarization beam splitting film at an angle of 47 or 49 degrees are lower than those for light incident thereon at an angle of 45 degrees, and the lowering degree of the characteristics increases as a shift of the incident angle from 45 degrees becomes larger.

This lowering of the characteristics causes so-called leakage of light, which decreases the contrast. When using the polarization beam splitting film, a shift of the incident angle causes unevenness of color (change of color), thereby displaying an image with a color different from that originally expected.

Japanese Patent Laid-Open No. 7-181392 has disclosed an asymmetric optical system in which, to prevent such deterioration of image quality, an angular distribution of a luminous flux incident on an optical element is small in a direction (a sensitive direction) that the optical element is sensitive to the angular distribution and an angular distribution thereof is large in a direction (an insensitive direction) that the optical element is insensitive to the angular distribution.

In the optical system disclosed in Japanese Patent Laid-Open No. 7-181392, lens cells constituting a first fly-eye lens are decentered such that the first fly-eye lens has a positive optical power as a whole in the sensitive direction.

In addition, in the same direction, lens cells constituting a second fly-eye lens are decentered such that the second fly-eye lens has a negative optical power as a whole. Such compression of the luminous flux from a reflector only in the sensitive direction makes the angular distribution of the luminous flux incident on the optical element asymmetric between in the sensitive direction and in the insensitive direction.

However, the compression of the luminous flux from the reflector only in one of cross-sections including the optical axis cannot reduce the angular distribution of the luminous flux incident on the polarization beam splitting film in the other cross-section (the cross-section perpendicular to the one cross-section), so that an improvement of the image quality is difficult. Further, since reduction of the size of the reflector for decreasing the diameter of the luminous flux makes a projected image dark, a certain degree of a large outer diameter of the reflector is required for ensuring brightness.

BRIEF SUMMARY OF THE INVENTION

The present invention provides an optical system for image projection which is easy to be manufactured and designed and capable of projecting a bright image with high contrast, and an projection apparatus with the same.

As one aspect, the present invention provides an optical system for image projection which comprises an illumination optical system introducing a luminous flux emitted from a light source to an image-forming element through an optical surface having a light-splitting function, and a projection optical system which projects the luminous flux introduced from the image-forming element through the optical surface onto a projection surface. The illumination optical system includes a conversion system which respectively converts the widths of the luminous flux in a first cross-section and a second cross-section perpendicular to each other into widths different from those before entering thereinto. A conversion rate in the first cross-section and a conversion rate in the second cross-section are different from each other.

As another aspect, the present invention provides an image projection apparatus which includes the above optical system.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the accompanying drawings.

Embodiment 1

Figure 1:
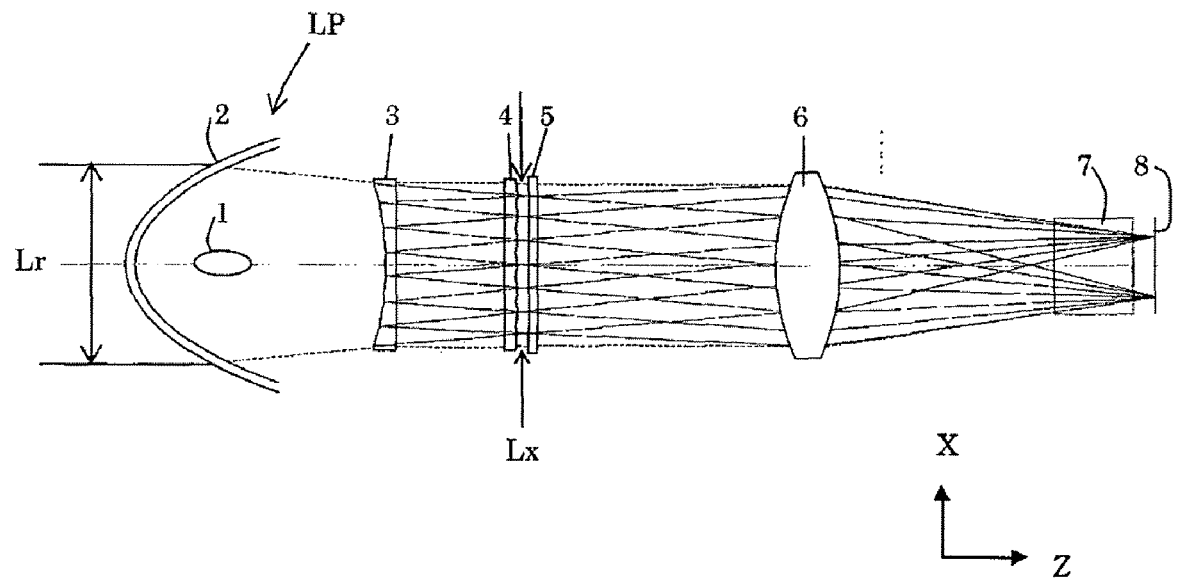
FIG. 1 is an XZ cross-sectional view showing an illumination optical system used in an optical system for image projection that is Embodiment 1 of the present invention.
Figure 2:
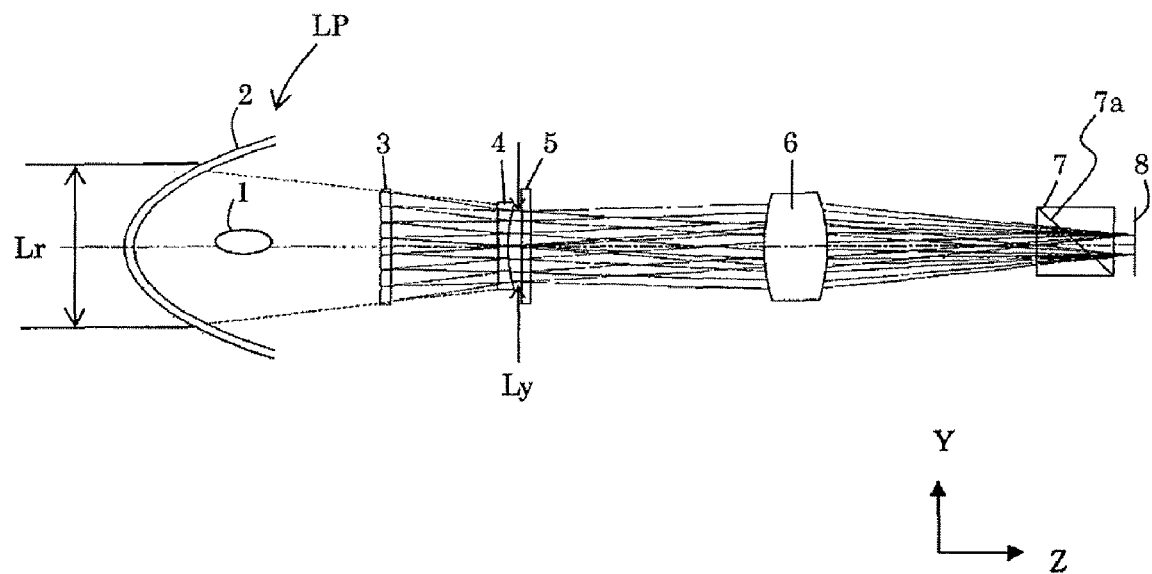
FIG. 2 is a YZ cross-sectional view showing the illumination optical system in Embodiment 1.

FIGS. 1 and 2 show the configuration of an illumination optical system used in an optical system for image projection that is Embodiment 1 of the present invention. The illumination optical system uses a luminous flux from a light source 1 to illuminate a reflective liquid crystal panel (hereinafter merely referred to as a liquid crystal panel) 8 as a reflective image-forming element that is placed on an illuminated surface through a polarization beam splitter 7.

The luminous flux (image light) image-modulated by the liquid crystal panel 8 is introduced to an unshown projection lens (or a projection optical system) through the polarization beam splitter 7 again to be projected onto a projection surface such as a screen. Thus, the illumination optical system in this embodiment also has the function of analyzing the image light with the polarization beam splitter 7 and introducing the image light to the projection lens.

In this embodiment, an optical axis of the illumination optical system is defined as a Z-axis, and a direction parallel to the Z-axis is referred to as an optical axis direction. The optical axis is defined by, for example, an axis line passing through the center of a condenser lens 6 and the center of the panel surface of the liquid crystal panel 8. In addition, a direction along the Z-axis in which the luminous flux from a light source lamp LP proceeds toward the liquid crystal panel 8 through the condenser lens 6 and the polarization beam splitter 7 is also referred to as a light proceeding direction.

FIG. 1 shows the optical configuration in an XZ cross-section (a first cross-section) in which an angular distribution of the luminous flux entering the panel surface of the liquid crystal panel 8 is wider than that in a YZ cross-section, the XZ and YZ cross-sections being planes including the Z-axis (that is, planes parallel to the Z-axis) and perpendicular to each other. This XZ cross-section is parallel to a direction of the long side (a direction in which the long side extends) of the liquid crystal panel 8.

Further, FIG. 2 shows the optical configuration in the YZ cross-section (a second cross-section) in which an angular distribution of the luminous flux entering the panel surface is narrower. This YZ cross-section is parallel to a direction of the short side (a direction in which the short side extends) of the liquid crystal panel 8.

Figure 3:
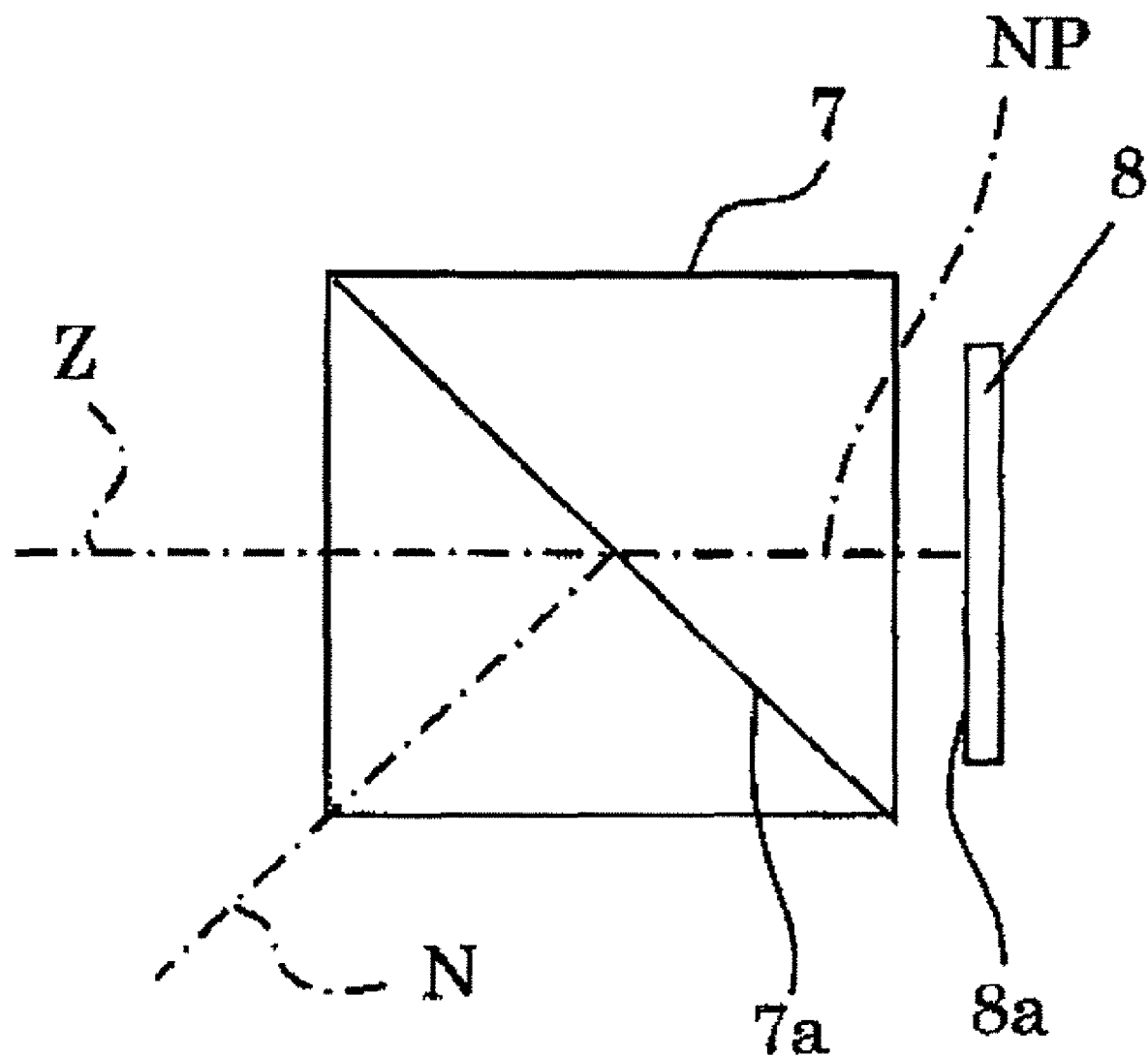
FIG. 3 is a YZ cross-sectional view showing a polarization beam splitter used in Embodiment 1.

As shown in FIG. 3, the YZ cross-section is parallel to a plane including the optical axis (the Z-axis) and a normal N to a polarization beam splitting surface 7a of the polarization beam splitter 7, the plane being parallel to the paper plane of FIG. 3. This YZ cross-section can be said also as a cross-section parallel to the normal N to the polarization beam splitting surface 7a and a normal NP to the panel surface (entrance/emergence surface) 8a of the liquid crystal panel 8.

Furthermore, the XZ cross-section can be said as a cross-section perpendicular to the YZ cross-section and parallel to the Z-axis (the optical axis). The definitions for the Z-axis, XZ cross-section and YZ cross-section are applied also to the later-described Embodiments 2 to 5.

Although these figures show only basic components constituting the illumination optical system, an actual illumination optical system includes other various optical elements such as a mirror folding the optical path from the light source, an infrared (heat-ray) cutting filter and a polarizing plate.

A luminous flux radially emitted from the light source 1 such as a high-pressure mercury discharge tube is converted into a converging luminous flux by an elliptic reflector (elliptic mirror) 2. The light source 1 and the reflector 2 constitute the light source lamp LP. A combination of a parabolic reflector and a convex lens can be used instead of the elliptic reflector 2.

The light reflected by the elliptic reflector 2 is divided into plural luminous fluxes by a first fly-eye lens 3, and the divided luminous fluxes form plural secondary light source images at the vicinity of a second fly-eye lens 4 and a polarization conversion element 5.

The luminous flux after forming each secondary light source image is converted into linearly-polarized light (that is, light whose polarization state is uniformed) having a predetermined polarization direction by the polarization conversion element 5 and then enters the condenser lens 6.

The polarization conversion element 5 includes plural polarization beam splitting surfaces, plural reflective surfaces and plural half-wave plates. Specifically, the polarization conversion element 5 is an array type optical element in which plural polarization conversion element portions, each of which includes the polarization beam splitting surface, the reflective surface and the half-wave plate, are arranged in a direction substantially perpendicular to the optical axis. A polarization beam splitting surface can be used instead of the reflective surface. Thus, the polarization conversion element 5 herein may be referred to as a polarization conversion element array.

In the polarization conversion element 5, of the light entering each of the polarization beam splitting surfaces, a polarized light component having the predetermined polarization direction passes therethrough to emerge from the polarization conversion element 5.

On the other hand, of the light entering each of the polarization beam splitting surfaces, a polarized light component having a polarization direction perpendicular to the above predetermined polarization direction is reflected thereby and then reflected by the reflective surface. Further, the polarization direction of the polarized light component is rotated by 90 degrees by the half-wave plate, and the light component then emerges from the polarization conversion element 5. The polarization conversion element 5 converts in this way the entering non-polarized light into the linearly-polarized light having the predetermined polarization direction.

The half-wave plate may be provided only in the optical path of the light transmitted through the polarization beam splitting surface. In addition, the polarization conversion element 5 may convert non-polarized light into linearly-polarized light component in each color, and in this case the polarization directions of the linearly-polarized light components may not be necessarily the same.

In other words, the polarization conversion element 5 may make the polarization direction of one of red, green and blue light components different from those of the other two light components such that, for example, the red light component is S-polarized light with respect to the polarization beam splitter 7 and the green and blue light components are P-polarized light with respect thereto.

Specifically, this is achieved by providing to the polarization beam splitting surface a characteristic which reflects green and blue S-polarized light and red P-polarized light and transmits green and blue P-polarized light and red S-polarized light, and by providing a half-wave plate in the optical path for the light reflected by the polarization beam splitting surface.

The divided luminous fluxes emerging from the condenser lens 6 are transmitted through a polarization beam splitting surface (optical film surface or optical surface) 7a of the polarization beam splitter 7 and then superposed with each other on the liquid crystal panel 8. Thereby, the liquid crystal panel 8 is illuminated with an illumination luminous flux having an even intensity distribution.

The polarization beam splitting surface 7a has a light-splitting function. The light image-modulated and reflected by the liquid crystal panel 8 is reflected by the polarization beam splitting surface 7a of the polarization beam splitter 7 to be introduced to the unshown projection lens.

Although only one liquid crystal panel 8 is shown in this embodiment, an actual and general projector has three liquid crystal panels for red (R), green (G) and blue (B). The polarization beam splitter 7 constitutes part of a so-called color separation/combination optical system which respectively introduces illumination light of R, illumination light of G and illumination light of B to the three liquid crystal panels, and combines the image light of R, image light of G and image light of B from the three liquid crystal panels.

The polarization beam splitter 7 has a polarization beam splitting film that constitutes the polarization beam splitting surface 7a and inclines with respect to the optical axis (the Z-axis) of the illumination optical system, the surface 7a being made of a multi-layer film. The inclination of the polarization beam splitting surface 7a with respect to the optical axis is generally set to 45 degrees or an angle from 42 to 48 degrees.

The polarization beam splitting film has the function of splitting light in a wavelength range that is at least part of the visible wavelength region (for example, a wavelength range having a width of 10 nm or more, and preferably a width of 40 nm or more) depending on polarization directions. In general, the polarization beam splitting film reflects 80% or more of light having a first polarization direction, of light having a certain incident angle, and transmits 80% or more of light having a second polarization direction which is perpendicular to the first polarization direction.

Each of the first and second fly-eye lenses 3 and 4 is constituted by plural lens cells two-dimensionally arranged (that is, arranged such that plural lens cells are respectively arranged in a first direction perpendicular to the optical axis and in a second direction perpendicular to the first direction and the optical axis). The central axis of each lens cell is parallel to the Z-axis.

As described above, the luminous flux emitted from the light source 1 provided at the vicinity of a first focal point of the elliptic reflector 2 is reflected and collected by the elliptic reflector 2 to proceed toward the first fly-eye lens 3 as the converging luminous flux.

Figure 4:
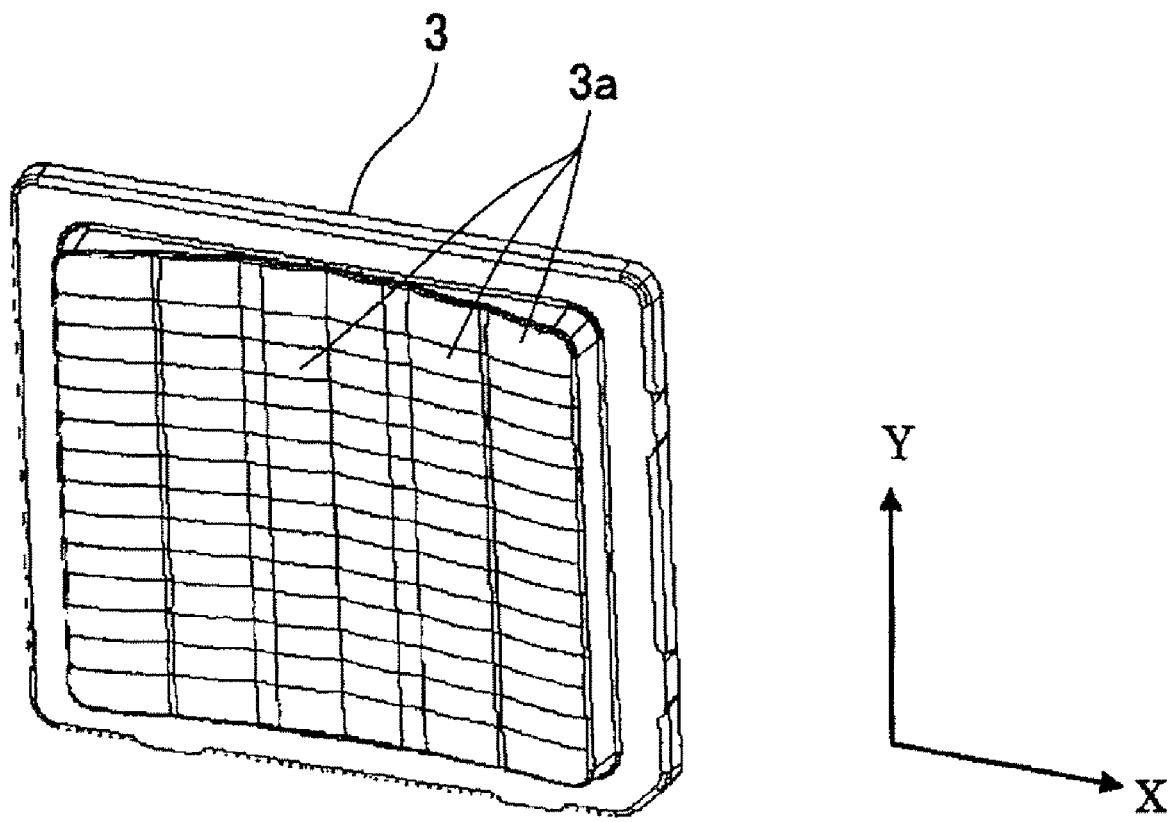
FIG. 4 is an oblique perspective view showing a first fly-eye lens used in Embodiment 1.

In the XZ cross-section shown in FIG. 1, as shown in FIG. 4, of the plural lens cells 3$a$ in the first fly-eye lens 3, lens cells other than a central lens cell are formed such that their vertexes are decentered outward in the X direction. Therefore, the first fly-eye lens 3 has a negative (concave) lens function as a whole for the luminous flux from the elliptic reflector 2.

Figure 5:
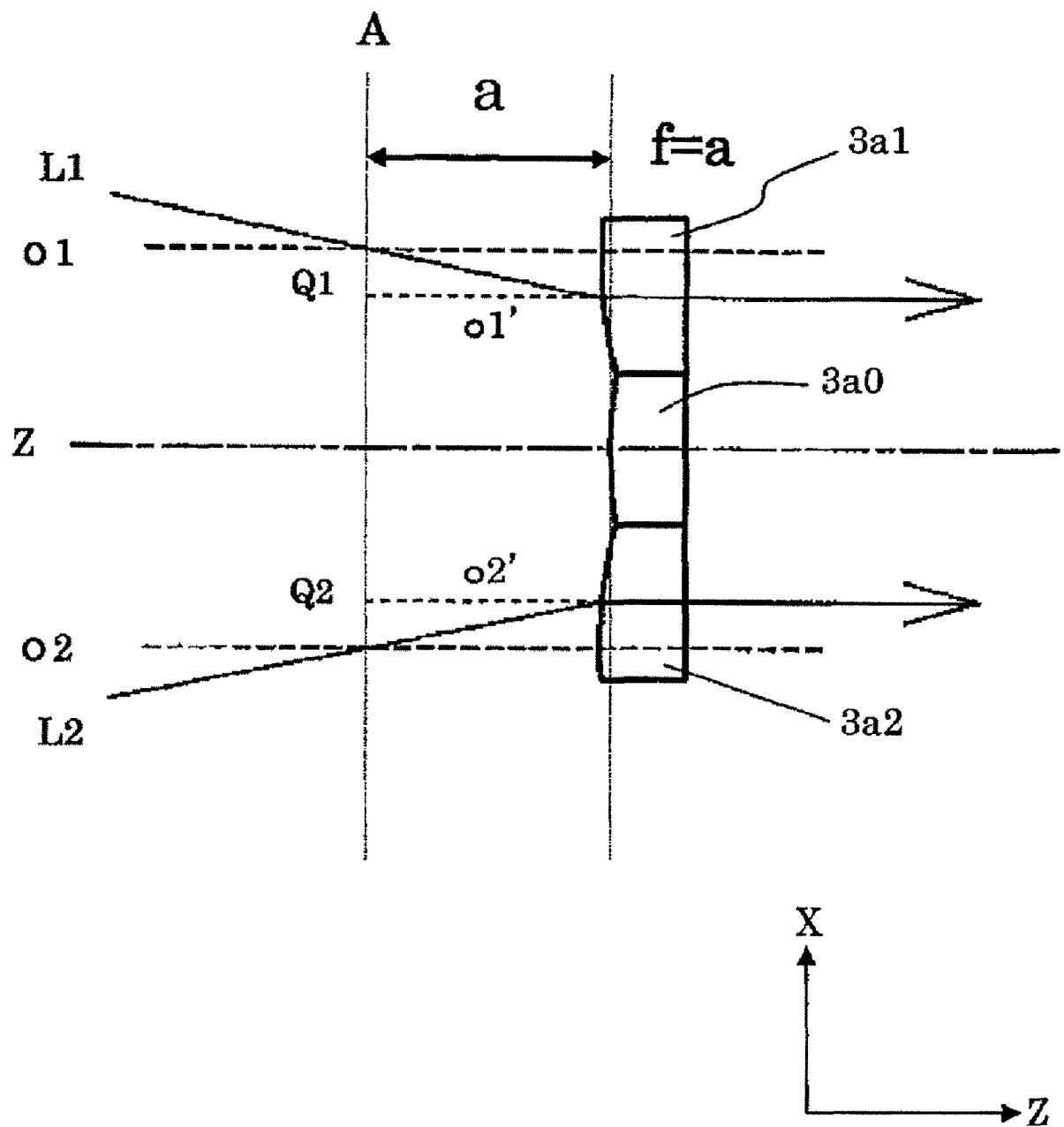
FIG. 5 is a figure for explaining optical actions of the first fly-eye lens.

This will be described using FIG. 5. FIG. 5 shows the central lens cell 3$a$0 of the first fly-eye lens 3 in the XZ cross-section and two lens cells (outer lens cells) 3$a$1 and 3$a$2 adjacent thereto in the X direction.

The vertexes of the outer lens cells 3$a$1 and 3$a$2 (the vertexes are on the dotted lines showing the optical axes o1, o2 of the outer lens cells 3$a$1, 3$a$2) are decentered outward with respect to the centers of the outer lens cells 3$a$1 and 3$a$2 (the centers are on the dotted lines o1', o2'). When an even number of lens cells are respectively arranged in the X direction and in the Y direction, it is preferable that the vertex of each of all lens cells be decentered outward with respect to the center of that lens cell.

In FIG. 5, 'a' represents the focal length f of the first fly-eye lens 3, and a line A represents a position (that is, an entrance side focal point) away from the first fly-eye lens 3 (that is, the central lens cell 3$a$0) toward the elliptic reflector 2 by a distance of 'a'.

In this case, light rays L1 and L2 respectively passing through intersection points Q1, Q2 of the optical axes o1, o2 of the outer lens cells 3$a$1, 3$a$2 with the line A respectively pass through the centers of the outer lens cells 3$a$1, 3$a$2 to become parallel light rays proceeding along the Z-axis, and then emerges from the first fly-eye lens 3.

The light rays L1 and L2 are light rays passing through the centers of the outer lens cells 3$a$1 and 3$a$2, respectively. Furthermore, though not shown, the vertex of the central lens cell 3$a$0 is located at the center of the central lens cell 3$a$0, and a light ray entering the center of the central lens cell 3$a$0 proceeds in parallel with the Z-axis to emerge from the first fly-eye lens 3.

Thus, the first fly-eye lens 3 has the function of converting a light ray entering the center of each lens cell into a light ray proceeding in parallel with the optical axis (the Z-axis). In other words, the first fly-eye lens 3 has the function of dividing the converging luminous flux from the elliptic reflector 2 into plural luminous fluxes (parallel luminous fluxes) that are parallel to the optical axis and then respectively collecting the plural luminous fluxes to cause each of the plural luminous fluxes to form a light source image.

Accordingly, the first fly-eye lens 3 acts as a lens having a negative optical power (an optical power is an inverse of focal length, and can be referred to as a refractive power) to convert the entire converging luminous flux from the elliptic reflector 2 into a parallel luminous flux and acts as a lens having a positive optical power to collect each of the divided luminous fluxes.

As described above, the first fly-eye lens 3 has, in the XZ cross-section, a concave lens function of converting the converging luminous flux from the elliptic reflector 2 into plural luminous fluxes parallel to the optical axis and causing them to emerge therefrom.

Figure 6:
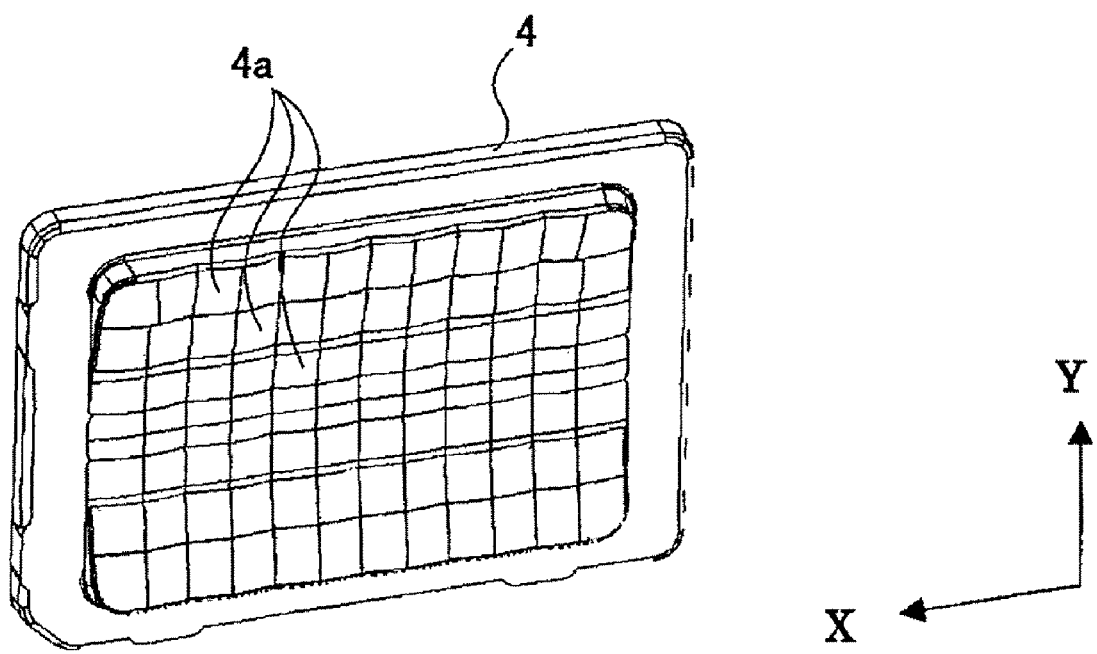
FIG. 6 is an oblique perspective view showing a second fly-eye lens used in Embodiment 1.

In the YZ cross-section shown in FIG. 2, as shown in FIG. 6, of the plural lens cells 4$a$ in the second fly-eye lens 4, lens cells other than a central lens cell are formed such that their vertexes are decentered outward in the Y direction. Therefore, the luminous flux reflected by the elliptic reflector 2 and then entering the second fly-eye lens 4 becomes a parallel luminous flux. That is, the entire second fly-eye lens 4 has a negative (concave) lens function for the luminous flux from the elliptic reflector 2 in the YZ cross-section. This lens function can be obtained in the same manner as that of the first fly-eye lens 3.

Figure 7:
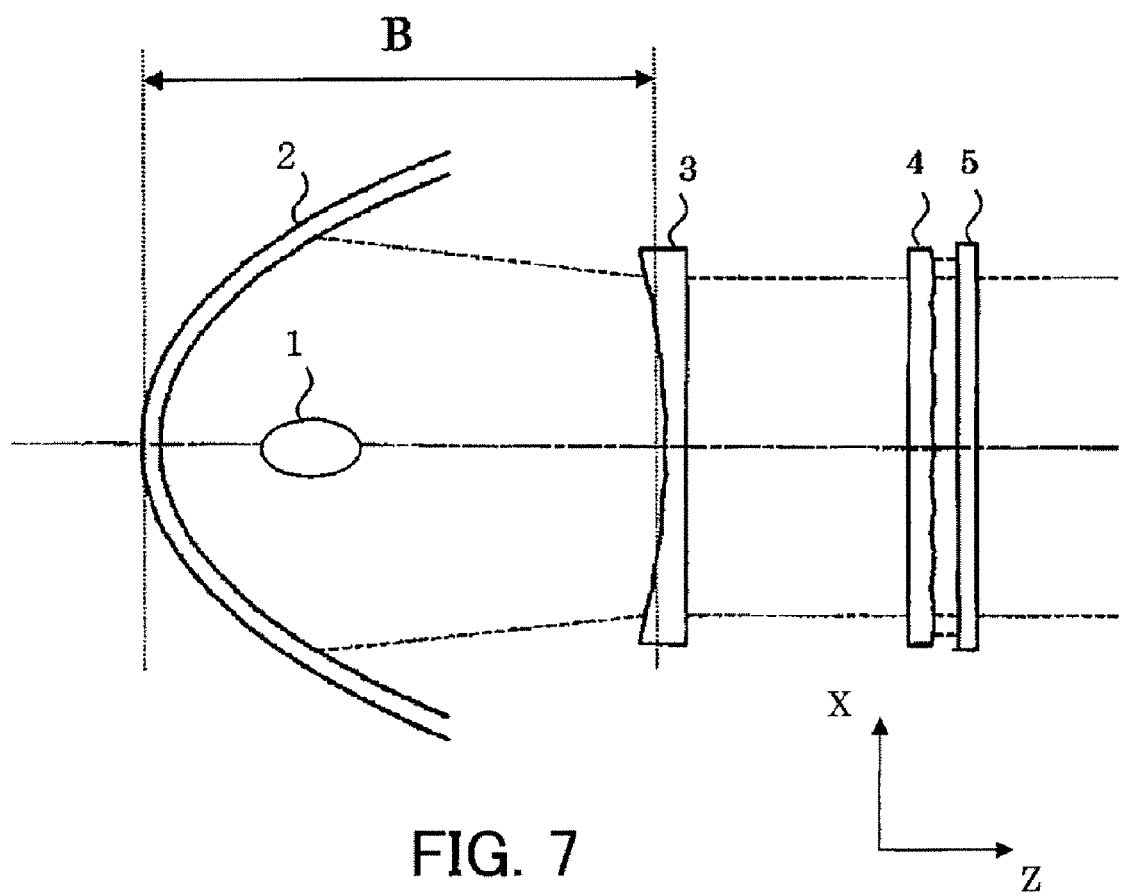
FIG. 7 is an enlarged XZ cross-sectional view showing an optical path from a reflector to a polarization conversion element in Embodiment 1.
Figure 8:
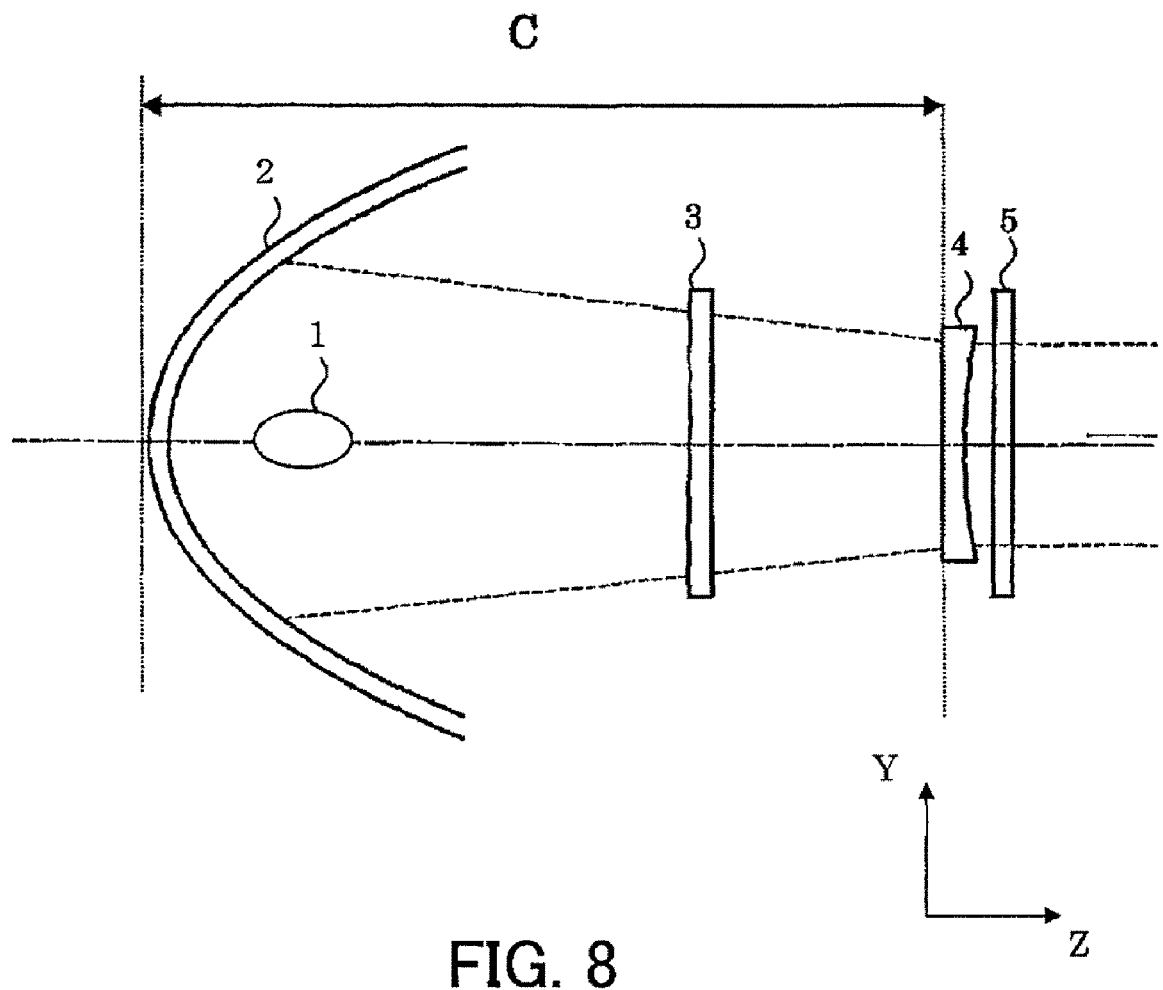
FIG. 8 is an enlarged YZ cross-sectional view showing the optical path from the reflector to the polarization conversion element in Embodiment 1.

FIGS. 7 and 8 enlargedly show the optical path from the elliptic reflector 2 to the polarization conversion element 5 shown in FIGS. 1 and 2, respectively. The converging luminous flux reflected by the elliptic reflector 2 is converted into a parallel luminous flux by the first fly-eye lens 3 in the XZ cross-section and into a parallel luminous flux by the second fly-eye lens 4 in the YZ cross-section.

That is, a compression of luminous flux in the XZ cross-section is performed by a compression system which is constituted by the elliptic reflector (or a first optical element) 2 and the first fly-eye lens (or a second optical element) 3, and a compression of luminous flux in the YZ cross-section is performed by a compression system which is constituted by the elliptic reflector 2 and the second fly-eye lens (or a third optical element) 4.

The compression of luminous flux is an optical action that reduces the diameter (in other words, the width) of the luminous flux and then collimates the luminous flux.

The parallel luminous flux in this embodiment includes not only a completely parallel luminous flux but also a luminous flux that can be regarded as a parallel luminous flux in view of optical performance.

Specifically, the compression system in this embodiment is constituted by a combination of, in order from a light source side, a first optical element having a positive optical power such as an elliptic reflector or a convex lens, and second and third optical elements or a second optical element having negative optical powers different from each other in the XZ and YZ cross-sections such as a concave lens or a fly-eye lens (or a lens array) with a concave lens function.

However, a compression system may be constituted by a combination of an optical element having a positive optical power such as an elliptic reflector or a convex lens, and another optical element having a positive optical power such as a convex lens if the luminous flux emerging from the compression system is a parallel luminous flux. When the compression system is constituted only by lenses, it is preferable that the compression system be constructed as an a focal system.

As described above, the compression system causes the diameter (or the width) of the luminous flux emerging therefrom to become narrower than that of the luminous flux before entering thereinto (that is, before entering the reflector 2) in both of the XZ and YZ cross-sections.

The compression system in this embodiment is provided, within the illumination optical system introducing the luminous flux from the light source to the liquid crystal panel, between the light source (light-emitting portion) and a pupil position (that is, a position where the light source image or an image of the light-emitting portion is formed) of the illumination optical system.

The pupil position of the illumination optical system is located at the vicinity of the polarization conversion element (that is, a component in which plural small polarization conversion elements are arrayed) in this embodiment. However, the pupil position may be located closer to the liquid crystal panel than at least one optical element provided closer to the liquid crystal panel than the polarization conversion element.

Furthermore, the compression system for the XZ cross-section which compresses the luminous flux diameter in the XZ cross-section and the compression system for the YZ cross-section which compresses the luminous flux diameter in the YZ cross-section may be constituted by the same optical elements, or include the same optical elements as part of them, or be constituted by different optical elements.

The compression systems in this embodiment are provided between the light source and the polarization conversion element and compress the luminous flux diameter at the reflecting point by the reflector in the XZ and YZ cross-sections.

Thereby, the luminous flux diameter can be narrowed at the pupil position (light source image forming position) of the illumination optical system introducing the light from the light source to the liquid crystal panel.

In addition, a difference in at least one of the position and optical power of the optical elements in the XZ and YZ cross-sections causes the luminous flux diameter to differ from each other at the entering point into the polarization conversion element (in other words, at the emerging point from the compression systems) in the XZ and YZ cross-sections. That is, the compression systems including the above difference causes the compression rates of the luminous flux diameter to differ from each other in the XZ and YZ cross-sections.

The description is made mainly of the case where the compression system is provided closer to the light source than the polarization conversion element in this embodiment. However, the compression system may be provided closer to the liquid crystal panel (or the projection lens) than the polarization conversion element as described above.

In this case, the compression system for the XZ cross-section which compresses the luminous flux diameter in the XZ cross-section may be provided closer to the light source than the pupil position (light source image forming position) in the XZ cross-section of the illumination optical system, and the compression system for the YZ cross-section which compresses the luminous flux diameter in the YZ cross-section may be provided closer to the light source than the pupil position (light source image forming position) in the YZ cross-section of the illumination optical system. These are also applied to the later-described embodiments.

In this embodiment and later-described embodiments, the compression rate of luminous flux is defined as a ratio of the outer diameter of the luminous flux at the emerging point from (or the reflecting point on) the reflector to that at the point immediately after emerging from the compression system (or that at the entering point into the polarization conversion element). Specifically, in Embodiments 1 to 5, the compression rate of luminous flux means a value obtained by dividing the outer diameter of the luminous flux at the emerging point from the reflector by that at the point immediately after emerging from the compression system. Note that a compression rate in Embodiment 7 and subsequent embodiments which will be described later has a meaning opposite to that in Embodiments 1 to 5. The detail thereof will be described later.

In this embodiment, since the luminous flux emerging from the first and second fly-eye lenses 3 and 4 enters the polarization conversion element 5 as a parallel luminous flux, the compression rate is determined depending on a distance (or a length, hereinafter referred to as a compression length) from the elliptic reflector 2 to the first fly-eye lens 3 or the second fly-eye lens 4.

As shown in FIG. 7, in the XZ cross-section, the compression of luminous flux is performed by the elliptic reflector 2 and the first fly-eye lens 3, so that the compression length is B.

As shown in FIG. 8, in the YZ cross-section, the compression of luminous flux is performed by the elliptic reflector 2 and the second fly-eye lens 4, so that the compression length is C.

Thus, in this embodiment, the compression rates in the XZ cross-section and in the YZ cross-section are different from each other. Specifically, since B/C<1, the compression rate in the YZ cross-section is larger than that in the XZ cross-section.

In other words, when the compression rate in the XZ cross-section is $\alpha$ and the compression rate in the YZ cross-section is $\beta$, $$\alpha \neq \beta$$

$$\alpha/\beta < 1$$

($\alpha \neq 0$, $\beta \neq 0$, more preferably $\alpha > 1$, $\beta > 1$).

As described above, each of the compression rates $\alpha$ and $\beta$ is defined as a value obtained by dividing the outer diameter of the luminous flux at the emerging point from the elliptic reflector 2 by that at the point immediately after emerging from the compression system. Therefore, if the luminous flux is compressed by the compression system, the compression rates $\alpha$ and $\beta$ are logically larger than 1.

A description will be made of $\alpha$ and $\beta$ using FIGS. 1 and 2. In these figures, Lr represents the width (or diameter) of the luminous flux in the directions perpendicular to the optical axis at the reflection position by the elliptic reflector 2.

Lx represents the width of the luminous flux in the XZ cross-section (in one direction perpendicular to the optical axis) at a position immediately before the polarization conversion element 5. In other words, Lx represents the width of the luminous flux in the XZ cross-section at a position between an optical element closest to the polarization conversion element 5 on the side closer to the light source than the polarization conversion element 5 and the polarization conversion element 5.

Ly represents the width of the luminous flux in the YZ cross-section (in the other direction perpendicular to the optical axis) at the position immediately before the polarization conversion element 5. In other words, Ly represents the width of the luminous flux in the YZ cross-section at a position between an optical element closest to the polarization conversion element 5 on the side closer to the light source than the polarization conversion element 5 and the polarization conversion element 5.

The $\alpha$ and $\beta$ can be expressed as follows:

$$\alpha = Lr/Lx$$

$$\beta = Lr/Ly.$$

$$\alpha > 1, \beta > 1.$$

The $\alpha$ and $\beta$ can also be expressed as follows:

$$\alpha = Hr/Hx$$

$$\beta = Hr/Hy.$$

where Hr represents a height (a distance from the optical axis) of a position where a light ray entering the center of an off-axis lens cell of the fly-eye lens is reflected by the reflector, Hx (in the XZ cross-section) and Hy (in the YZ cross-section) represent heights of positions where the light ray enters the polarization conversion element 5.

It is preferable that the above-described light ray entering the center of the off-axis lens cell of the fly-eye lens enter both of the centers of the first and second fly-eye lenses. The light ray enters the polarization conversion element 5 perpendicularly thereto (that is, in parallel with the optical axis).

Although the Lx and Ly are defined as the diameter (or a width) of the luminous flux at the position immediately before the polarization conversion element 5 in this embodiment, the Lx and Ly may be defined as the diameter of the luminous flux at a position immediately after the compression system.

In the embodiment shown in FIGS. 1 and 2, $\alpha=1.21$ and $\beta=1.67$, so that the $\alpha$ and $\beta$ are different from each other and $\alpha/\beta$ is 0.72 (<1).

As described above, in this embodiment, the converging luminous flux is produced by the elliptic reflector 2, and the compression rate of the luminous flux in the YZ cross-section larger than that in the XZ cross-section is obtained by using the difference between a distance from the elliptic reflector 2 to the first fly-eye lens 3 and a distance from the elliptic reflector 2 to the second fly-eye lens 4.

Thus, it is unnecessary to make the decentering amount of each of the lens cells constituting each of the fly-eye lenses 3 and 4 large as compared to a conventional configuration in which a drastic compression of luminous flux is made between the first and second fly-eye lenses.

Therefore, an increase of the thickness of each of the fly-eye lenses 3 and 4 in the optical axis direction can be suppressed. As a result, the illumination optical system can reduce aberrations generated in each fly-eye lens and achieve a required compression rate of the luminous flux in the YZ cross-section without a large reduction of illumination efficiency. Thereby, the optical system for image projection can project a bright image while narrowing the angular distribution of the luminous flux in a direction in which the polarization beam splitter 7 is sensitive thereto (that is, in the direction of the YZ cross-section) to suppress unevenness of brightness and deterioration of contrast.

Further, the illumination optical system (or the optical system for image projection) also narrows the angular distribution of the luminous flux in a direction in which the polarization beam splitter 7 is not sensitive thereto (that is, in the direction of the XZ cross-section), thereby enabling to contribute to suppress the unevenness of brightness and the deterioration of contrast as compared to a case where the angular distribution is large in this direction.

Embodiment 2

Figure 9:
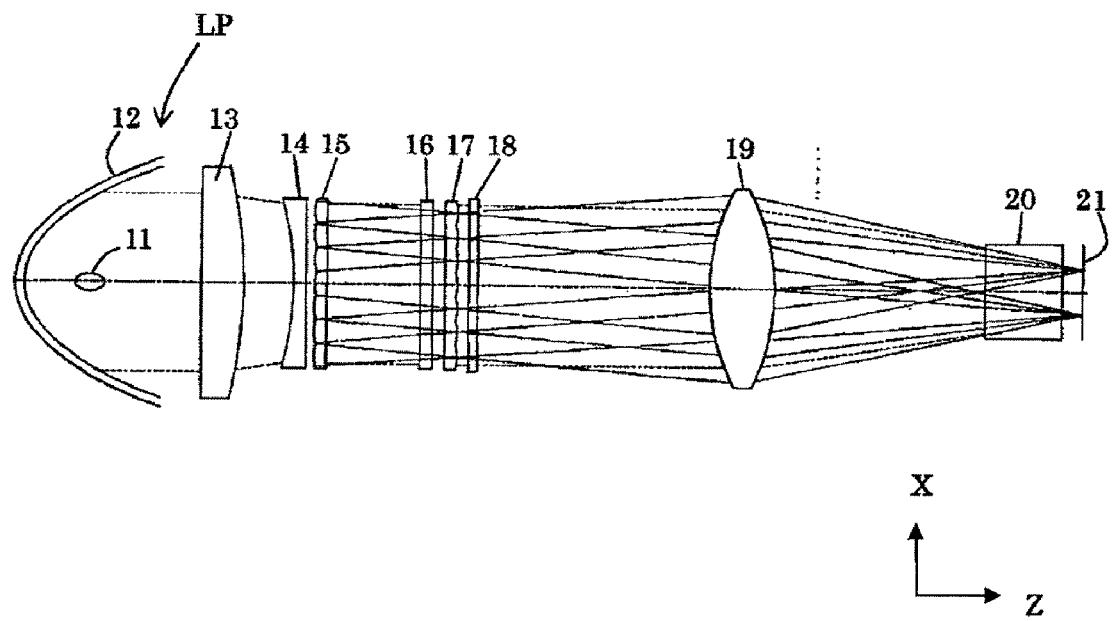
FIG. 9 is an XZ cross-sectional view showing an illumination optical system used in an optical system for image projection that is Embodiment 2 of the present invention.
Figure 10:
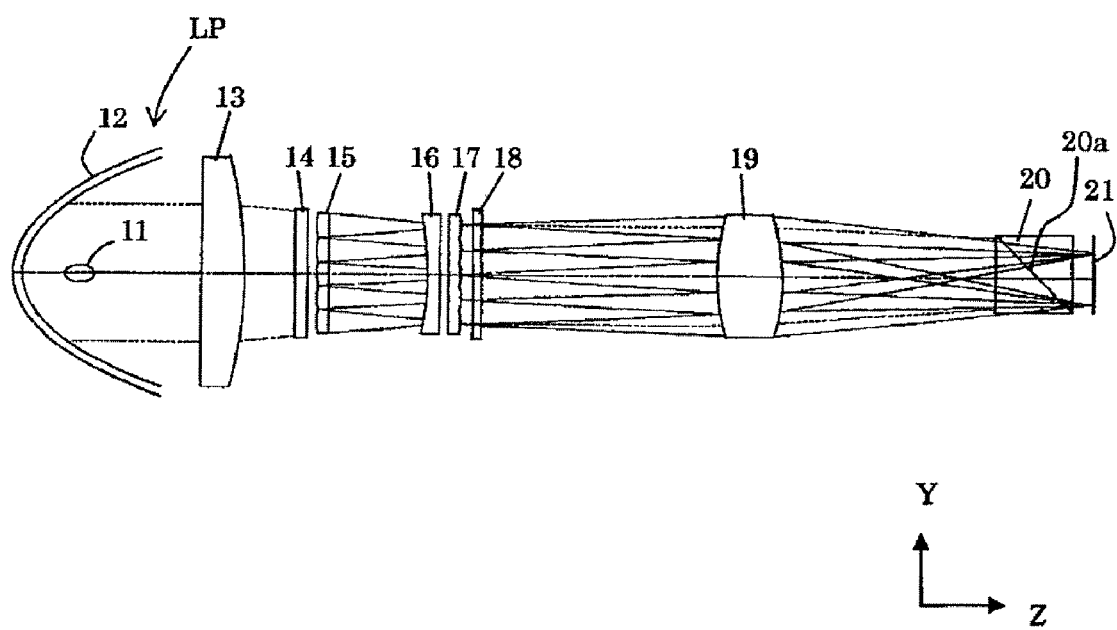
FIG. 10 is a YZ cross-sectional view showing the illumination optical system in Embodiment 2.

FIGS. 9 and 10 show the configuration of an illumination optical system used in an optical system for image projection that is Embodiment 2 of the present invention. FIG. 9 shows an XZ cross-section of the illumination optical system, and FIG. 10 shows a YZ cross-section thereof.

White light emitted from a light source 11 is converted into a parallel luminous flux by a parabolic reflector (parabolic mirror) 12. The light source 11 and the parabolic reflector 12 constitute a light source lamp LP. The parallel luminous flux is collected by a convex lens 13 and then passes through a first concave cylindrical lens 14 to enter a first fly-eye lens 15.

The luminous flux entering the first fly-eye lens 15 is divided into plural luminous fluxes, each being collected thereby. The luminous fluxes emerging from the first fly-eye lens 15 pass through a second concave cylindrical lens 16 and then form secondary light source images at the vicinity of a second fly-eye lens 17 and a polarization conversion element 18.

The plural divided luminous fluxes emerging from the polarization conversion element 18 (that is, linearly-polarized light having a predetermined polarization direction) are condensed by a condenser lens 19, pass through a polarization beam splitter 20 and are then superposed with each other on a reflective liquid crystal panel 21. The polarization beam splitter 20 has a polarization beam splitting film (optical film surface or optical surface) 20a similar to that described in Embodiment 1.

Each of the first and second fly-eye lenses 15 and 17 is constituted by plural lens cells two-dimensionally arranged.

Figure 11:
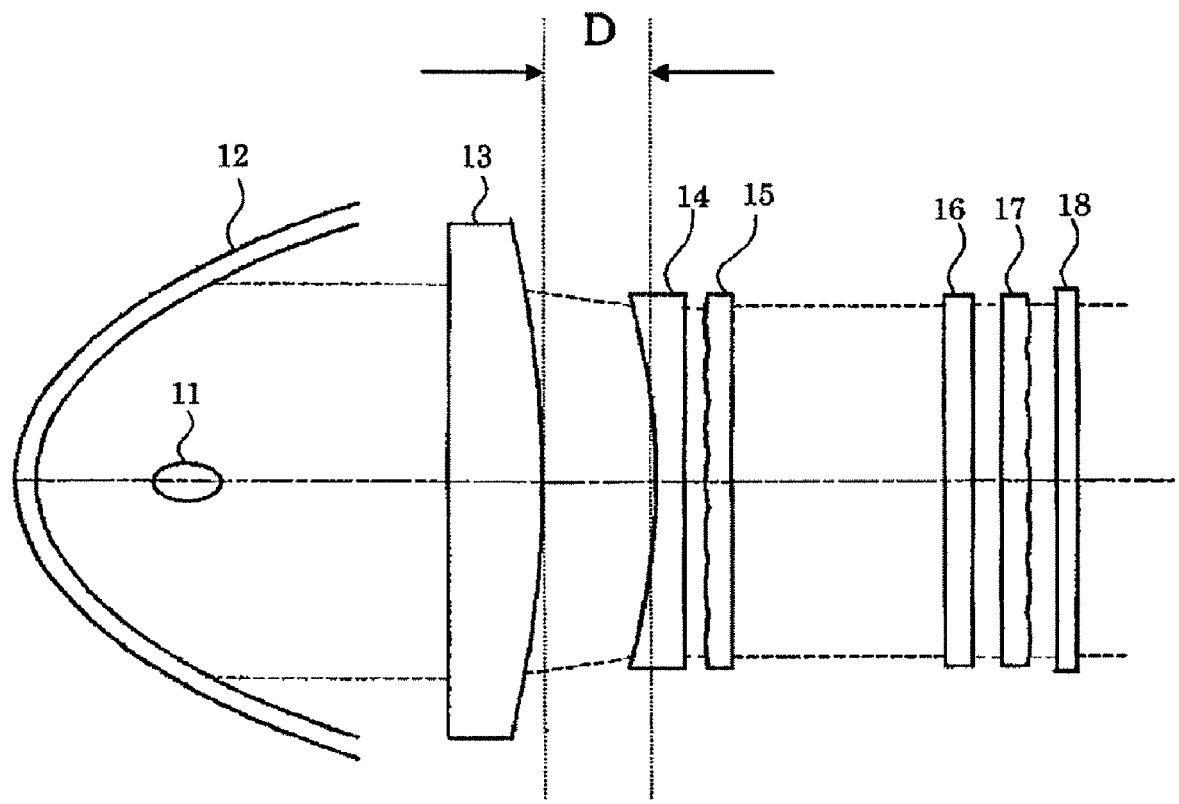
FIG. 11 is an enlarged XZ cross-sectional view showing an optical path from a reflector to a polarization conversion element in Embodiment 2.
Figure 12:
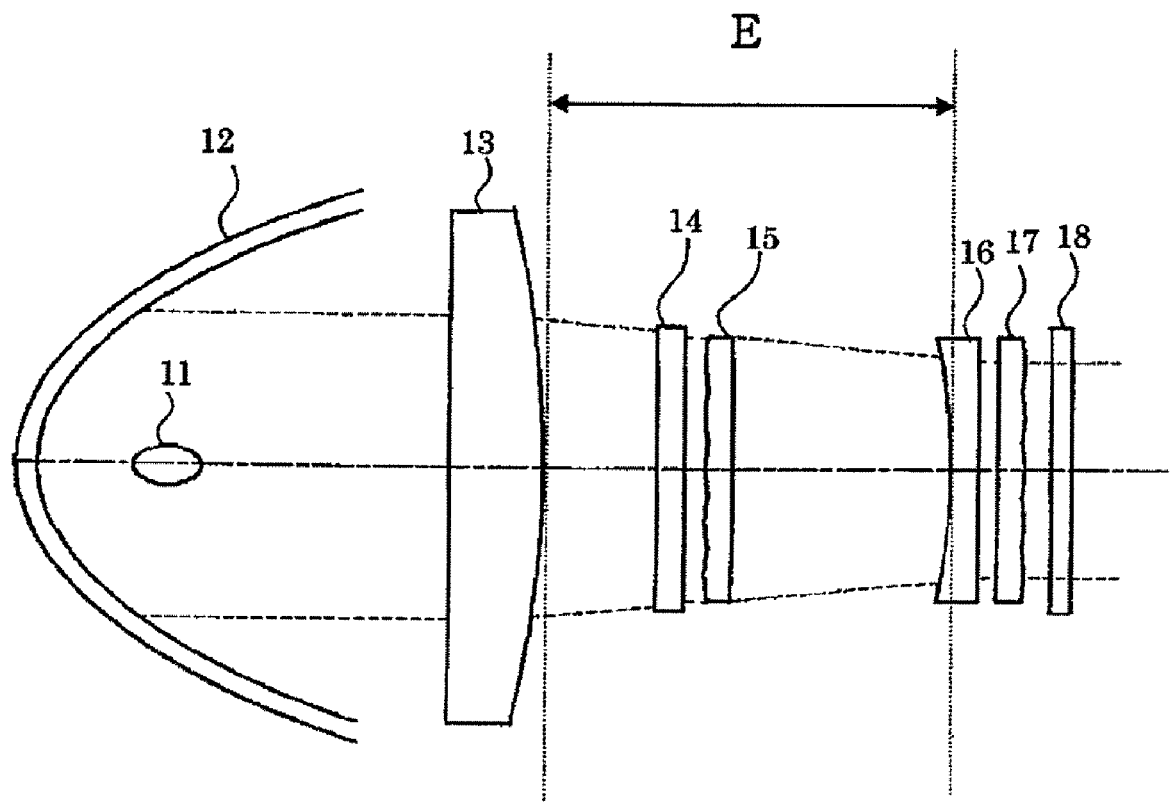
FIG. 12 is an enlarged YZ cross-sectional view showing the optical path from the reflector to the polarization conversion element in Embodiment 2.

FIGS. 11 and 12 enlargedly show the optical path from the parabolic reflector 12 to the polarization conversion element 18 shown in FIGS. 9 and 10, respectively. The parallel luminous flux emerging from the parabolic reflector 12 is converted into a converging luminous flux by the convex lens 13, and in the XZ cross-section the converging luminous flux is then converted into a parallel luminous flux by the first concave cylindrical lens 14 having a concave lens function.

On the other hand, in the YZ cross-section the converging luminous flux from the convex lens 13 is converted into a parallel luminous flux by the second concave cylindrical lens 16 having a concave lens function.

That is, a compression of luminous flux in the XZ cross-section is performed by a compression system which is constituted by the convex lens (or the first optical element) 13 and the first concave cylindrical lens (or the second optical element) 14, and a compression of luminous flux in the YZ cross-section is performed by a compression system which is constituted by the convex lens 13 and the second concave cylindrical lens (or the third optical element) 16.

Here, as described above, the compression rate of the luminous flux is defined as a value obtained by dividing the outer diameter of the luminous flux at the emerging point from the parabolic reflector 12 by that at the point immediately after emerging from the compression system.

In this embodiment, since the parallel luminous flux from the parabolic reflector 12 enters the convex lens 13, and the parallel luminous flux emerging from the first and second concave cylindrical lenses 14 and 16 enters the polarization conversion element 18. Therefore, the compression rate is determined depending on a distance (a compression length) from the convex lens 13 to the first concave cylindrical lens 14 or the second concave cylindrical lens 16.

As shown in FIG. 11, in the XZ cross-section, the compression of luminous flux is performed by the convex lens 13 and the first concave cylindrical lens 14, so that the compression length is D. As shown in FIG. 12, in the YZ cross-section, the compression of luminous flux is performed by the convex lens 13 and the second concave cylindrical lens 16, so that the compression length is E.

Thus, in this embodiment, the compression rates in the XZ cross-section and in the YZ cross-section are different from each other. Specifically, since D/E<1, the compression rate in the YZ cross-section is larger than that in the XZ cross-section.

In other words, when the compression rate in the XZ cross-section is $\alpha$ and the compression rate in the YZ cross-section is $\beta$ $$\alpha/\beta<1$$

$$(\alpha\neq 0).$$

As described above, in this embodiment, the parallel luminous flux emerging from the parabolic reflector 12 is converted into the converging luminous flux by the convex lens 13, and the compression rate of the luminous flux in the YZ cross-section larger than that in the XZ cross-section is obtained by using the difference between a distance from the convex lens 13 to the first concave cylindrical lens 14 and a distance from the convex lens 13 to the second concave cylindrical lens 16.

Therefore, as in Embodiment 1, the illumination optical system can achieve a required compression rate of the luminous flux in the YZ cross-section while suppressing an increase of the thickness of each of the fly-eye lenses 15 and 16 and a resultant reduction of illumination efficiency. Thereby, the optical system for image projection can project a bright image while narrowing the angular distribution of the luminous flux in a direction in which the polarization beam splitter 20 is sensitive thereto (that is, in the direction of the YZ cross-section) to suppress unevenness of brightness and deterioration of contrast.

Further, the illumination optical system (or the optical system for image projection) also narrows the angular distribution of the luminous flux in a direction in which the polarization beam splitter 20 is not sensitive thereto (that is, in the direction of the XZ cross-section), thereby enabling to contribute to suppress the unevenness of brightness and the deterioration of contrast as compared to a case where the angular distribution is large in this direction.

Although this embodiment uses the concave cylindrical lens as a separate lens from the fly-eye lens, a concave cylindrical lens surface may be provided on a surface of the fly-eye lens opposite to its lens cell surface.

Embodiment 3

Figure 13:
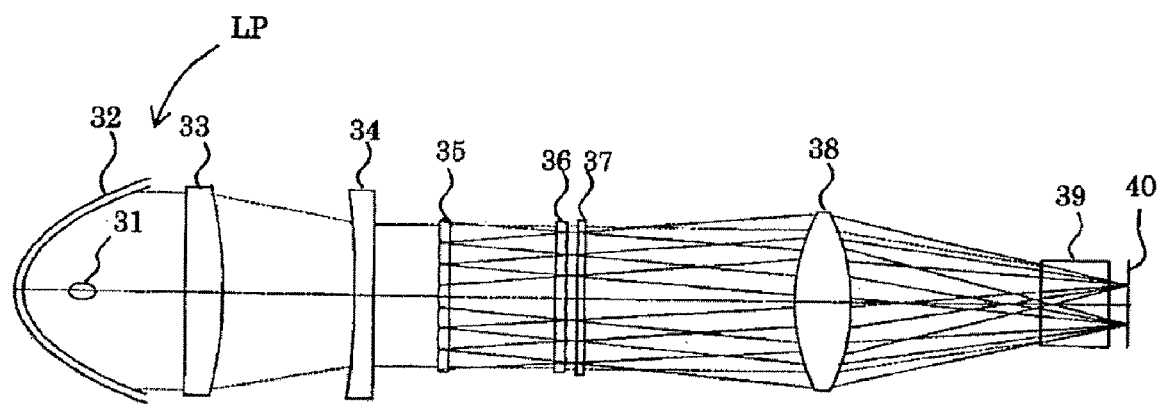
FIG. 13 is an XZ cross-sectional view showing an illumination optical system used in an optical system for image projection that is Embodiment 3 of the present invention.
Figure 14:
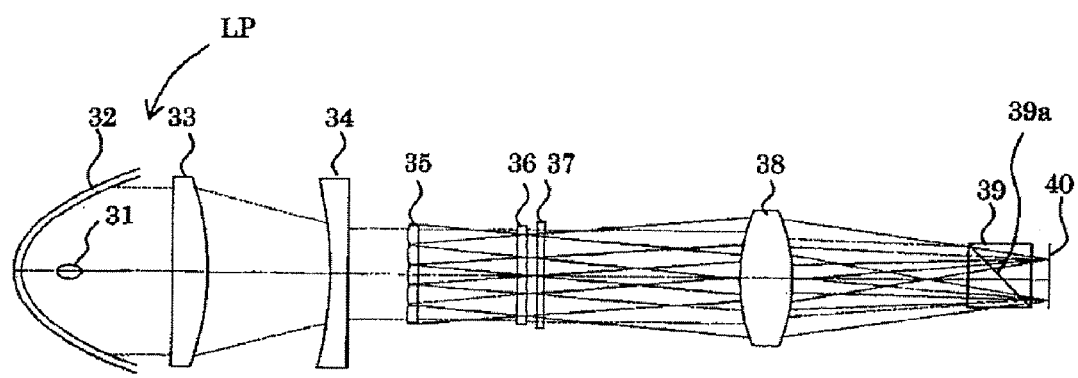
FIG. 14 is a YZ cross-sectional view showing the illumination optical system in Embodiment 3.

FIGS. 13 and 14 show the configuration of an illumination optical system used in an optical system for image projection that is Embodiment 3 of the present invention. FIG. 13 shows an XZ cross-section of the illumination optical system, and FIG. 14 shows a YZ cross-section thereof.

White light emitted from a light source 31 is converted into a parallel luminous flux by a parabolic reflector 32. The light source 31 and the parabolic reflector 32 constitute a light source lamp LP. The parallel luminous flux is converted into a converging luminous flux by a biconvex toric lens 33 and then passes through a biconcave toric lens 34 to enter a first fly-eye lens 35. The biconvex toric lens 33 may have a plano-convex shape or a meniscus shape, and biconcave toric lens 34 may have a plano-concave shape or a meniscus shape.

The luminous flux entering the first fly-eye lens 35 is divided into plural luminous fluxes, each being collected thereby. The luminous fluxes emerging from the first fly-eye lens 35 form secondary light source images at the vicinity of a second fly-eye lens 36 and a polarization conversion element 37.

The plural divided luminous fluxes emerging from the polarization conversion element 37 (that is, linearly-polarized light having a predetermined polarization direction) are condensed by a condenser lens 38, pass through a polarization beam splitter 39 and are then superposed with each other on a reflective liquid crystal panel 40. The polarization beam splitter 39 has a polarization beam splitting film (optical film surface or optical surface) 39a similar to that described in Embodiment 1.

Each of the first and second fly-eye lenses 35 and 36 is constituted by plural lens cells two-dimensionally arranged.

Figure 15:
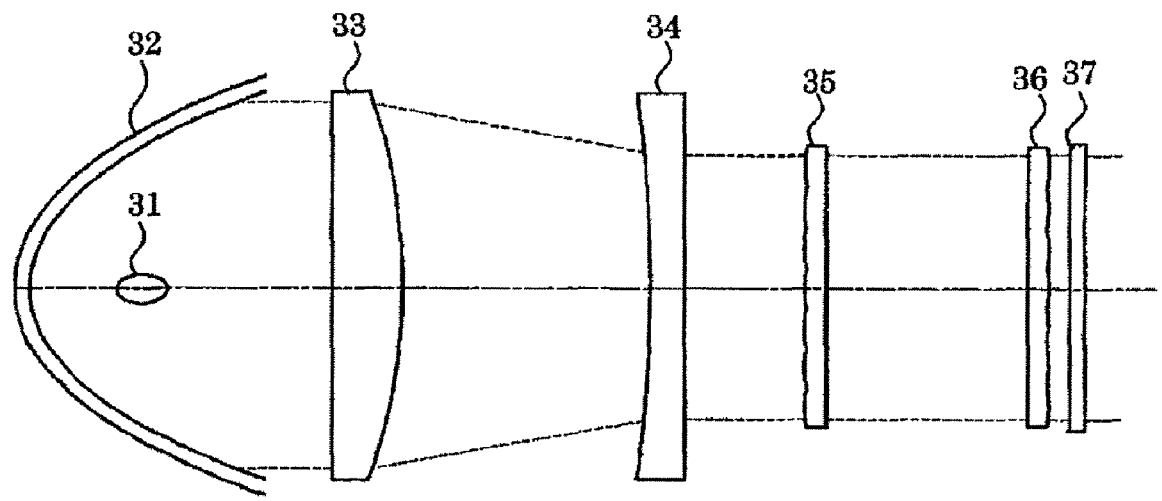
FIG. 15 is an enlarged XZ cross-sectional view showing an optical path from a reflector to a polarization conversion element in Embodiment 3.
Figure 16:
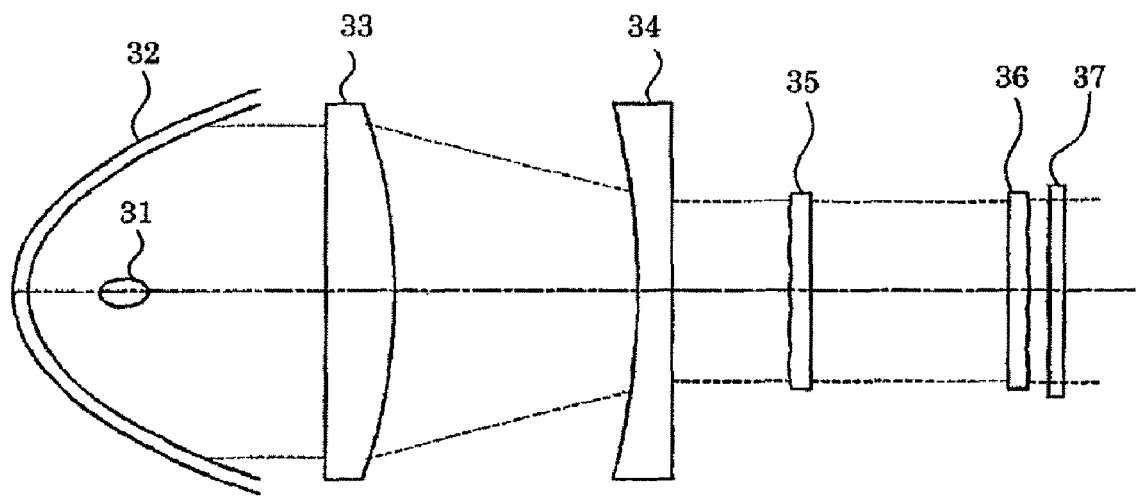
FIG. 16 is an enlarged YZ cross-sectional view showing the optical path from the reflector to the polarization conversion element in Embodiment 3.

FIGS. 15 and 16 enlargedly show the optical path from the parabolic reflector 32 to the polarization conversion element 37 shown in FIGS. 13 and 14, respectively. The luminous flux passing through the biconvex toric lens 33 is a converging luminous flux, but the converging luminous flux is converted into a parallel luminous flux in the XZ and YZ cross-sections by the biconcave toric lens 34 having a concave lens function.

That is, compressions of luminous flux in the XZ and YZ cross-sections are performed by a compression system which is constituted by the biconvex toric lens (or the first optical element) 33 and the biconcave toric lens (or the second optical element) 34. Here, the compression rate of the luminous flux is defined as a value obtained by dividing the outer diameter of the luminous flux at the emerging point from the parabolic reflector 32 by that at the point immediately after emerging from the compression system (or that at entering point into the polarization conversion element 37). In this embodiment, the parallel luminous flux from the parabolic reflector 32 enters the biconvex toric lens 33, and the parallel luminous flux emerging from the biconcave toric lens 34 enters the polarization conversion element 37. That is, also in this embodiment, the compression rate $\alpha$ of the luminous flux in the XZ cross-section and the compression rate $\beta$ of the luminous flux in the YZ cross-section are different from each other.

When the focal lengths of the biconvex toric lens 33 in the XZ and YZ cross-sections are $T1x$ and $T1y$, respectively, and the focal lengths of the biconcave toric lens 34 in the XZ and YZ cross-sections are $T2x$ and $T2y$, respectively, their relationships are as follows:

$T1x/T1y > 1$ $T2x/T2y > 1$.

The compression rates $\alpha$ and $\beta$ in the XZ and YZ cross-sections are as follows:

$\alpha = T1x/T2x > 1$ $\beta = T1x/T2y > 1$.

Therefore, the compression rate ($\beta$) in the YZ cross-section is larger than that ($\alpha$) in the XZ cross-section.

In other words, when the compression rate in the XZ cross-section is $\alpha$ and the compression rate in the YZ cross-section is $\beta$ $\alpha/\beta < 1$ $(\alpha \neq 0)$.

As described above, in this embodiment, the parallel luminous flux emerging from the parabolic reflector 32 is converted into the converging luminous flux by the biconvex toric lens 33, and the compression rate of the luminous flux in the YZ cross-section larger than that in the XZ cross-section is obtained by using the difference of the focal lengths in the XZ and YZ cross-sections of the biconvex toric lens 33 and the biconcave toric lens 34.

Therefore, as in Embodiment 1, the illumination optical system can achieve a required compression rate of the luminous flux in the YZ cross-section while suppressing an increase of the thickness of each of the fly-eye lenses 35 and 37 and a resultant reduction of illumination efficiency. Thereby, the optical system for image projection can project a bright image while narrowing the angular distribution of the luminous flux in a direction in which the polarization beam splitter 39 is sensitive thereto (that is, in the direction of the YZ cross-section) to suppress unevenness of brightness and deterioration of contrast.

Further, the illumination optical system (or the optical system for image projection) also narrows the angular distribution of the luminous flux in a direction in which the polarization beam splitter 39 is not sensitive thereto (that is, in the direction of the XZ cross-section), thereby enabling to contribute to suppress the unevenness of brightness and the deterioration of contrast as compared to a case where the angular distribution is large in this direction.

Embodiment 4

Figure 17:
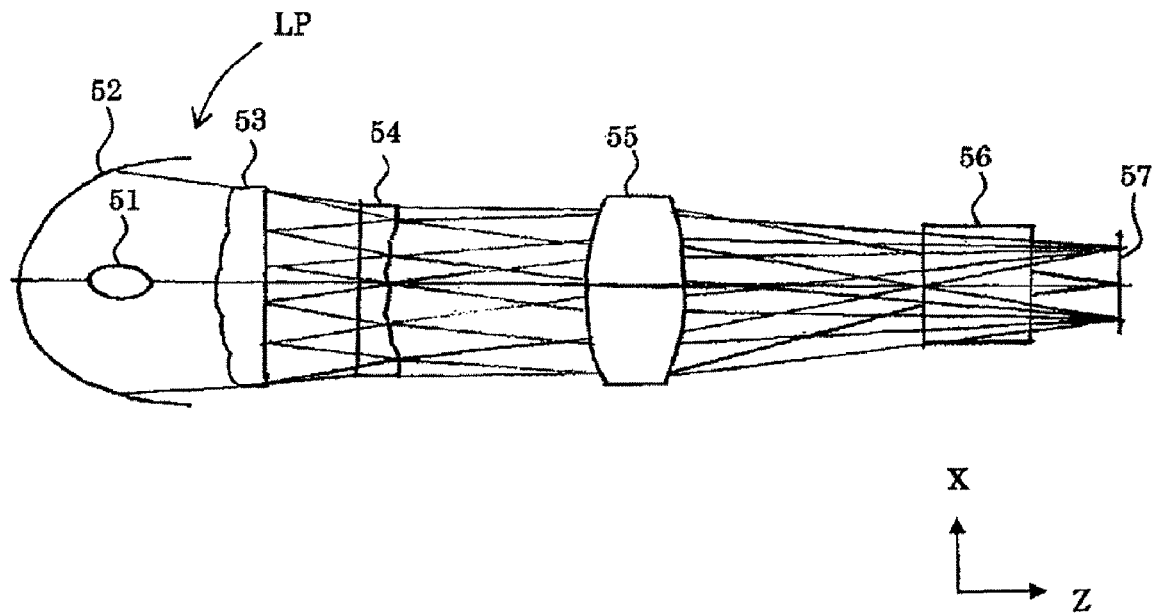
FIG. 17 is an XZ cross-sectional view showing an illumination optical system used in an optical system for image projection that is Embodiment 4 of the present invention.
Figure 18:
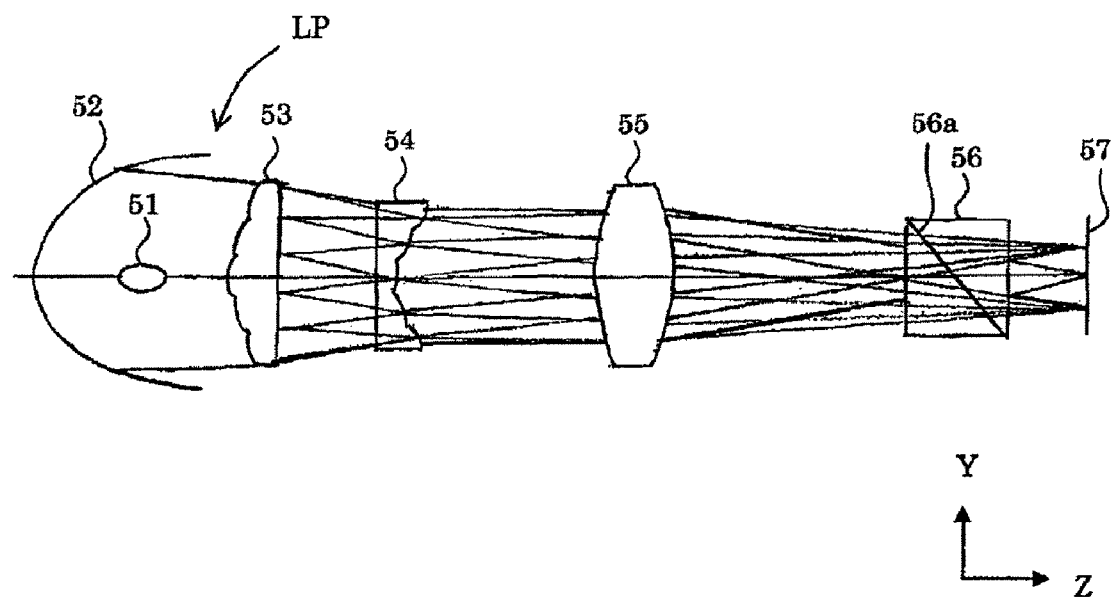
FIG. 18 is an enlarged YZ cross-sectional view showing the illumination optical system in Embodiment 4.

FIGS. 17 and 18 show the configuration of an illumination optical system used in an optical system for image projection that is Embodiment 4 of the present invention. FIG. 17 shows an XZ cross-section of the illumination optical system, and FIG. 18 shows a YZ cross-section thereof.

White light emitted from a light source 51 is reflected by an elliptic reflector 52 to be converted into a converging luminous flux. The converging luminous flux enters a first fly-eye lens 53. The light source 51 and the elliptic reflector 52 constitute a light source lamp LP. A parabolic reflector can be used instead of the elliptic reflector 52.

In this embodiment, each of plural lens cells constituting the first fly-eye lens 53 (except for the central lens cell) has different decentering amounts in the XZ and YZ cross-sections, which provides a biconvex toric lens function to the entire first fly-eye lens 53.

The luminous flux entering the first fly-eye lens 53 is divided into plural luminous fluxes, each being collected thereby. The luminous fluxes emerging from the first fly-eye lens 53 form secondary light source images at the vicinity of a second fly-eye lens 54 and an unshown polarization conversion element.

In this embodiment, each of plural lens cells constituting the second fly-eye lens 54 (except for the central lens cell) has different decentering amounts in the XZ and YZ cross-sections, which provides a biconcave toric lens function to the entire second fly-eye lens 54.

The plural divided luminous fluxes emerging from the polarization conversion element (that is, linearly-polarized light having a predetermined polarization direction) are condensed by a condenser lens 55, pass through a polarization beam splitting film (optical film surface or optical surface) 56*a* of a polarization beam splitter 56 and are then superposed with each other on a reflective liquid crystal panel 57.

The relationship of the focal lengths in the XZ and YZ cross-sections of the first fly-eye lens 53 as a biconvex toric lens and the relationship of the focal lengths in the XZ and YZ cross-sections of the second fly-eye lens 54 as a biconcave toric lens are the same as those in Embodiment 3.

That is, when the compression rate in the XZ cross-section is α and the compression rate in the YZ cross-section is β, $\alpha/\beta<1$ $(\alpha\neq 0)$.

Therefore, according to this embodiment, the similar effects to those in Embodiment 3 can be obtained.

In the above embodiments, the description was made of the illumination optical system using the polarization beam splitter. However, an illumination optical system using a dichroic prism or dichroic mirror having a dichroic film surface that inclines with respect to the optical axis thereof can use the luminous flux compression system of this embodiment in each of the above-described embodiments.

Table 1 shows the compression rates α, β and the value of α/β in each of Embodiments 1 to 4. However, similar effects to those in each of Embodiments 1 to 4 can be obtained if these values are changed in the ranges of the above-described conditional expressions. That is, for example, the compression rates in Embodiment 1 may be applied to those in other embodiments, and the compression rates in the other embodiments may be applied to those in Embodiment 1. Furthermore, the compression rates α, β in Table 1 may be applied to those in the later-described embodiments from Embodiment 5.

TABLE 1

|  | α | β | α/β |
| --- | --- | --- | --- |
| EMBODIMENT 1 | 1.21 | 1.67 | 0.72 |
| EMBODIMENT 2 | 1.12 | 1.29 | 0.87 |
| EMBODIMENT 3 | 1.38 | 1.83 | 0.75 |
| EMBODIMENT 4 | 1.40 | 1.59 | 0.88 |

Here, $\alpha/\beta<1$ is satisfied. More preferably $\alpha/\beta<0.95$, and still more preferably $\alpha/\beta<0.9$.

Regarding the lower limit, it is preferable that $\alpha/\beta>0.3$, more preferably $\alpha/\beta>0.5$, and still more preferably $\alpha/\beta>0.7$.

It is natural that $\alpha>1$, but more preferably $\alpha>1.05$, and still more preferably $\alpha>1.10$. On the other hand, it is natural that $\beta>1$, but more preferably $\beta>1.10$, and still more preferably $\beta>1.25$.

Embodiment 5

The description was made of the illumination optical system including the compression system that is provided closer to the light source than the polarization conversion element and has different compression rates in the XZ and YZ cross-sections in each of the above embodiments. However, a compression system having similar functions to those in each of the above-described embodiments may be provided closer to a polarization beam splitter than a polarization conversion element.

Also in this case, the compression system is configured such that the compression rate in the YZ cross-section is larger than that in the XZ cross-section.

According to each of the above-described embodiments, an optical system can be achieved which projects a bright image while suppressing deterioration of contrast.

In each of Embodiments 1 to 5, the compression rate is defined as a value obtained by dividing the outer diameter of the luminous flux at the point before entering into the compression system (or that immediately after emerging from the reflector) by that at the point immediately after emerging from the compression system.

However, the rate described as a 'compression rate' and an 'expansion rate' (these are hereinafter referred to as a 'conversion rate') which will be used in Embodiment 7 and subsequent embodiments have a meaning opposite thereto. That is, the compression rate and the expansion rate (the conversion rate) used in Embodiment 7 and subsequent embodiments is defined as a value obtained by dividing the outer diameter of the luminous flux at the point immediately after emerging from the compression system by that at the point before entering into the compression system (or that immediately after emerging from the reflector). The compression rate and the expansion rate (the conversion rate) may be, of course, defined using the focal length of the optical system in the compression system as described in Embodiment 7 and subsequent embodiments.

Further, the XZ and YZ cross-sections in Embodiments 1 to 5 and XZ and YZ cross-sections in Embodiments 7 to 15 denote cross-sections different from (or opposite to) each other. That is, the XZ cross-section in Embodiments 7 to 15 denotes a cross-section parallel to a normal to an optical surface (polarization beam splitting surface), and the YZ cross-section denotes a cross-section perpendicular to the XZ cross-section. These XZ and YZ cross-sections in Embodiments 7 to 15 are also parallel to the Z axis (or the optical axis of an illumination optical system).

On the basis of the definition used in Embodiment 7 and subsequent embodiments, the conversion rate in the XZ cross-section parallel to the normal to the optical surface (polarization beam splitting surface), which corresponds to the YZ cross-section in Embodiments 1 to 5, is defined as $\gamma$, and the conversion rate in the YZ cross-section perpendicular thereto, which corresponds to the XZ cross-section in Embodiments 1 to 5, is defined as $\delta$. In this case, the above Table 1 can be replaced by the following Table 1A.

In Table 1A, it is natural that $\gamma$ is smaller than 1. However, it is preferable that $\gamma$ be smaller than 0.90, and more preferable that $\gamma$ be smaller than 0.75. It is also natural that $\delta$ is smaller than 1. However, it is preferable that $\delta$ be smaller than 0.95, and more preferable that $\delta$ be smaller than 0.90. These are of course satisfied in Embodiments 1 to 5, and also in Embodiments 7 to 11. However, in Embodiments 12 to 15, a luminous flux is expanded, so that $\gamma$ and $\delta$ are larger than 1.

In addition, it is natural that $\gamma/\delta$ is smaller than 1. However, it is preferable that $\gamma/\delta$ be smaller than 0.95, and more preferable that $\gamma/\delta$ be smaller than 0.90. Furthermore, it is preferable that $\gamma/\delta$ be larger than 0.3, more preferable that $\gamma/\delta$ be larger than 0.5, and still more preferable that $\gamma/\delta$ be 0.6 or more. These are of course satisfied in Embodiments 1 to 5, and also in Embodiments 7 to 15.

TABLE 1A

|  | $\gamma$ | $\delta$ | $\gamma/\delta$ |
| --- | --- | --- | --- |
| EMBODIMENT 1 | 0.60 | 0.83 | 0.72 |
| EMBODIMENT 2 | 0.78 | 0.89 | 0.87 |
| EMBODIMENT 3 | 0.55 | 0.72 | 0.75 |
| EMBODIMENT 4 | 0.63 | 0.71 | 0.88 |

As described above, in Embodiments 7 and subsequent embodiments, the XZ cross-section is parallel to the normal to the optical surface (polarization beam splitting surface), and the YZ cross-section is perpendicular thereto. These definitions are opposite to those in Embodiments 1 to 5.

That is, $\gamma$ in Table 1A corresponds to the conversion rate (compression rate or expansion rate) in the XZ cross-section of Embodiments 7 and subsequent embodiments, and $\delta$ in Table 1A corresponds to the conversion rate in the YZ cross-section of Embodiments 7 and subsequent embodiments.

In other words, $\gamma$ in Table 1A corresponds to $\alpha$ and a collimating magnification HX in the XZ cross-section of Embodiments 7 and subsequent embodiments, and $\delta$ in Table 1A corresponds to $\beta$ and a collimating magnification HY in the YZ cross-section of Embodiments 7 and subsequent embodiments. Consequently, $\gamma/\delta$ in Table 1A is synonymous to $\alpha/\beta$ and HX/HY in Embodiments 7 and subsequent embodiments, and therefore it is preferable that the numerical value thereof be in a similar range.

Embodiment 6

Figure 19:
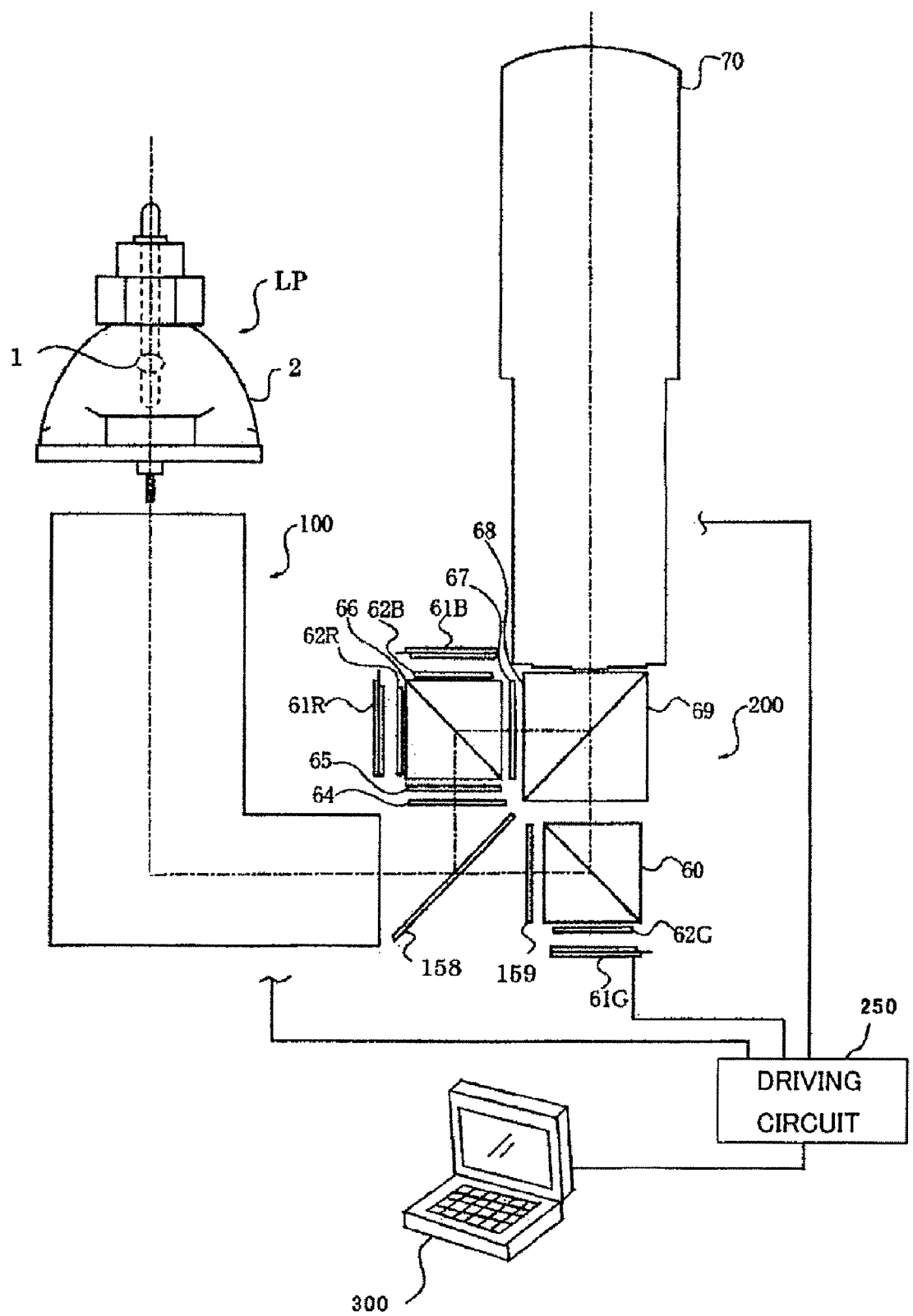
FIG. 19 is a YZ cross-sectional view showing the optical configuration of a liquid crystal projector that is Embodiment 6 of the present invention using one of the optical systems of Embodiments 1 to 5.
Figure 20:
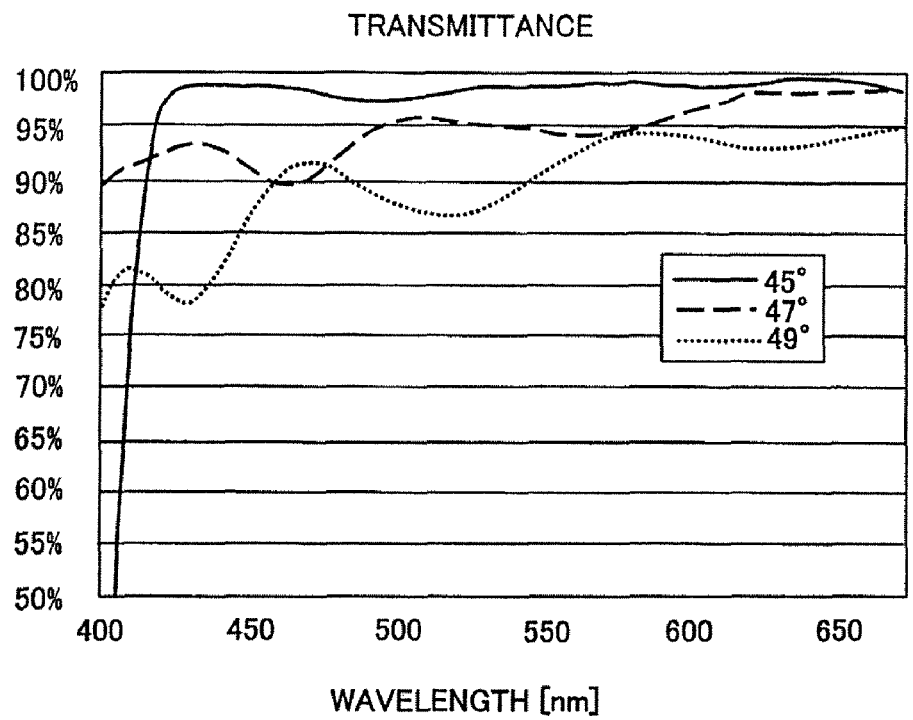
FIG. 20 is a figure showing transmittance characteristic of a polarization beam splitter.
Figure 21:
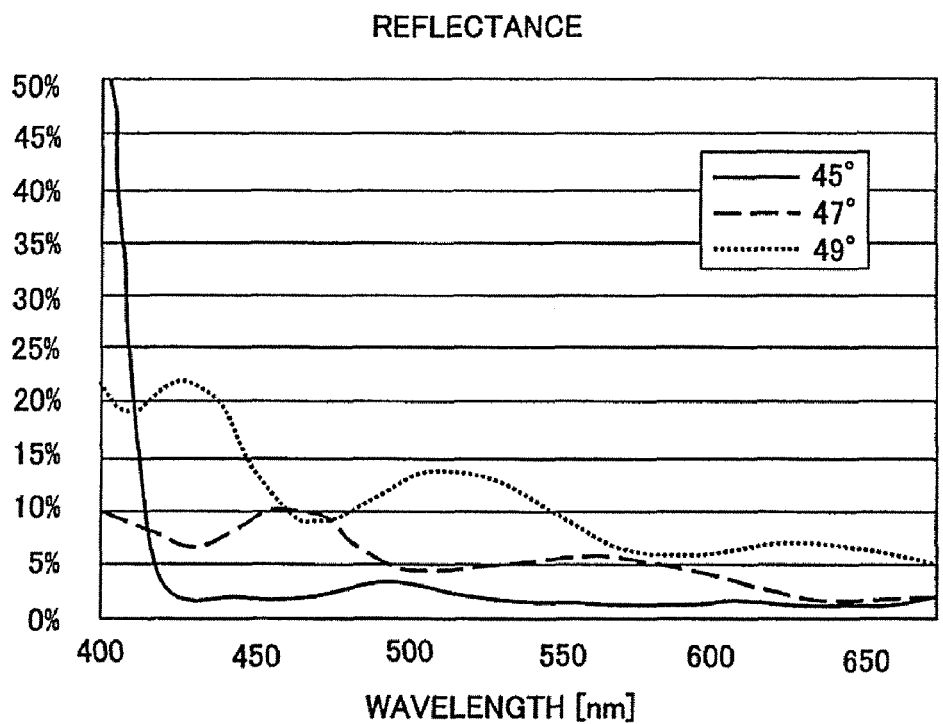
FIG. 21 is a figure showing reflectance characteristic of a polarization beam splitter.

FIG. 19 shows the configuration of a liquid crystal projector (image projection apparatus) using the optical system for image projection including the illumination optical system described in Embodiment 1. FIG. 19 shows a cross-section including the YZ cross-section in Embodiment 1. In this liquid crystal projector, the illumination optical system described in each of Embodiments 2 to 5 can be used instead of the illumination optical of Embodiment 1.

In this figure, reference numeral 1 shows a light source which emits white light in a continuous spectrum, and 2 an elliptic reflector which reflects and collects the light from the light source 1 in a predetermined direction. The light source 1 and the elliptic reflector 2 constitute a light source lamp LP.

Reference numeral 100 shows part of the illumination optical system in which the light source lamp LP and the polarization beam splitter 7 are omitted.

Reference numeral 158 shows a dichroic mirror which reflects light in a wavelength region of blue (B: 430 to 495 nm) and red (R: 590 to 650 nm) and transmits light in a wavelength region of green (G: 505 to 580 nm). The above wavelength regions of R, G and B are examples, and therefore the actual wavelength regions are not limited thereto. Each of the wavelength regions of R, G and B has only to have a width of 40 nm or more within the above region. The light in the wavelength region of R, the light in the wavelength region of G and the light in the wavelength region of B are hereinafter referred to as the R light, the G light and the B light, respectively.

Reference numeral 159 shows an entrance-side polarizing plate for G which is formed by attaching a polarizing element to a transparent substrate and transmits only S-polarized light. Reference numeral 60 shows a first polarization beam splitter which transmits P-polarized light and reflects S-polarized light at its polarization beam splitting surface (a polarization beam splitting film) constituted by a multi-layer film.

Reference numerals 61R, 61G and 61B show reflective liquid crystal panels (or light modulation elements or image-forming elements) for R, G and B, respectively, each of which reflects and image-modulates entering light.

Reference numeral 64 shows an entrance-side polarizing plate for G and B which is formed by attaching a polarizing element to a transparent substrate and transmits only s-polarized light.

Reference numeral 65 shows a first color-selective phase plate which rotates the polarization direction of the B light by 90 degrees and does not rotate the polarization direction of the R light. Reference numeral 66 shows a second polarization beam splitter which transmits P-polarized light and reflects S-polarized light at its polarization beam splitting surface. Reference numeral 67 shows a second color-selective phase plate which rotates the polarization direction of R light by 90 degrees and does not rotate the polarization direction of the B light.

Reference numeral 68 shows an emergence-side polarizing plate (a polarizing element) for R and B which transmits only S-polarized light. Reference numeral 69 shows a third polarization beam splitter which transmits P-polarized light and reflects S-polarized light at its polarization beam splitting surface.

The abovementioned components from the dichroic mirror 158 to the third polarization beam splitter 69 constitute a color separation/combination optical system 200.

Reference numeral 70 shows a projection lens (or a projection optical system). The abovementioned illumination optical system 100, color separation/combination optical system 200 and projection lens 70 constitute an optical system for image projection. The projection lens 70 may include both of a mirror and a lens, or only a mirror, or a diffraction optical element.

Next, the optical effects after passage of light through the illumination optical system 100 will be described. The optical path of G light will be described first.

The G light transmitted through the dichroic mirror 158 enters the entrance-side polarizing plate 159. The G light remains S-polarized light after the separation by the dichroic mirror 158. After the G light emerges from the entrance-side polarizing plate 159, it enters as S-polarized light the first polarization beam splitter 60, reflected by its polarization beam splitting surface, and reaches the reflective liquid crystal panel 61G for G.

A liquid crystal driving circuit 250 provided in the projector is connected to an image supply apparatus 300 such as a personal computer, DVD player and a television tuner. The projector and the image supply apparatus 300 constitute an image display system. The liquid crystal driving circuit 250 drives the liquid crystal panels 61R, 61G and 61B on the basis of image (video) information received from the image supply apparatus 300 to cause the liquid crystal panels 61R, 61G and 61B to form original images for respective colors. Each of the reflective liquid crystal panels 61R, 61G and 61B image-modulates and reflects the entering light.

Of the G light after being image-modulated, an s-polarized light component is again reflected by the polarization beam splitting surface of the first polarization beam splitter 60 and returned toward the light source side to be removed from light for projection. On the other hand, of the G light after being image-modulated, a P-polarized light component is transmitted through the polarization beam splitting surface of the first polarization beam splitter 60 and proceeds as projection light toward the third polarization beam splitter 69.

When all the polarized light components are converted into S-polarized light (that is, when black is displayed), the slow axis of the quarter-phase plate 62G provided between the first polarization beam splitter 60 and the reflective liquid crystal panels 61G for G can be adjusted in a predetermined direction to reduce the influence of a disturbed polarization state generated in the first polarization beam splitter 60 and the reflective liquid crystal panel 61G for G.

The G light emerging from the first polarization beam splitter 60 enters as P-polarized light the third polarization beam splitter 69, is transmitted through the polarization beam splitting surface of the third polarization beam splitter 69, and reaches the projection lens 70.

Meanwhile, the R light and the B light reflected by the dichroic mirror 158 enter the entrance-side polarizing plate 64. It should be noted that the R light and B light remain S-polarized light after the separation by the dichroic mirror 158. After the R light and B light emerge from the entrance-side polarizing plate 64, they enter the first color-selective phase plate 65.

The first color-selective phase plate 65 has the function of rotating the polarization direction of the B light by 90 degrees. This causes the B light and the R light to enter the second polarization beam splitter 66 as P-polarized light and S-polarized light, respectively. The R light entering the second polarization beam splitter 66 as S-polarized light is reflected by a polarization beam splitting surface of the second polarization beam splitter 66 and reaches the reflective liquid crystal panel 61R for R.

The B light entering the second polarization beam splitter 66 as P-polarized light is transmitted through the polarization beam splitting surface of the second polarization beam splitter 66 and reaches the reflective liquid crystal panel 61B for B.

The R light entering the reflective liquid crystal panel 61R for R is subjected to image modulation and reflected. Of the R light after the image modulation, an S-polarized light component is again reflected by the polarization beam splitting surface of the second polarization beam splitter 66 and returned toward the light source side to be removed from light for projection. On the other hand, of the R light after the image modulation, a P-polarized light component is transmitted through the polarization beam splitting surface of the second polarization beam splitter 66 and is directed as light for projection toward the second color-selective phase plate 67.

The B light entering the reflective liquid crystal panel 61B for B is subjected to image modulation and reflected. Of the B light after the image modulation, a P-polarized light component is again transmitted by the polarization beam splitting surface of the second polarization beam splitter 66 and returned toward the light source side to be removed from light for projection. On the other hand, of the B light after the image modulation, an S-polarized light component is reflected by the polarization beam splitting surface of the second polarization beam splitter 66 and is directed as light for projection toward the second color-selective phase plate 67.

In this case, the slow axis of each of the quarter-wave plates 62R and 62B provided between the second polarization beam splitter 66 and the reflective liquid crystal panels 61R and 61B for R and B can be adjusted to make an adjustment of display of black in each of the R and B light as in the G light.

In the projection light of R and B combined into one luminous flux and emerging from the second polarization beam splitter 66, the polarization direction of the R light is rotated by 90 degrees and converted into an S-polarized light component by the second color-selective phase plate 67, and the resulting light is analyzed by the emergence-side polarizing plate 68 and enters the third polarization beam splitter 69.

The B light is transmitted through the second color-selective phase plate 67 as S-polarized light without change, and the light is analyzed by the emergence-side polarizing plate 68 and enters the third polarization beam splitter 69.

The analysis by the emergence-side polarizing plate 68 realizes the projection light of R and B which excludes invalid components produced from the transmission through the second polarization beam splitter 66, the reflective liquid crystal panels 61R and 61B for R and B, and the quarter-wave plates 62R and 62B.

The projection light for R and B entering the third polarization beam splitter 69 is reflected by the polarization beam splitting surface of the third polarization beam splitter 69 and combined with the abovementioned G light transmitted through that polarization beam splitting surface. The resulting light reaches the projection lens 70.

Thus, the combined projection light for R, G, and B (that is a color image) is enlarged and projected on a projection surface such as a screen by the projection lens 70.

Since the optical paths described above are used when the reflective liquid crystal panels operate for white display, description will hereinafter be made of the optical effects when the reflective liquid crystal panels operate for black display.

The optical path of the G light will be described first. The G light that is S-polarized light transmitted through the dichroic mirror 158 enters the entrance-side polarizing plate 159. Then, the G light enters the first polarization beam splitter 60, reflected by the polarization beam splitting surface thereof, and reaches the reflective liquid crystal panel 61G for G. However, the reflective liquid crystal panel 61G operates for black display, the G light is reflected without image modulation.

As a result, the G light remains the S-polarized light after it is reflected by the reflective liquid crystal element 61G. Therefore, the G light is reflected again by the polarization beam splitting surface of the first polarization beam splitter 60, transmitted through the entrance-side polarizing plate 159, and returned toward the light source to be removed from projection for light.

Next, the optical paths of the R light and B light will be described. The R light and B light that are S-polarized light reflected by the dichroic mirror 158 enter the entrance-side polarizing plate 64. After the R light and B light emerge from the entrance-side polarizing plate 64, they enter the first color-selective phase plate 65. The first color-selective phase plate 65 has the function of rotating only the polarization direction of the B light by 90 degrees. This causes the B light and R light to enter the second polarization beam splitter 66 as P-polarized light and S-polarized light, respectively.

The R light entering the second polarization beam splitter 66 as S-polarized light is reflected by the polarization beam splitting surface of the second polarization beam splitter 66 and reaches the reflective liquid crystal panel 61R for R. The B light entering the second polarization beam splitter 66 as P-polarized light is transmitted through the polarization beam splitting surface of the second polarization beam splitter 66 and reaches the reflective liquid crystal panel 61B for B.

Since the reflective liquid crystal panel 61R for R operates for black display, the R light entering the reflective liquid crystal panel 61R for R is reflected without image modulation.

As a result, the R light remains the S-polarized light after it is reflected by the reflective liquid crystal panel 61R for R. Therefore, the R light is reflected again by the polarization beam splitting surface of the second polarization beam splitter 66, transmitted through the entrance-side polarizing plate 64, and returned toward the light source to be removed from projection for light.

On the other hand, since the B light entering the reflective liquid crystal panel 61B for B is reflected without image modulation since the reflective liquid crystal panel 61B for B operates for black display. Thus, the B light remains the P-polarized light after it is reflected by the reflective liquid crystal panel 61B for B. Therefore, the B light is transmitted again by the polarization beam splitting surface of the second polarization beam splitter 66, converted into S-polarized light by the first color-selective phase plate 65, transmitted through the entrance-side polarizing plate 64, and returned toward the light source to be removed from projection for light.

Thus, black is displayed on the projection surface.

Although the color separation/combination optical system 200 includes the wavelength selective phase plate in this embodiment, the wavelength selective phase plate can be removed therefrom. In this case, the polarization beam splitter in the color separation/combination optical system 200 may be configured such that its polarization beam splitting film functions as a polarization beam splitting surface for a certain wavelength range in the visible wavelength region and as a transmissive or reflective surface for the other wavelength range irrespective of polarization directions.

Further, a quarter-phase plate may be provided between the color separation/combination optical system 200 and the projection lens 70 such that light reflected by a lens surface in the projection lens 70 and then returned to the quarter-phase plate is prevented from being re-reflected thereby and returned again in a screen direction.

Furthermore, although this embodiment uses three liquid crystal panels, one, two, four or more liquid crystal panel(s) can be used.

Moreover, the fly-eye lens in the embodiments may be constituted by two cylindrical lenses adjacent to each other or two cylindrical lenses cemented with each other.

Embodiment 7

Figure 22:
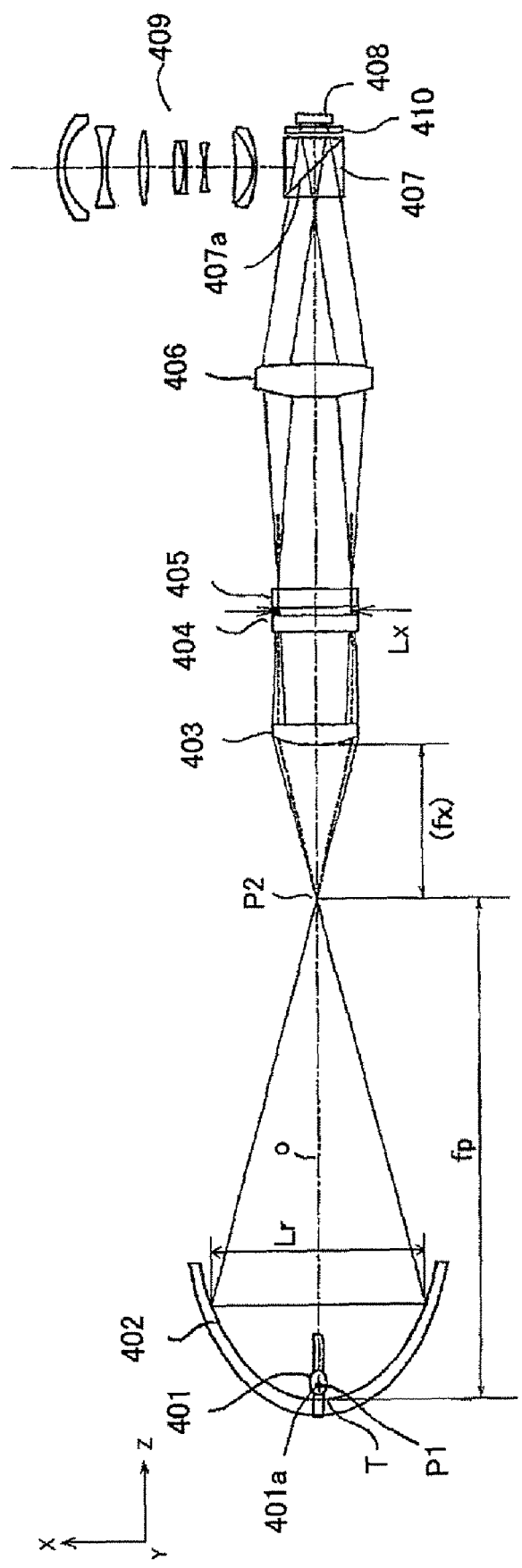
FIG. 22 is an XZ cross-sectional view showing an illumination optical system used in an optical system for image projection that is Embodiment 7 of the present invention.
Figure 23:
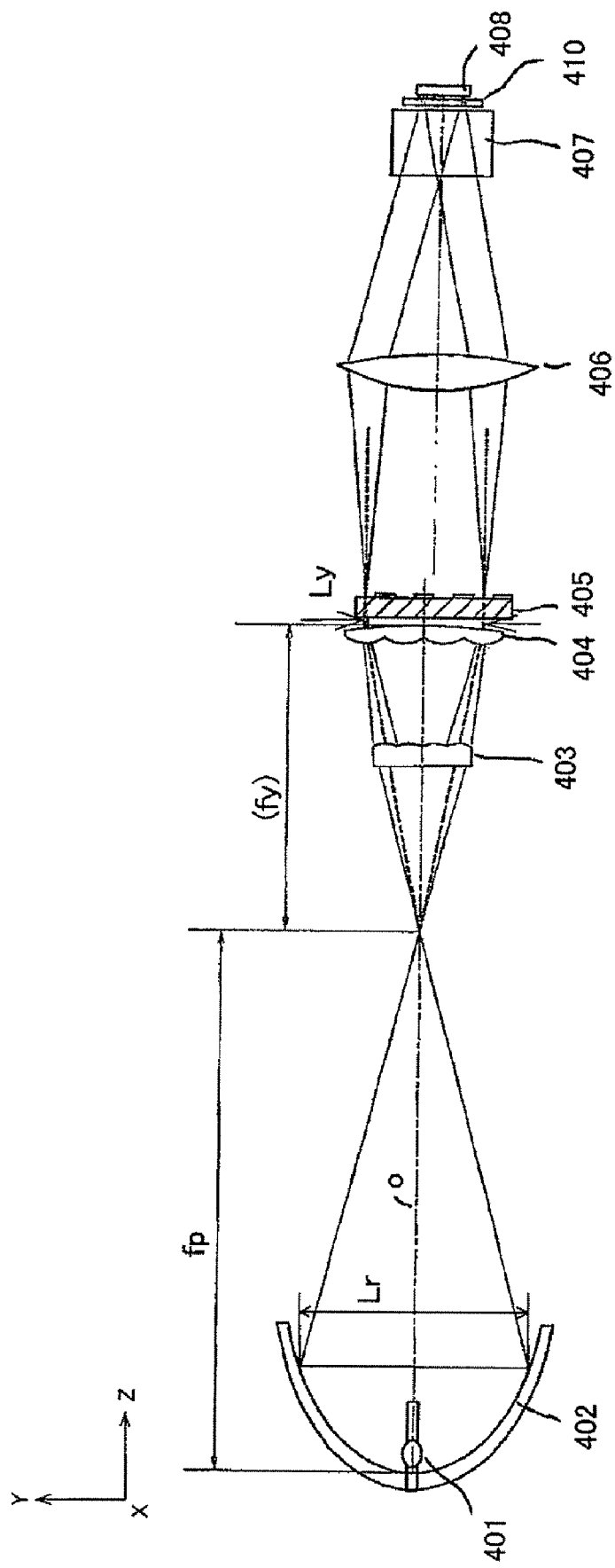
FIG. 23 is a YZ cross-sectional view showing the illumination optical system in Embodiment 7.

FIGS. 22 and 23 show the configuration of a projector using an optical system for image projection that is Embodiment 7 including an illumination optical system. In the following embodiments, the definition of XZ and YZ cross-sections and the meaning of the compression rate are different from those in Embodiments 1 to 6.

In these figures, reference numeral 401 shows a light source such as a high-pressure mercury discharge tube, and 402 an elliptic reflector (an elliptic mirror) as a luminous flux collector. The light-emitting surface 401a of the light source 401 is provided at a first focal point P1 of the elliptic reflector 402.

Luminous flux radially emitted from the light source 401 is converted into a converging luminous flux by the elliptic reflector 402 to be collected at a second focal point P2 of the elliptic reflector 402.

A combination of a parabolic reflector and a positive lens can be used instead of the elliptic reflector 402.

A distance fp from a vertex T of the elliptic reflector 402 to the second focal point P2 thereof corresponds to the focal length of the elliptic reflector (or the luminous flux collector) 402. That is, the elliptic reflector 402 collects the luminous flux from the light source 401 at the second focal point P2 closer to the light source 401 than a first lens array 403. The second focal point P2 herein means a position at which the luminous flux from the light source 401 is collected, and corresponds to a light-collecting point (light-collecting position) in a case where the elliptic reflector 402 is not used.

The luminous flux from the second focal point P2 is divided into plural luminous fluxes by the first lens array 403 which is provided closer to a polarization conversion element 405 than the second focal point P2. The divided luminous fluxes pass through a second lens array 404 and then form plural secondary light source images at the vicinity, or on a light-entrance side of the polarization conversion element 405, or on a light-emergence side thereof.

The luminous flux that formed each secondary light source image is converted into linearly-polarized light having a predetermined polarization direction by the polarization conversion element 405 and then enters a condenser lens 406.

The divided luminous fluxes emerging from the condenser lens 406 are transmitted through a polarization beam splitting surface (optical film surface or optical surface) 407a of a polarization beam splitter 407 and then superposed with each other on a liquid crystal panel 408. Thereby, the liquid crystal panel 408 is illuminated with an illumination luminous flux having an even intensity distribution.

The light image-modulated and reflected by the liquid crystal panel 408 is reflected by the polarization beam splitting surface 407a of the polarization beam splitter 407 to be introduced to a projection lens 409.

Although only one liquid crystal panel 408 is shown in this embodiment, an actual and general projector has three liquid crystal panels for red (R), green (G) and blue (B). The polarization beam splitter 407 constitutes part of a so-called color separation/combination optical system which respectively introduces illumination light of R, illumination light of G and illumination light of B to the three liquid crystal panels, and combines image light of R, image light of G and image light of B from the three liquid crystal panels.

In FIG. 22, a first cross-section (or an XZ cross-section) is shown which includes a normal to the polarization beam splitting surface 407a of the polarization beam splitter 407 and an optical axis o of the illumination optical system.

The optical axis o is defined by, for example, an axis line passing through the center of the condenser lens 406 and the center of the panel surface of the liquid crystal panel 408, and corresponds to a Z-axis.

In FIG. 23, a second cross-section (or a YZ cross-section) is shown which is perpendicular to the first cross-section including the optical axis o of the illumination optical system.

The XZ cross-section shown in FIG. 22 is a cross-section parallel to the short side of the liquid crystal panel 408 having a rectangular shape, and the YZ cross-section shown in FIG. 23 is a cross-section parallel to the long side of the liquid crystal panel 408.

In other words, the XZ cross-section is a cross-section parallel to a normal to the polarization beam splitting surface 407a and a normal to the panel surface (entrance/emergence surface) of the liquid crystal panel 408. The YZ cross-section is a cross-section perpendicular to the XZ cross-section and parallel to the Z-axis (the optical axis). The definitions for the Z-axis, XZ cross-section and YZ cross-section are applied also to the later-described embodiments.

The illumination optical system uses the luminous flux from the light source 401 to illuminate the reflective liquid crystal panel (hereinafter merely referred to as a liquid crystal panel) 408 as a reflective image-forming element that is placed on an illuminated surface with the illumination luminous flux through the polarization beam splitter 407. The luminous flux (image light) image-modulated by the liquid crystal panel 8 is introduced to the projection lens (or the projection optical system) 409 through the polarization beam splitter 407 again to be projected onto a projection surface such as a screen.

In the first cross-section (that is the XZ cross-section) shown in FIG. 22, the light-entrance surface of the first lens array 403 is formed as a cylindrical surface having a positive refractive power only in the first cross-section. The light-emergence surface of the first lens array 403 is formed as a lens array surface. The light-entrance surface of the second lens array 404 is formed as a lens array surface. The light-emergence surface of the second lens array 404 is formed as a surface having no refractive power.

In the second cross-section (that is the YZ cross-section) shown in FIG. 23, the light-entrance surface of the first lens array 403 is formed as a surface having no refractive power. The light-emergence surface of the first lens array 403 is formed as a lens array surface. The light-entrance surface of the second lens array 404 is formed as a lens array surface. The light-emergence surface of the second lens array 404 is formed as a cylindrical surface having a positive refractive power only in the second cross-section.

In the first cross-section, when the focal length of the cylindrical surface of the first lens array 403 is fx, the distance from the second focal point P2 to the first lens array 403 is fx. A diverging luminous flux from the second focal point P2 passes through the first lens array 403 to become a parallel luminous flux, and the parallel luminous flux passes through the second lens array 404 and the polarization conversion element 405 to enter the condenser lens 406.

The parallel luminous flux in this embodiment includes not only a completely parallel luminous flux but also a luminous flux that can be regarded as a parallel luminous flux in view of optical performance.

In FIG. 22, dotted lines show a luminous flux passing through the center of the first lens array 403 (that is, a luminous flux proceeding on the optical axis o). Solid lines show luminous fluxes passing through portions other than the center of the first lens array 403. FIG. 22 shows the superposition of the luminous fluxes shown by the solid lines on the liquid crystal panel 408. In the first cross-section, the first lens array 403 acts as a collimator.

In the second cross-section shown in FIG. 23, when the focal length of the cylindrical surface as the light-emergence surface of the second lens array 404 is fy, the distance (air equivalent value) from the second focal point P2 to the second lens array 404 is fy.

Therefore, of the diverging luminous flux from the second focal point P2, a luminous flux passing through the center of the cylindrical surface (the light-emergence surface) of the first lens array 403 and the center of the cylindrical surface (the light-entrance surface) of the second lens array 404 emerges from the light-emergence surface of the second lens array 404 to become a parallel luminous flux.

The light-emergence surface of the first lens array 403 and the light-entrance surface of the second lens array 404 cause the plural divided luminous fluxes to form plural light source images on a focal plane of the condenser lens 406.

The plural luminous fluxes from the plural light source images pass through the polarization conversion element 405 and are then superposed on the liquid crystal panel 408 by the condenser lens 406.

In the second cross-section, the second lens array 404 acts as a collimator.

Figure 39:
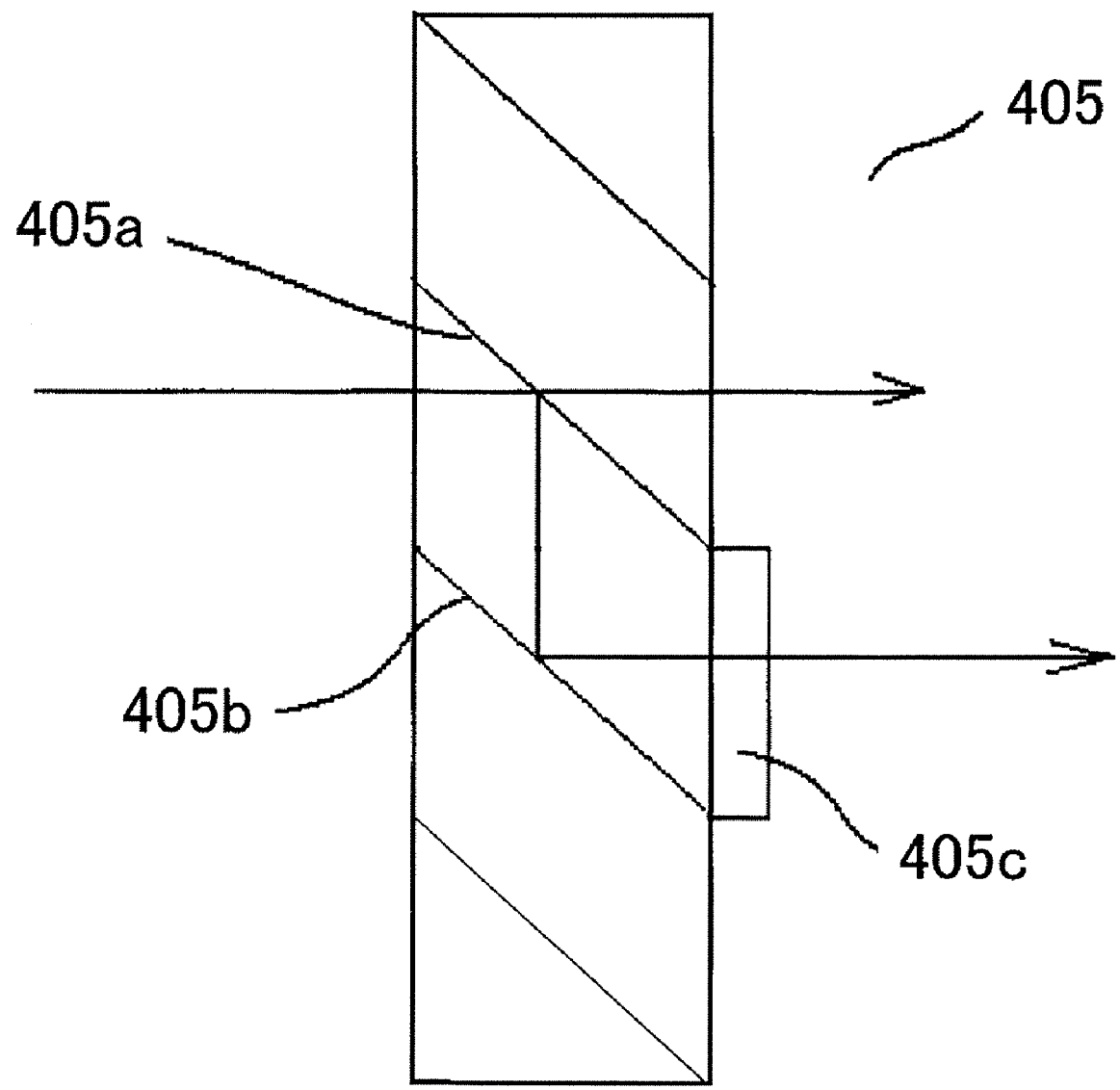
FIG. 39 is an explanatory figure showing a polarization conversion element in the embodiments.

FIG. 39 shows part of the polarization conversion element 405. The polarization conversion element 405 is provided on the light-emergence side of the collimator or in the optical path of the collimator.

The polarization conversion element 405 includes plural polarization beam splitting surface 405a, plural reflective surface 405b and plural half-wave plates 405c. Specifically, the polarization conversion element 405 is an array type optical element in which plural polarization conversion element portions, each of which includes the polarization beam splitting surface 405a, the reflective surface 405b and the half-wave plate 405c, are arranged in a direction substantially perpendicular to the optical axis. A polarization beam splitting surface can be used instead of the reflective surface 405b. Thus, the polarization conversion element 405 herein may be referred to as a polarization conversion element array.

Of the light entering each of the polarization beam splitting surfaces 405a, a polarized light component having the predetermined polarization direction passes therethrough to emerge from the polarization conversion element 405.

On the other hand, of the light entering each of the polarization beam splitting surfaces 405a, a polarized light component having a polarization direction perpendicular to the above predetermined polarization direction is reflected thereby and then reflected by the reflective surface 405b. Further, the polarization direction of the polarized light component is rotated by 90 degrees by the half-wave plate 405c, and the light component then emerges from the polarization conversion element 405. The polarization conversion element 405 converts in this way the entering non-polarized light into the linearly-polarized light having the predetermined polarization direction.

The half-wave plate 405c may be provided only in the optical path of the light transmitted through the polarization beam splitting surface 405a. The polarization conversion element 405 may convert non-polarized light into linearly-polarized light component in each color, and in this case the polarization directions of the linearly-polarized light components may not be necessarily the same.

In other words, the polarization conversion element 405 may cause the polarization direction of one of red, green and blue light components to differ from those of the other two light components such that, for example, the red light component is S-polarized light with respect to the polarization beam splitter 407 and the green and blue light components are P-polarized light with respect thereto.

Specifically, this is achieved by providing to the polarization beam splitting surface 405a a characteristic which reflects green and blue S-polarized light and red P-polarized light and transmits green and blue P-polarized light and red S-polarized light, and by providing a half-wave plate 405c in the optical path for the light reflected by the polarization beam splitting surface 405a.

The converging luminous flux reflected by the elliptic reflector (or the first optical element) 402 is converted into a parallel luminous flux by the first lens array (or the second optical element) 403 in the XZ cross-section shown in FIG. 22 and into a parallel luminous flux by the second lens array (or the third optical element) 404 in the YZ cross-section shown in FIG. 23.

That is, a compression of luminous flux in the XZ cross-section is performed by a compression system which is constituted by the elliptic reflector 402 and the first lens array 403, and a compression of luminous flux in the YZ cross-section is performed by a compression system which is constituted by the elliptic reflector 402 and the second lens array 404.

As described above, in this embodiment, the converging luminous flux is produced by the elliptic reflector 402, and a compression rate (or a collimating magnification) of the luminous flux in the XZ cross-section larger than that in the YZ cross-section is obtained by using the difference between a distance from the elliptic reflector 402 to the first lens array 403 and a distance from the elliptic reflector 402 to the second lens array 404.

Thus, it is unnecessary to make the decentering amount of each of lens cells constituting each of the lens arrays 403 and 404 large as compared to a conventional configuration in which a drastic compression of luminous flux is made between the first and second lens arrays.

Therefore, an increase of the thickness of each of the lens arrays 403 and 404 in the optical axis direction can be suppressed. As a result, the illumination optical system can reduce aberrations generated in each lens array and achieve a required compression rate (or a required collimating magnification) of the luminous flux in the XZ cross-section without a large reduction of illumination efficiency. Thereby, the optical system for image projection can project a bright image while narrowing the angular distribution of the luminous flux in a direction in which the polarization beam splitter 407 is sensitive thereto (that is, in a direction of the XZ cross-section) to suppress unevenness of brightness and deterioration of contrast.

Further, the illumination optical system (or the optical system for image projection) also narrows the angular distribution of the luminous flux in a direction in which the polarization beam splitter 407 is not sensitive thereto (that is, in a direction of the YZ cross-section), thereby enabling to contribute to suppress the unevenness of brightness and the deterioration of contrast as compared to a case where the angular distribution is large in this direction.

In this embodiment, the angular distribution of the luminous flux entering the panel surface of the liquid crystal panel 408 in the YZ cross-section shown in FIG. 23 which is parallel to the long side of the liquid crystal panel 408 is larger than that in the XZ cross-section shown in FIG. 22 which is parallel to the short side of the liquid crystal panel 408.

In this embodiment, the collimators (or the lens arrays, or the second and third optical elements) 403 and 404 are provided between the light source 401 and the polarization beam splitter 407, the collimators respectively compressing the luminous flux in the first (XZ) and second (YZ) cross-sections perpendicular to each other in the illumination optical system. The compression rate (or the collimating magnification) that is obtained by the collimator 403 in the first cross-section and the compression rate that is obtained by the collimator 404 in the second cross-section are different from each other.

The compression of luminous flux is an optical action that reduces the diameter (in other words, the width) of the luminous flux by the luminous flux collector (or the elliptic reflector) 402 and then collimates the luminous flux by the collimator 403 or 404.

The compression rate is defined as a ratio L/Lr of the luminous flux diameter L (Lx in the XZ cross-section and Ly in the YZ cross-section) at a position immediately after emerging from the collimator 403 or 404 to the luminous flux diameter Lr at the reflecting position on the luminous flux collector 402.

When the compression rate in the first cross-section is $\alpha$ and the compression rate in the second cross-section is $\beta$, $$\alpha = Lx/Lr$$

$$\beta = Ly/Lr,$$

wherein, $$\alpha \neq \beta$$

$$\alpha < 1, \beta < 1$$

$$\alpha < \beta$$

$$\alpha/\beta < 1.$$

That is, the compression rate $\alpha$ in the first cross-section shown in FIG. 22 is smaller than the compression rate $\beta$ in the second cross-section shown in FIG. 23.

For example, $$\alpha = 0.6$$

$$\beta = 0.83.$$

$$\alpha/\beta = 0.72.$$

In this embodiment, each optical element has a setting such that:

$$\alpha/\beta \leq 0.75$$

is satisfied.

More preferably, each optical element may have a setting such that:

$$0.5 < \alpha/\beta \leq 0.75$$

is satisfied.

Here, the compression rate (conversion rate) $\alpha$ in the first cross-section, the compression rate (conversion rate) $\beta$ in the second cross-section and the ratio $\alpha/\beta$ may be replaced by the collimating magnifications HX and HY in the first and second cross-sections and HX/HY, respectively.

Therefore, HX and HY described hereinafter have approximately the same meanings as those of the compression rates (conversion rates) α (γ) and β (δ) and the conditional expressions relating to α (γ), β (δ) and α/β (γ/δ) can be applied to HX, HY and HX/HY.

Consequently, it is natural that HX/HY is smaller than 1 as the numerical range of γ/δ. However, it is preferable that HX/HY be smaller than 0.95, more preferable that HX/HY be smaller than 0.90, and still more preferable, as described above, that HX/HY be 0.75 or less. Furthermore, it is preferable, as described above, that HX/HY be larger than 0.5, more preferable that HX/HY be 0.6 or more. However, it is only necessary that HX/HY be larger than 0.3 as with γ/δ.

Further, in this embodiment, the collimating magnification HX in the first cross-section (the XZ cross-section) and the collimating magnification HY in the second cross-section (the YZ cross-section) are as follows.

The first collimating magnification (the compression rate) HX in the first cross-section shown in FIG. 22 is expressed as:

$$HX=|fx/fp|.$$

The second collimating magnification HY in the second cross-section shown in FIG. 23 is expressed as:

$$HY=|fy/fp|.$$

As shown in FIGS. 22 and 23, the second lens array 404 is farther from the second focal point P2 than the first lens array 403, so that:

$$|fy|>|fx|.$$

Consequently, the HX and HY satisfy the following condition:

$$HY>HX.$$

Thereby, the luminous flux from the luminous flux collector 402 is compressed at different compression rates in the first and second cross-sections and thereby converted into a luminous flux having different widths (or diameters) in these cross-sections.

In this embodiment, the polarization conversion element 405 is configured such that the plural polarization conversion element portions are arrayed in the second cross-section shown in FIG. 23 in which the luminous flux width is wider, and the polarization beam splitter 407 is configured such that the polarization beam splitting surface 407a folds the luminous flux in a direction of the first cross-section shown in FIG. 22 in which the luminous flux width is narrower. This enables to improve contrast without a reduction of brightness at the polarization beam splitting surface 407a.

Furthermore, the collimator for the XZ cross-section which compresses the luminous flux width in the XZ cross-section and the collimator for the YZ cross-section which compresses the luminous flux width in the YZ cross-section may be constituted by the same optical elements, or include the same optical elements as part of them, or be constituted by different optical elements.

The collimators in this embodiment are provided between the light source and the polarization conversion element and compress the luminous flux diameter at the reflecting point by the reflector in the XZ and YZ cross-sections. Thereby, the luminous flux diameter can be narrowed at the pupil position (light source image forming position) of the illumination optical system introducing the light from the light source to the liquid crystal panel.

In addition, a difference in at least one of the position and optical power of the optical elements in the XZ and YZ cross-sections causes the luminous flux diameter to differ from each other at the entering point into the polarization conversion element (in other words, at the emerging point from the collimators) in the XZ and YZ cross-sections. That is, the collimators including the above difference cause the compression rates of the luminous flux diameter to differ from each other in the XZ and YZ cross-sections.

The description is made mainly of the case where the collimator is provided closer to the light source than the polarization conversion element in this embodiment. However, the collimator may be provided closer to the liquid crystal panel (or the projection lens) than the polarization conversion element.

In this case, the collimator for the YZ cross-section which compresses the luminous flux diameter in the YZ cross-section may be provided closer to the light source than the pupil position (light source image forming position) in the YZ cross-section of the illumination optical system, and the collimator for the XZ cross-section which compresses the luminous flux diameter in the XZ cross-section may be provided closer to the light source than the pupil position (light source image forming position) in the XZ cross-section of the illumination optical system. These are also applied to the later-described embodiments.

As an alternative embodiment, an expansion of an entering luminous flux at different rates in the first and second cross-sections may be performed instead of the compression by the collimators 403 and 404 in this embodiment. In this case, instead of the compression system constituted by the luminous flux collector 402 and collimators 403, 404 in this embodiment, an expansion system constituted by a luminous flux diverger which has a negative refractive power (or a negative optical power) to diverge a luminous flux and a collimator which has a positive refractive power to collimate the luminous flux from the luminous flux diverger is used.

This configuration using the luminous flux diverger and the collimator is suitable for a case where a light source and a reflector reflecting a luminous flux from the light source are small in their outer diameters, such as a case where the outer diameters are smaller than the size of the liquid crystal panel (or the image-forming element) or than a half thereof.

In the case of the expansion of luminous flux, expansion rates in the first and second cross-sections are HXX and HYY, respectively. In this case, the expansion rate in the second cross-section larger than the expansion rate in the first cross-section enables to obtain similar effects to those in the case of the compression of luminous flux.

That is, the similar effects can be obtained by satisfying the following condition:

$$HXX<HYY.$$

The expansion rate and the compression rate can be referred to as a conversion rate that is a rate at which the luminous flux diameter (or the luminous flux width) is converted. Further, the expansion system and the compression system can be referred to as a conversion system. These are also applied to the later-described embodiments.

The focal length in each cross-section used in calculation of the collimating magnification (HX, HY) is defined as follows.

Each of the first and second lens arrays 403 and 404 has a cylindrical surface on its one surface and a lens array surface on its other surface in FIGS. 22 and 23, but the cylindrical surface and the lens array surface may be combined with each other.

Figure 24:
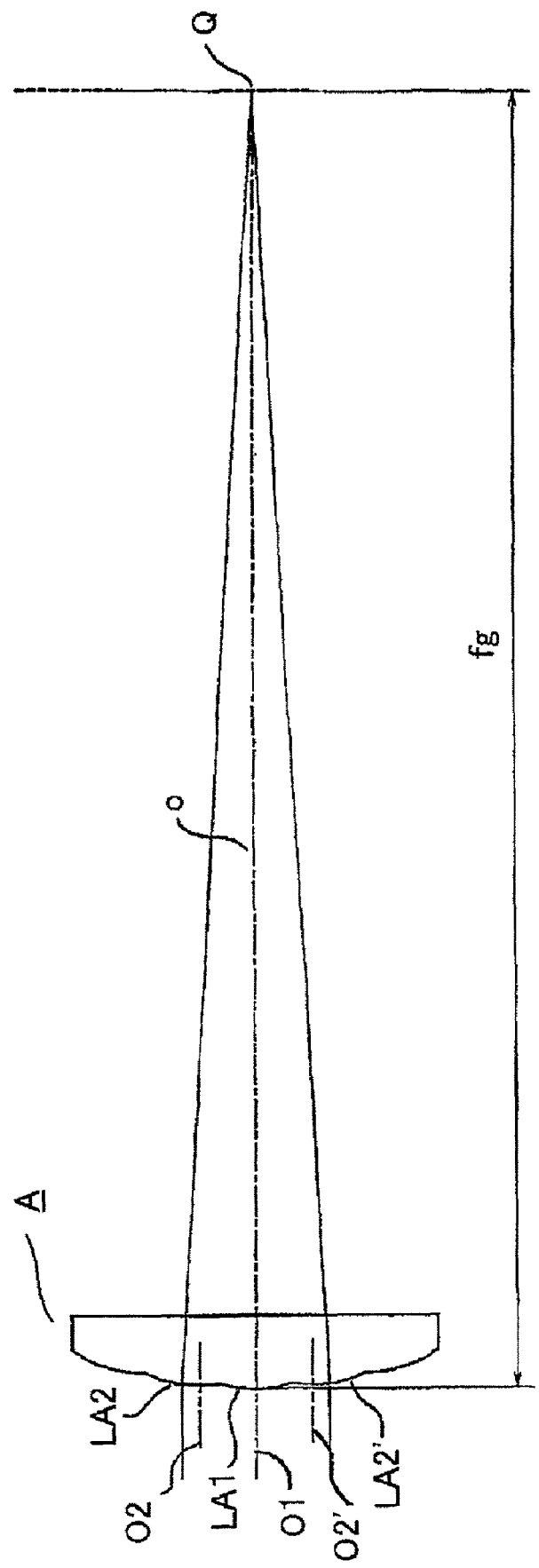
FIG. 24 is an explanatory figure showing part of a modified example of the illumination optical system in FIG. 22.

FIG. 24 shows an example of the combined lens array A. The lens array A has on its one optical surface plural minute lens surfaces (lens cells LA1, LA2 and LA2') each being decentered.

The focal length of the lens array A (or the optical surface) can be defined in calculation on the basis of a collecting point of a light ray passing through the center of the lens cell LA1 and light rays passing through the centers of the lens cells LA2 and LA2'.

When each of the lens cells constituting the lens array A is arranged perpendicular to a reference axis (that is, the optical axis of the illumination optical system) o, a normal to the surface of each lens cell (such as LA1, LA2 and LA2') which is parallel to the reference axis o can be regarded as an optical axis (such as o1, o2 and o2') of each lens cell.

Thus, in FIG. 24, when tracing light rays that pass through the centers (o1, o2, o2') of the lens cells (LA1, LA2, LA2') and are parallel to the reference axis o, the light rays passing through the lens cells LA2 and LA2' are refracted thereby and intersect with the optical axis of the central lens cell LA1 at a predetermined point Q.

The distance fg from the lens surface of the lens cell LA1 to the point Q corresponds to the focal length of the lens array A in each of the first and second cross-sections.

When the lens cells LA2 and LA2' are symmetric with respect to the reference axis o, the light rays passing through the centers of the lens cells LA2 and LA2' intersect with the optical axis of the central lens cell LA1 at one point.

On the other hand, when the lens cells LA2 and LA2' are asymmetric with respect to the reference axis o, the light rays passing through the centers of the lens cells LA2 and LA2' intersect with the optical axis of the central lens cell LA1 at different intersection points. In this case, the focal length of the lens array A may be defined by using the midpoint of the intersection points.

Figure 25:
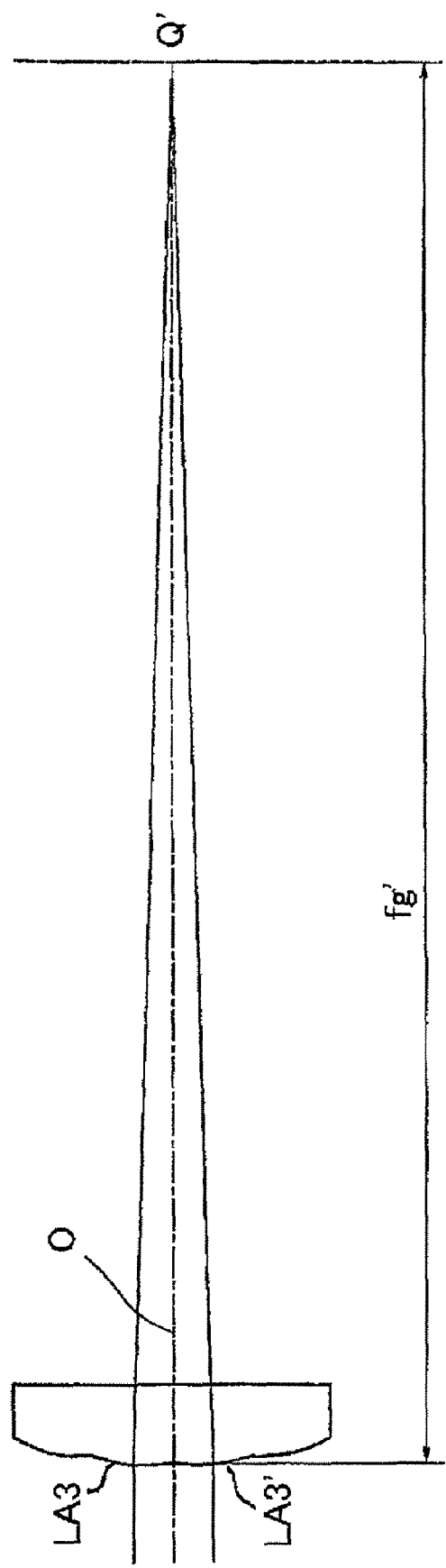
FIG. 25 is an explanatory figure showing part of another modified example of the illumination optical system in FIG. 22.

Further, when no lens cell is provided on the reference axis o as shown in FIG. 25, drawing a similar figure for the lens cells LA3 and LA3' provided in the vicinity of the reference axis o enables to define the focal length fg' based on the intersection point Q' of two light rays passing through the centers of the lens cells LA3 and LA3'.

Figure 26:
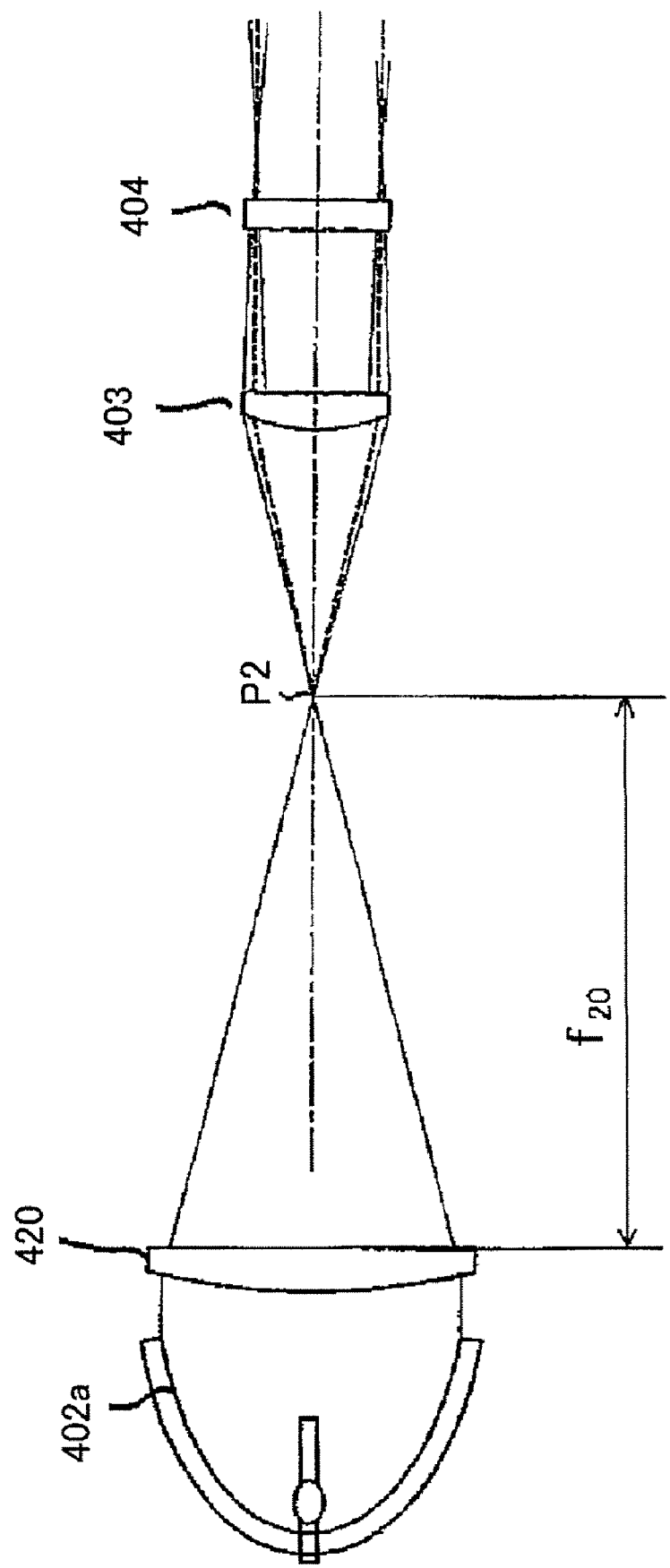
FIG. 26 is an XZ cross-sectional view showing a modified example of the illumination optical system in Embodiment 7.

FIG. 26 shows an example of a luminous flux collector which is constituted by a combination of a parabolic reflector (objective mirror) 402a that is used instead of the elliptic reflector (elliptic mirror) and a positive lens 420. The luminous flux from the light source 401 is reflected by the parabolic reflector 402a to become a parallel luminous flux and then enters the positive lens 420.

When the focal point of the positive lens 420 coincides with the second focal point P2 shown in FIGS. 22 and 23, the luminous flux passing through the positive lens 420 is collected at the second focal point P2. Thereby, similar effects to those described above can be obtained.

In this case, the focal length of the luminous flux collector constituted by the parabolic reflector 402a and the positive lens 420 corresponds to the focal length $f_{2o}$ of positive lens 420.

Figure 27:
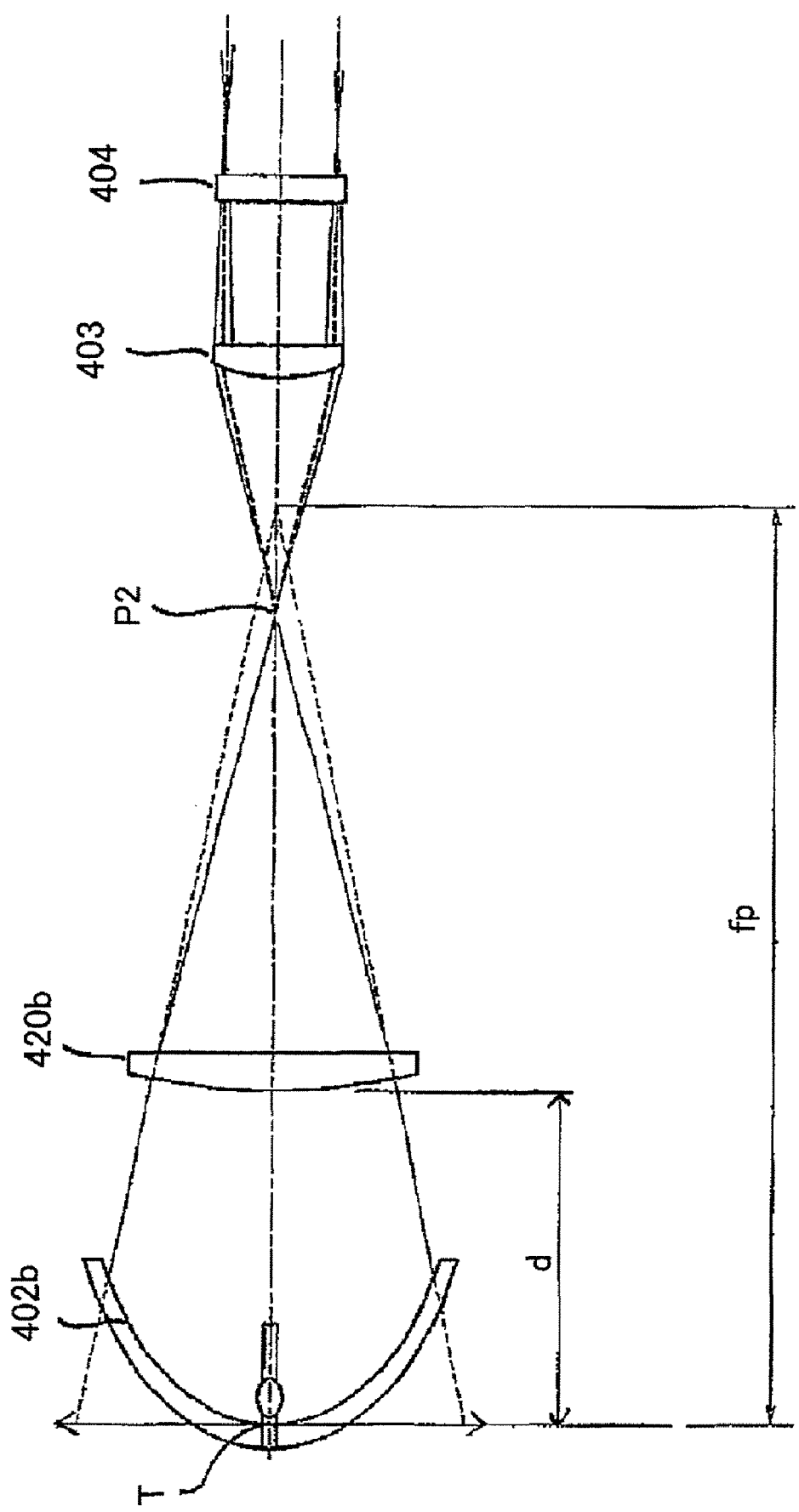
FIG. 27 is an XZ cross-sectional view showing yet another modified example of the illumination optical system in Embodiment 7.

On the other hand, when a luminous flux collector is constituted by a combination of a parabolic reflector 402b and a positive lens 420b as shown in FIG. 27, the focal length of the luminous flux collector may be defined as follows.

In this case, the focal length of the luminous flux collector may be defined by regarding that a lens having a focal length fp is provided at the vertex T1 of the parabolic reflector 402b, and that the positive lens 420b (its focal length is $f_{2o}$) is provided away from the vertex T1 by an air distance d.

Alternatively, the luminous flux collector may be constituted by an elliptic reflector and a collective lens.

Embodiment 8

Figure 28:
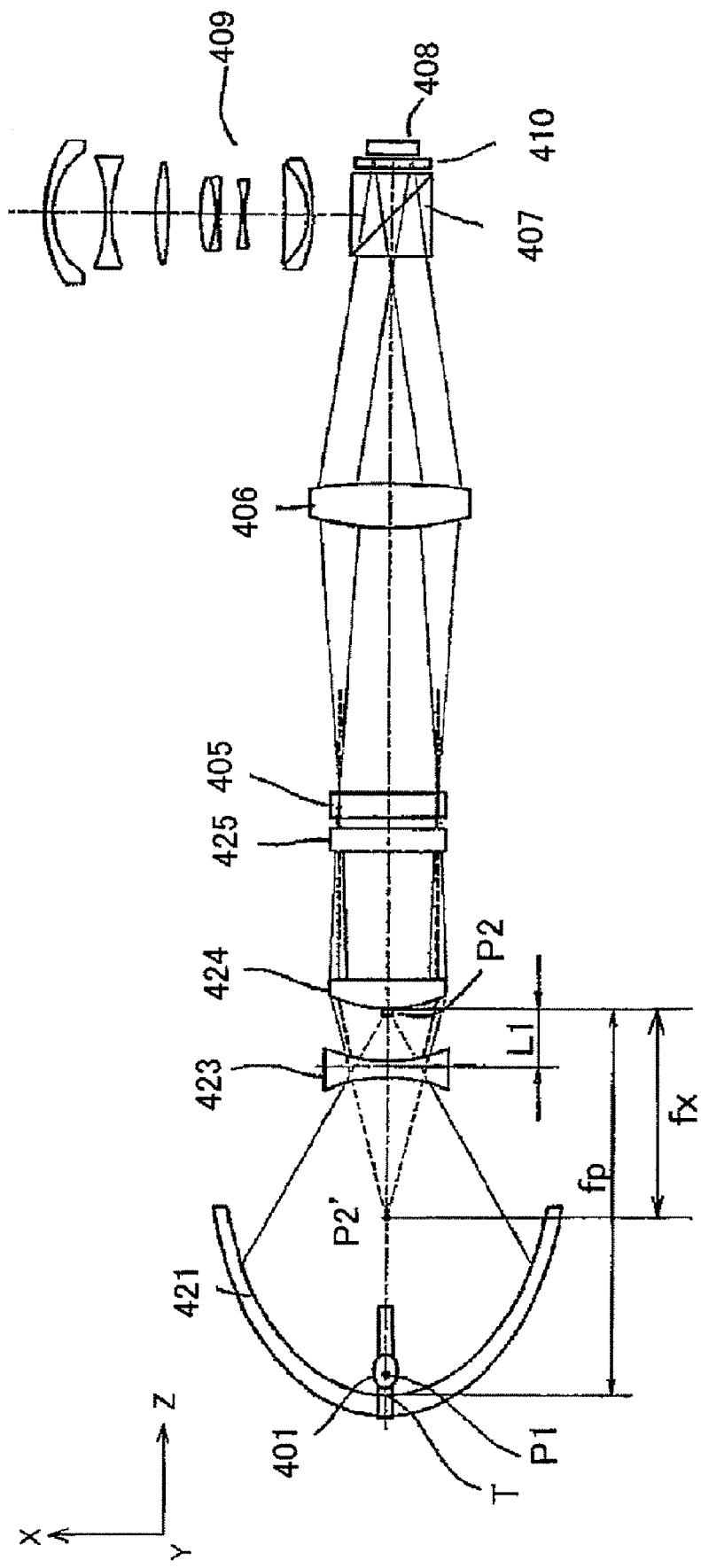
FIG. 28 is an XZ cross-sectional view showing an illumination optical system used in an optical system for image projection that is Embodiment 8 of the present invention.
Figure 29:
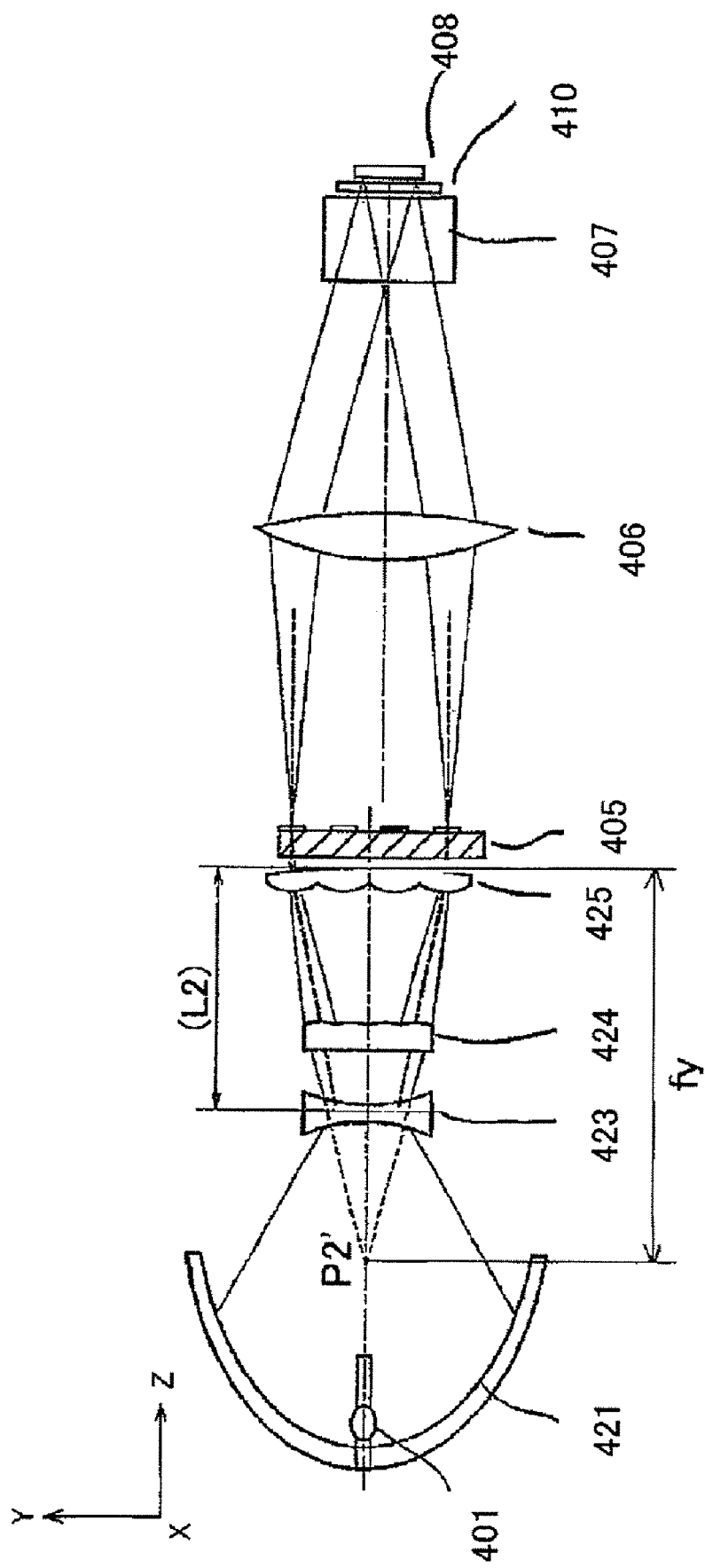
FIG. 29 is a YZ cross-sectional view showing the illumination optical system in Embodiment 8.

FIGS. 28 and 29 show the configuration of a projector using an optical system for image projection that is Embodiment 8 including an illumination optical system. FIG. 28 shows a first cross-section (or an XZ cross-section), and FIG. 29 shows a second cross-section (or a YZ cross-section).

This embodiment is different from Embodiment 7 shown in FIGS. 22 and 23 only in that a negative lens 423 having a rotationally symmetric shape is provided between an elliptic reflector 421 and a first lens array 424, and the other configuration is the same as that of Embodiment 7.

In FIGS. 28 and 29, the members identical to those described in FIGS. 22 and 23 are designated with the same reference numerals.

In these figures, reference numeral 401 shows a light source, 421 an elliptic reflector, 423 a negative lens, 424 a first lens array, and 425 a second lens array. Reference numeral 405 shows a polarization conversion element, 406 a condenser lens, 407 a polarization beam splitter (PBS), 408 a reflective image-forming element, 409 a projection lens, and 410 a phase plate.

In FIGS. 28 and 29, a point P2' at which a virtual image of the light source 401 is formed by the elliptic reflector 421 and the negative lens 423 corresponds to the second focal point P2 in FIGS. 22 and 23.

Therefore, in this embodiment, the point P2' can be basically regarded as the second focal point P2 in FIGS. 22 and 23.

In this embodiment, the light-emitting point of the light source 401 is provided at a first focal point P1 of the elliptic reflector 421, and a luminous flux from the light source 401 is collected at a second focal point P2 of the elliptic reflector 421. The elliptic reflector 421 constitutes a luminous flux collector.

The distance from the vertex T of the elliptic reflector 421 to the second focal point P2 thereof corresponds to the focal length fp of the luminous flux collector.

The negative optical power of the negative lens 423 provided between the elliptic reflector 421 and the second focal point P2 causes the luminous flux to form an image of the second focal point (that is, the object point) P2 at the point P2'. The luminous flux diverges from the point P2'.

An entrance-side surface of the first lens array 424 has a lens array shape having a positive optical power in the first (XZ) cross-section shown in FIG. 28. The entrance-side surface has no step between the lens cells, which is different from the first lens array shown FIG. 26. However, the focal length of the positive lens in the lens array can be calculated in a similar manner to that described by using FIG. 26.

When the focal length of the first lens array 424 obtained from the above shape is fx, the first lens array 424 provided away from the point P2' by a distance of fx collimates the luminous flux in this (XZ) cross-section.

Thus, the negative lens 423 and the first lens array 424 constitute a collimator in the first (XZ) cross-section.

The focal length of the collimator in the first (XZ) cross-section is determined by the focal length f23 of the negative lens 423 and the focal length fx1 of the first lens array 424.

In the first cross-section shown in FIG. 28, when an air conversion distance is defined as L1 from a principal plane position of the negative lens 423 on a lens array side to the surface of the first lens array 424, the synthetic focal length of the negative lens 423 and the first lens array 424 is expressed as:

$$fx=1/(1/f23+1/fx1-L1/f23/f1).$$

An emergence-side surface of the second lens array 425 has a lens array shape having a positive optical power in the second (YZ) cross-section shown in FIG. 29.

When the focal length of the second lens array 425 obtained from the above shape is fy1, the second lens array 425 provided away from the point P2' by an air conversion distance of fy collimates the luminous flux in this second (YZ) cross-section.

Thus, the negative lens 423 and the second lens array 425 constitute a collimator in the second (YZ) cross-section.

The focal length of the collimator in the second (YZ) cross-section is determined by the focal length f23 of the negative lens 423 and the focal length fy1 of each of the first and second lens arrays 424 and 425.

In the second cross-section shown in FIG. 29, when a distance is defined as L2 from a principal plane position of the negative lens 423 on the lens array side to the surface of the second lens array 425, the synthetic focal length of the negative lens 423 and the second lens array 425 is expressed as:

$$fy=1/(1/f23+1/fy1-L2/f23/fy1).$$

In this case, a first collimating magnification HX in the first cross-section shown in FIG. 28 is expressed as:

$$HX=|fx/fp|.$$

Similarly, a second collimating magnification HY in the second cross-section shown in FIG. 29 is expressed as:

$$HY=|fy/fp|.$$

In FIGS. 28 and 29, the second lens array 425 is provided farther from the second focal point P2 than the first lens array 424, so that:

$$|fy|>|fx|,$$

and thus,

HY>HX.

Thereby, the luminous flux from the luminous flux collector is compressed at different compression rates in the first and second cross-sections and thereby converted into a luminous flux having different widths (or diameters) in these cross-sections.

For example, when f23=−50 mm, fx=150 mm, L1=50 mm, fy=200 mm, and L2=100 mm, the fx and fy are as follows:

$$fx=-150\ mm$$

$$fy=-200\ mm.$$

Therefore, $$HX/HY=|fx/fy|=0.75.$$

Modified Example of Embodiment 8

Figure 30:
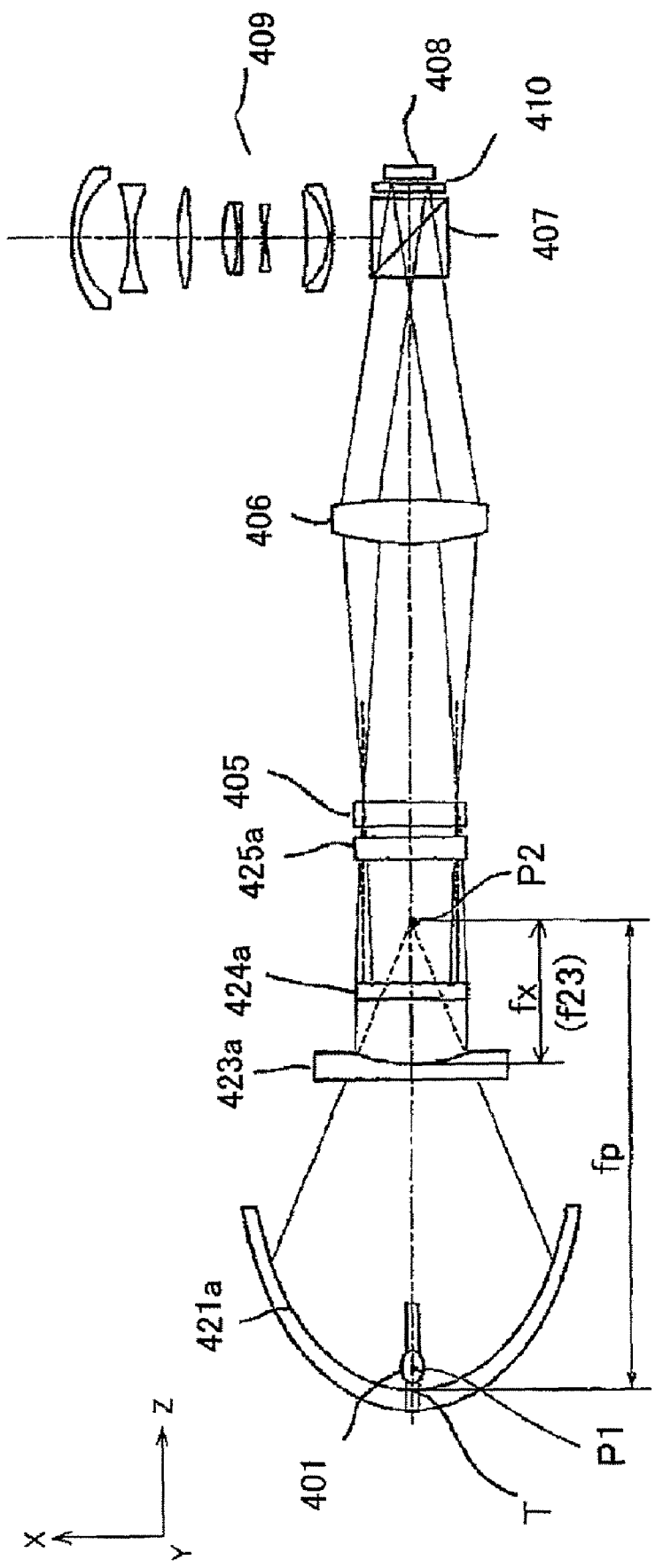
FIG. 30 is an XZ cross-sectional view showing a modified example of the illumination optical system in Embodiment 8.
Figure 31:
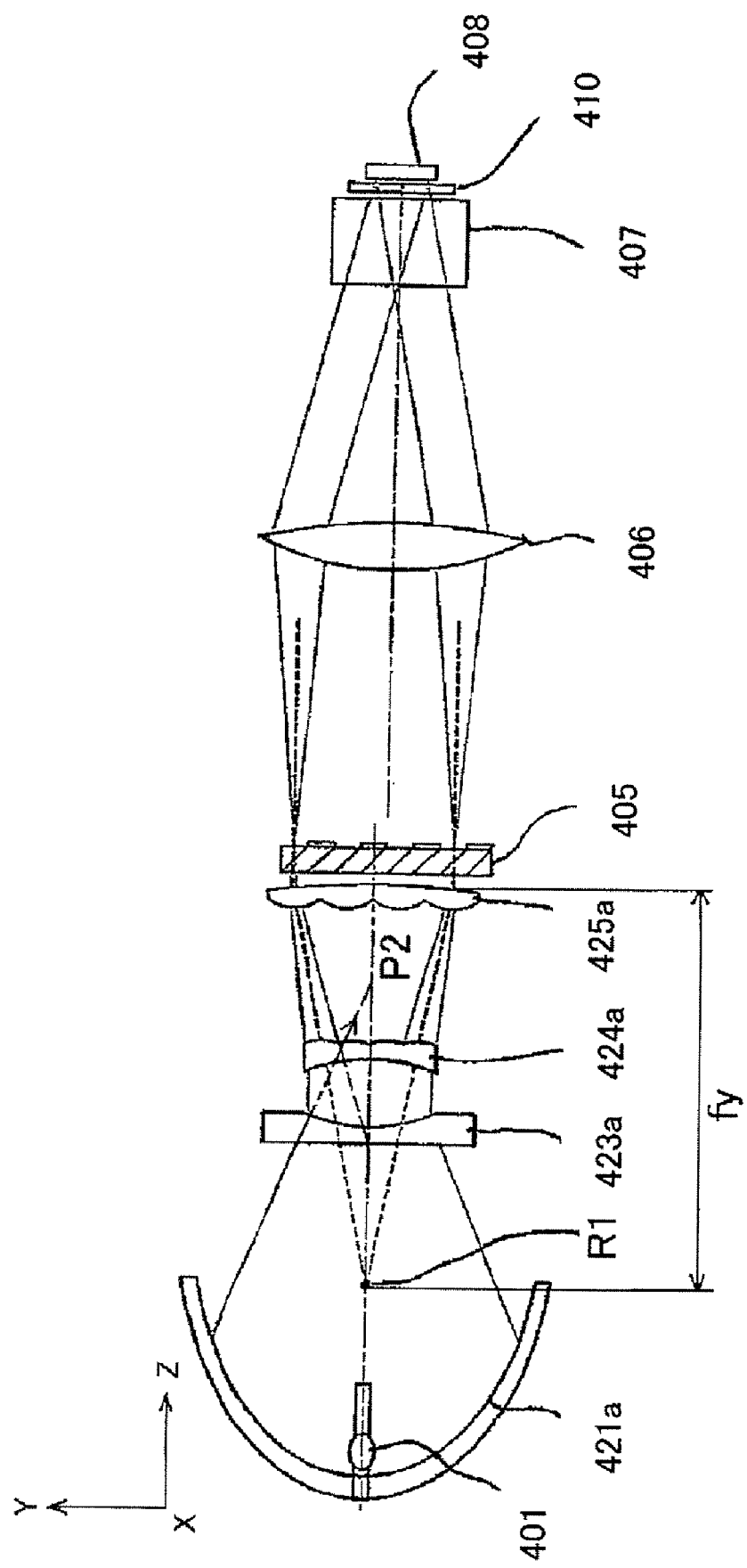
FIG. 31 is an XZ cross-sectional view showing another modified example of the illumination optical system in Embodiment 8.

FIGS. 30 and 31 show a modified example of Embodiment 8 shown in FIGS. 28 and 29.

In these figures, reference numeral 401 shows a light source, 421a an elliptic reflector, 423a a negative lens having a rotationally symmetric shape, 424a a first lens array, and 425a a second lens array. Reference numeral 405 shows a polarization conversion element, 406 a condenser lens, 407 a polarization beam splitter (PBS), 408 a reflective image-forming element, and 409 a projection lens.

In FIG. 30, the light source 401 is provided at a first focal point P1 of the elliptic reflector 421a, and a luminous flux from the light source 401 is collected at a second focal point P2 of the elliptic reflector 421a. The elliptic reflector 421a constitutes a luminous flux collector.

The distance from the vertex T of the elliptic reflector 421a to the second focal point P2 corresponds to the focal length fp of the luminous flux collector.

The negative optical power of the negative lens 423a provided between the elliptic reflector 421a and the second focal point P2 collimates the luminous flux.

In a first cross-section shown in FIG. 30, the first lens array 424a and the second lens array 425a have no optical power. That is, lens cells are uniformly arranged in these lens arrays 424a and 425a. Thus, the negative lens 423a constitutes a collimator in the first (XZ) cross-section.

In the second (YZ) cross-section shown in FIG. 31, the first lens array 424a has a lens array shape having a negative optical power, and the second lens array 425s has a lens array shape having a positive optical power.

When the focal lengths of the first and second lens arrays 424a and 425a obtained from the above shapes are fy1 and fy2, the first and second lens arrays 424a and 425a are provided such that their focal points corresponding to the focal lengths fy1 and fy2 coincide with each other at a point R1. Thereby, the luminous flux is diverged by the first lens array 424a and then collimated again by the second lens array 425a in the second cross-section.

Thus, the negative lens 423a and the first and second lens arrays 424a and 425a constitute a collimator in the second cross-section.

The focal lengths fx and fy of the collimators are determined by the focal length f23 of the negative lens 423a and the focal lengths fy1 and fy2 of the first and second lens arrays 424a and 425a.

In the first cross-section shown in FIG. 30, the focal length fx of the collimator is the same as that of the negative lens 423a, that is, fx=f23.

In the second cross-section shown in FIG. 31, when the focal length of the first lens array 424a is fy1 and that of the second lens array 425a is fy2, the focal length fy of the collimator is obtained from a synthetic focal length of the three optical elements 423a, 424a and 425a as follows:

$$fy=f23\times|fy2/fy1|.$$

In this case, a first collimating magnification HX in the first cross-section shown in FIG. 30 is expressed as:

$$HX=|fx/fp|.$$

Similarly, a second collimating magnification HY in the second cross-section shown in FIG. 31 is expressed as:

$$HY=|fy/fp|.$$

FIG. 31 shows |fy2|>|fy1|, so that:

$$|fy|>|fx|,$$

and thus,

HY>HX.

Thereby, the luminous flux from the luminous flux collector 421a is compressed at different compression rates in the first and second cross-sections and thereby converted into a luminous flux having different widths (or diameters) in these cross-sections.

Embodiment 9

Figure 32:
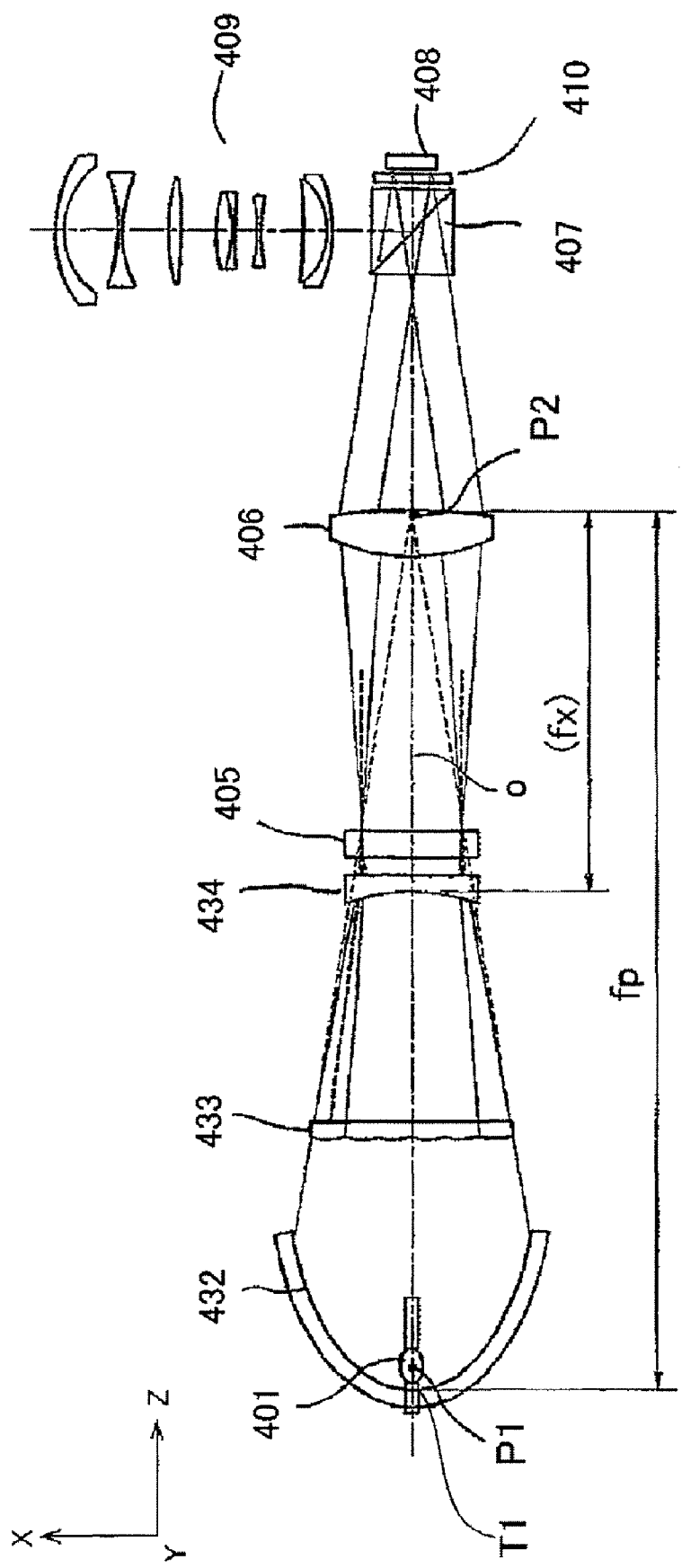
FIG. 32 is an XZ cross-sectional view showing an illumination optical system in an optical system for image projection that is Embodiment 9 of the present invention.
Figure 33:
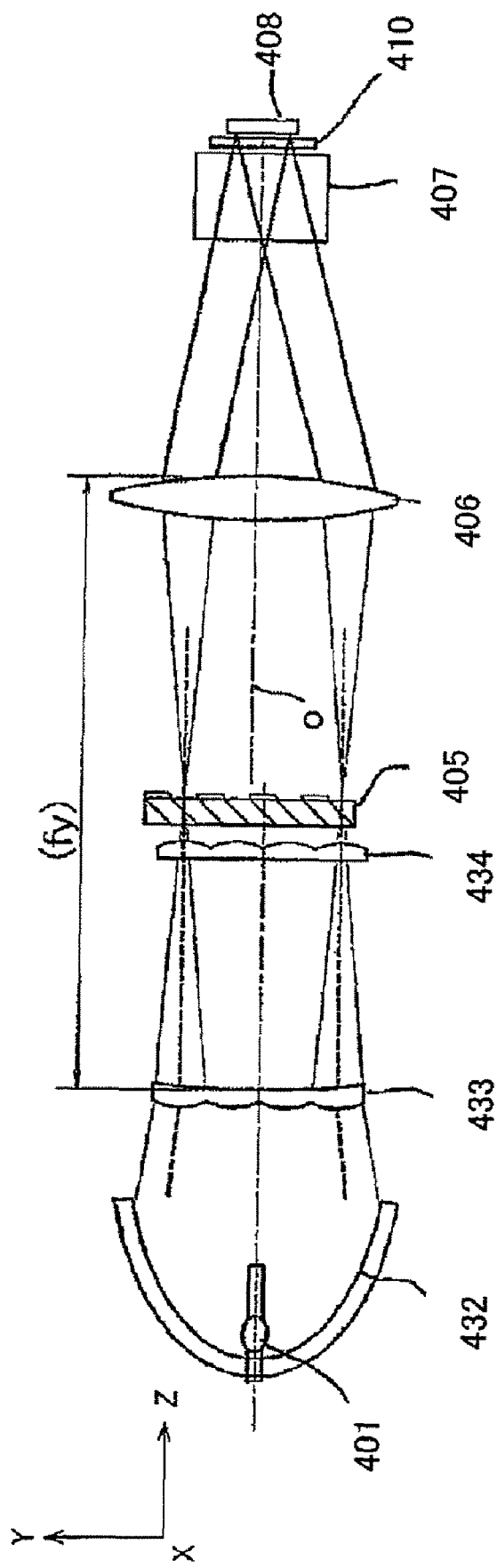
FIG. 33 is a YZ cross-sectional view showing the illumination optical system in Embodiment 9.

FIGS. 32 and 33 show the configuration of a projector using an optical system for image projection that is Embodiment 9 including an illumination optical system. FIG. 32 shows a first cross-section (or an XZ cross-section), and FIG. 33 shows a second cross-section (or a YZ cross-section).

In FIGS. 32 and 33, the members identical to those described in FIGS. 22 and 23 are designated with the same reference numerals.

In these figures, reference numeral 401 shows a light source, 432 an elliptic reflector, 433 a first lens array, and 434 a second lens array. Reference numeral 405 shows a polarization conversion element, 406 a condenser lens, 407 a polarization beam splitter (PBS), 408 a reflective image-forming element, 409 a projection lens, and 410 a phase plate.

A dashed line o shows a reference axis (or an optical axis) of the illumination optical system, which coincides with an axis of rotational symmetry of the elliptic reflector 432 and an optical axis of the condenser lens 406. However, these axes do not necessarily need to coincide with each other.

In this embodiment, the light source 401 is provided at a first focal point P1 of the elliptic reflector 432, and a luminous flux from the light source 401 is collected at a second focal point P2 of the elliptic reflector 432. The elliptic reflector 432 constitutes a luminous flux collector.

The distance from the vertex T of the elliptic reflector 432 to the second focal point P2 thereof corresponds to the focal length fp of the luminous flux collector.

An entrance-side surface of the second lens array 434 has a cylindrical shape having a negative optical power in the first (XZ) cross-section shown in FIG. 32.

When the focal length of the second lens array 434 obtained from the above shape is fx, the second lens array 434 provided away from the second focal point P2 by a distance of fx collimates the luminous flux in this (XZ) cross-section.

Thus, the second lens array 434 constitutes a collimator in the first (XZ) cross-section.

An emergence-side surface of the first lens array 433 has a cylindrical shape having a negative optical power in the second (YZ) cross-section shown in FIG. 33.

When the focal length of the first lens array 433 obtained from the above shape is fy, the first lens array 433 provided away from the second focal point P2 by an air conversion distance of fy collimates the luminous flux in this second cross-section.

Thus, the first lens array 433 constitutes a collimator in the second (YZ) cross-section.

In this case, a first collimating magnification HX in the first cross-section shown in FIG. 32 is expressed as:

$HX=|fx/fp|.$

Similarly, a second collimating magnification HY in the second cross-section shown in FIG. 33 is expressed as:

$HY=|fy/fp|.$

In FIGS. 32 and 33, the first lens array 433 is placed at a position farther from the second focal point P2 than the second lens array 434, so that:

$|fy|>|fx|,$ and thus, $HY>HX.$

When fp=200 mm, fx=90 mm, fy=150 mm, $HX=0.45$ $HY=0.75,$ and $HX/HY=0.6.$

Thereby, the luminous flux from the luminous flux collector is compressed at different compression rates in the first and second cross-sections and thereby converted into a luminous flux having different widths (or diameters) in these cross-sections.

Embodiment 10

Figure 34:
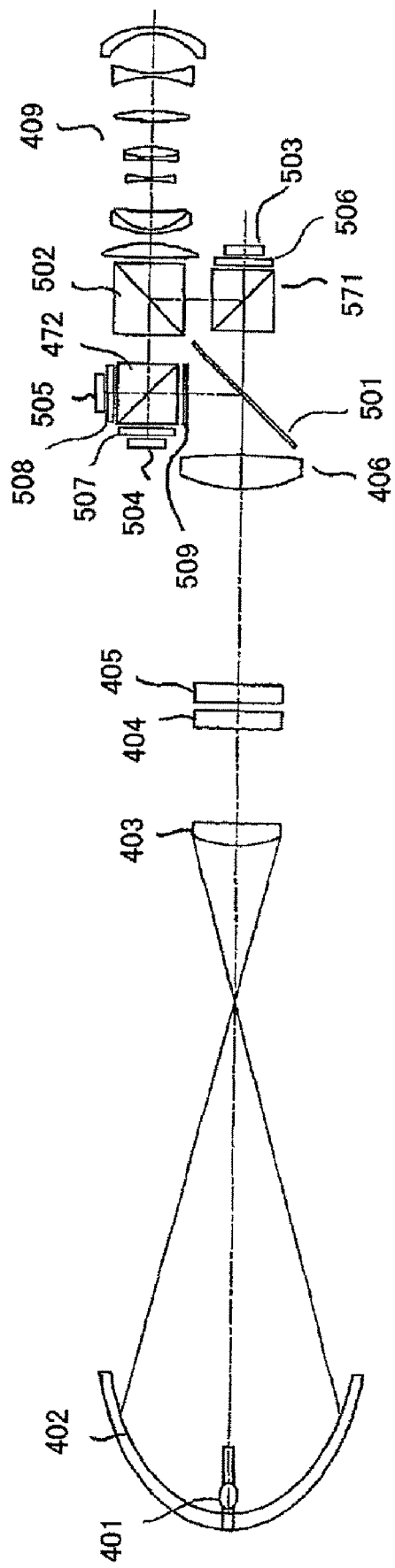
FIG. 34 is a YZ cross-sectional view showing the optical configuration of a liquid crystal projector that is Embodiment 10 of the present invention using one of the optical systems of Embodiments 7 to 9.

FIG. 34 shows a projector using three reflective image-forming elements and one of the illumination optical systems described in Embodiments 7 to 9.

The projector of this embodiment is, as shown in FIG. 34, a three-plate type projector in which a color separation element 501 is provided between polarization beam splitters 471 and 472, and a color combination element 502 is provided between the polarization beam splitters 471, 472 and a projection lens 409.

In FIG. 34, the members identical to those described in FIGS. 22 and 23 are designated with the same reference numerals.

In FIG. 34, reference numerals 503, 504 and 505 show reflective image-forming elements for green (G), red (R) and blue (B). Reference numerals 506, 507 and 508 show half-phase plates for G, R and B. Reference numeral 471 shows a polarization beam splitter for G, and 472 a polarization beam splitter for R and B. Reference numeral 509 shows a color-selective phase plate.

A transmissive image-forming element can be used instead of the reflective image-forming element. In the case of using the transmissive image-forming element, it is preferable that one of two cross-sectional directions perpendicular to each other in which the ratio of the luminous flux width is smaller be applied to a relatively-lower-contrast side of the image-forming element.

In each of Embodiments 7 to 9, it is preferable that the luminous flux collimator be treated as having a constant focus length irrespective of directions in calculation of the compression rate of luminous flux, and an optical system from the reflector to an optical element having a common positive optical power may be regarded as the luminous flux compression system.

Embodiment 11

Figure 35:
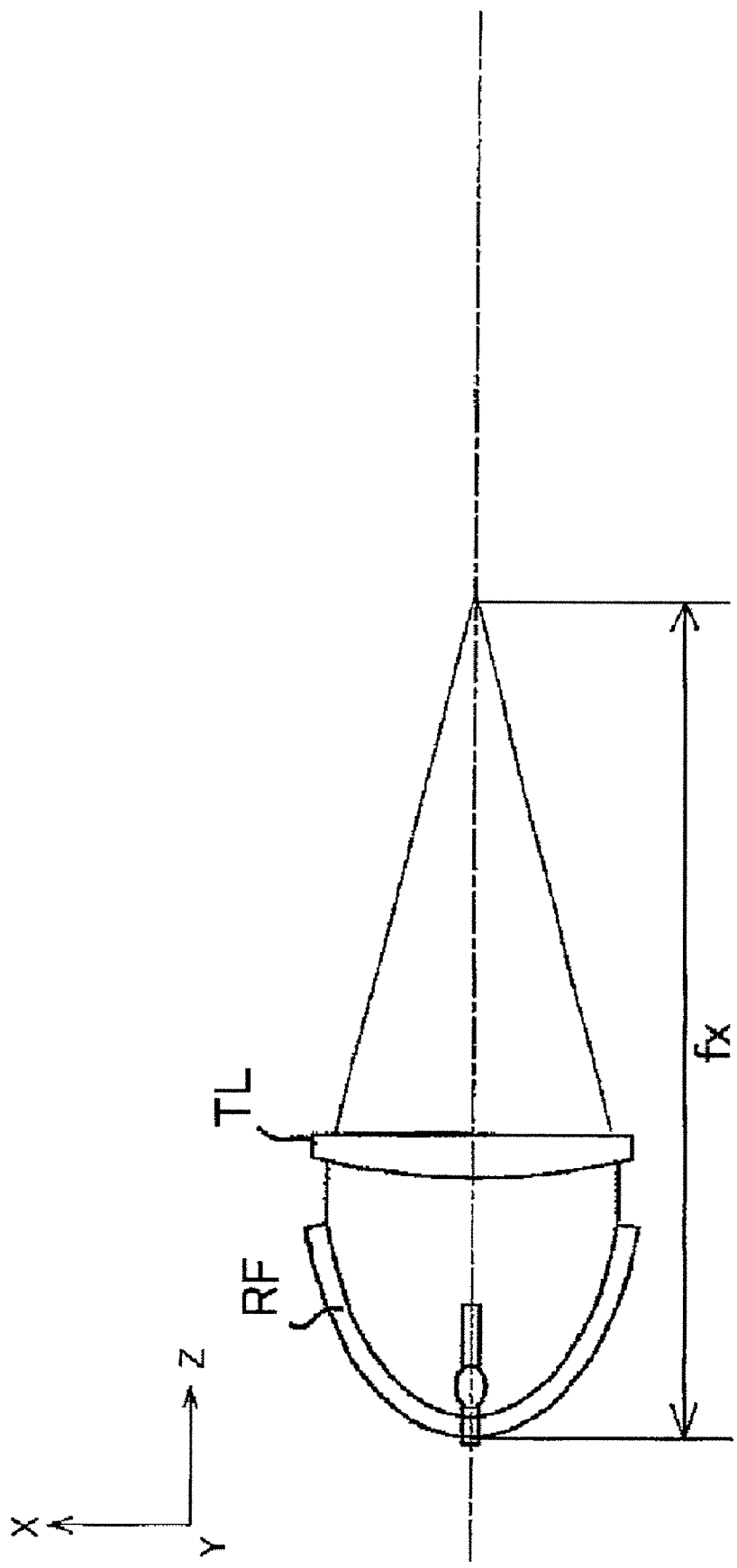
FIGS. 35 and 36 are XZ and YZ cross-sectional views showing part of an optical system for image projection that is Embodiment 11 of the present invention.
Figure 36:
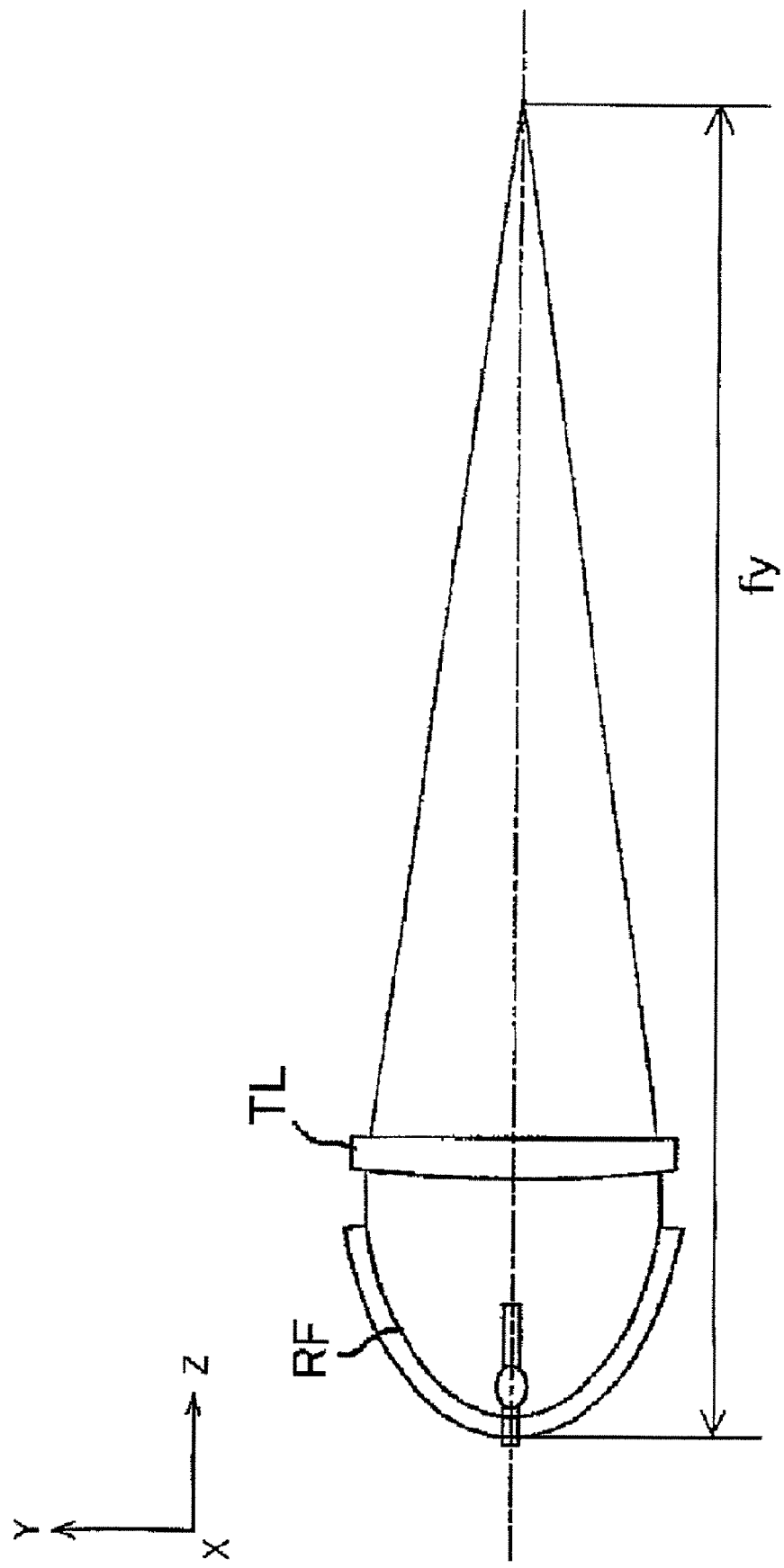

FIGS. 35 and 36 show a case where a luminous flux from a parabolic reflector RF is collected by a toric lens TL having different positive optical powers (fx, fy) in an XZ cross-section and a YZ cross-section.

Figure 37:
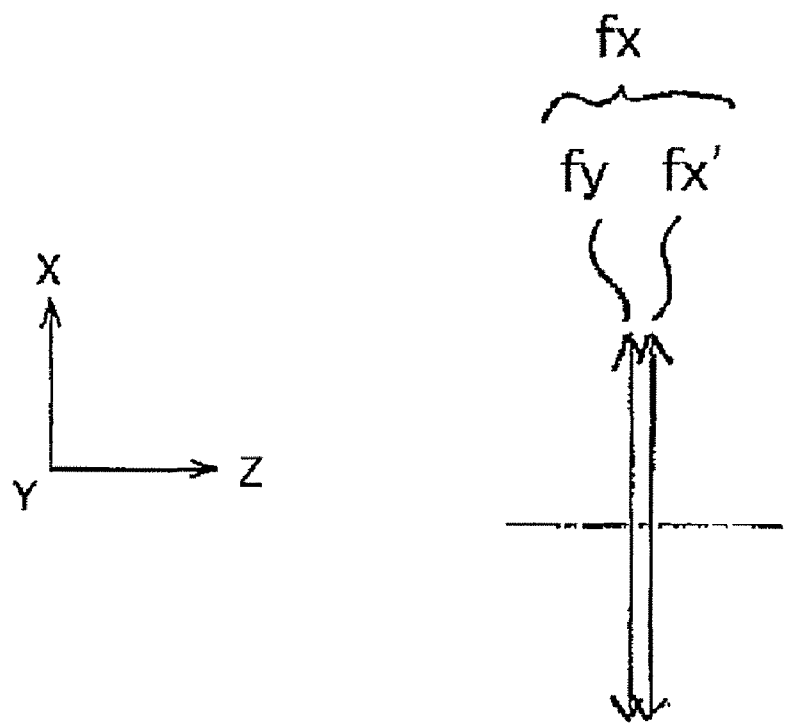
FIGS. 37 and 38 are XZ and YZ cross-sectional views showing a refractive power arrangement of the optical system shown in FIGS. 35 and 36.
Figure 38:
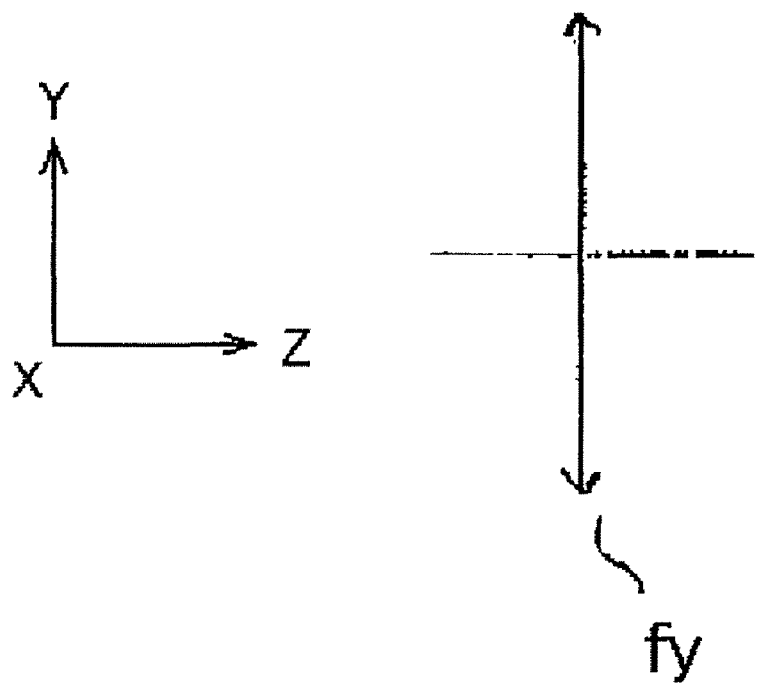

FIGS. 37 and 38 show a refractive power arrangement of the optical system shown in FIGS. 35 and 36.

In the optical system, as shown in FIGS. 37 and 38, it can be regarded as that in the XZ and YZ cross-sections a weak-positive-power side focal length (fy) is used as a common focal length, and in the XZ cross-section shown in FIG. 37 a strong-positive-power side focal length (fx) is formed by arranging a positive lens having a focal length of fy and a positive lens having a focal length fx' with no spacing therebetween.

If a synthetic focal length is calculated by regarding the focal length fx' as part of the collimator, the conditions in each of the above-described embodiments can be applied to this case.

When using a high-intensity light source, the reflector cannot be reduced in size due to heat problems. Therefore, narrowing the luminous flux width is effective to increase light use efficiency when, for example, using a lamp with an intensity higher than 30 Watts and a small image-forming element with a diagonal size of 1 inch or less. In this case, it is preferable that the collimating magnification HY satisfy the following condition:

$$HY<1.$$

According to each of the above-described embodiments, an optical system and an image projection apparatus including the same can be achieved which projects a bright image with a high contrast.

Embodiment 12

Figure 40:
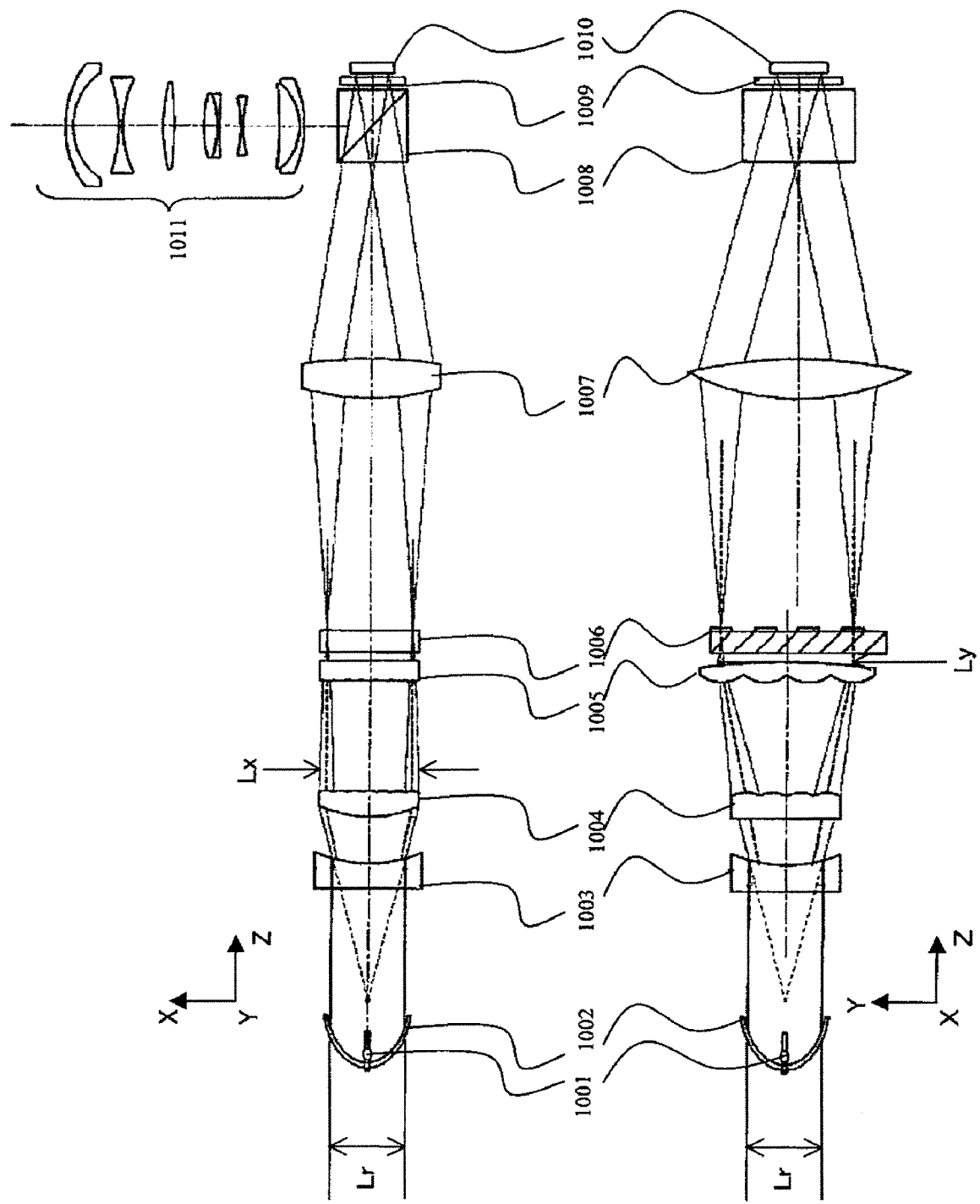
FIGS. 40A and 40B are XZ and YZ cross-sectional views showing an optical system for image projection that is Embodiment 12 of the present invention.

FIGS. 40A and 40B show an optical system for image projection that is Embodiment 12 of the present invention. This embodiment shows a configuration in which the diameter (or the width) of a luminous flux from a light source or a reflector is expanded. Such a configuration is particularly effective to a case where the outer diameter of the light source or reflector is small.

Although a high-pressure mercury lamp may be used as the light source in this embodiment, a small light source such as a xenon lamp and a laser light source is particularly suitable for this embodiment. Specifically, this embodiment is suitable for a case where the outer diameter of the reflector or the size of a laser oscillation area of the laser light source is smaller than the size of an effective area (or an image display area) of an image-forming element. Furthermore, this embodiment is particularly suitable for a case where the outer diameter of the reflector or the size of the laser oscillation area is equal to or smaller than a half of the effective area size of the image-forming element.

FIG. 40A shows an XZ cross-section parallel to the short side of a liquid crystal panel (or an image display element or an image-forming element), the XZ cross-section being a cross-section in which an expansion rate (or a conversion rate) of luminous flux is smaller than that in the later-described YZ cross-section. FIG. 40B shows the YZ cross-section parallel to the long side of the liquid crystal panel and is a cross-section in which the expansion rate (or the conversion rate) of luminous flux is larger than that in the XZ cross-section.

Reference numeral 1001 shows a light source (or a light-emitting point) which emits a luminous flux radially. Reference numeral 1002 shows a parabolic reflector (parabolic mirror) which converts the luminous flux emitted from the light source 1001 into a parallel luminous flux. Reference numeral 1003 shows a concave lens (or a first optical element) which converts the luminous flux from the parabolic reflector 1002 into a diverging luminous flux. An elliptic reflector can be used instead of the parabolic reflector 1002, and the positional relationship between the light source 1001 and the reflector 1002 can be set such that the luminous flux reflected by the reflector 1002 becomes a diverging luminous flux.

In the XZ cross-section shown in FIG. 40A, reference numeral 1004 shows a first lens array which is constituted by plural minute lens cells (or plural minute cylindrical lens cells). The first lens array 1004 collimates the diverging luminous flux (that is, converts the diverging luminous flux into a parallel luminous flux) and divides it into plural luminous fluxes. Reference numeral 1005 shows a second lens array which is constituted by plural minute lens cells and introduces the plural divided luminous fluxes to a subsequent polarization conversion element array 1006.

Reference numeral 1007 shows a condenser lens, 1008 a polarization beam splitter, 1009 a quarter-phase plate, 1010 a liquid crystal panel, and 1011 a projection lens. The functions of these elements are the same as those in the above-described embodiments, so that their descriptions are omitted.

In the YZ cross-section shown in FIG. 40B, reference numeral 1004 shows the first lens array which is constituted by plural minute lens cells and causes the diverging luminous flux to emerge without change. That is, the first lens array 1004 has no collimating effect on the luminous flux. The first lens array 1004 divides the diverging luminous flux into plural luminous fluxes.

Reference numeral 1005 shows the second lens array which is constituted by plural minute lens cells. The second lens array 1005 collimates the diverging luminous flux (that is, converts the diverging luminous flux into a parallel luminous flux) and introduces it to the subsequent polarization conversion element array 1006. Reference numerals 1007 to 1011 show the same elements in the XZ cross-section shown in FIG. 40A, so that their descriptions are omitted.

Also in this embodiment, the angular distribution of the luminous flux entering the panel surface of the liquid crystal panel 1010 in the YZ cross-section (or the second cross-section) shown in FIG. 40B which is parallel to the long side of the liquid crystal panel 1010 is larger than that in the XZ cross-section (or the first cross-section) shown in FIG. 40A which is parallel to the short side of the liquid crystal panel 1010.

This embodiment is provided with collimators (or second and third optical elements) 1004 and 1005, in other words, expansion systems between the light source 1001 and the polarization beam splitter 1008, the collimators respectively expanding the luminous flux in the first (XZ) and second (YZ) cross-sections perpendicular to each other in the illumination optical system. An expansion rate (or a collimating magnification) that is obtained by the collimator 1004 in the first cross-section and an expansion rate that is obtained by the collimator 1005 in the second cross-section are different from each other.

The expansion of luminous flux is an optical action that increases the diameter (in other words, the width) of the luminous flux by the luminous flux diverger (or the concave lens) 1003 and then collimates the luminous flux by the collimator 1004 or 1005.

The expansion rate is defined as a ratio L/Lr of the luminous flux diameter L (Lx in the XZ cross-section and Ly in the YZ cross-section) at the position immediately after emerging from the collimator 1004 or 1005 to the luminous flux diameter Lr before being expanded by the luminous flux diverger 1003.

When the expansion rate in the first cross-section is $\alpha$ and the expansion rate in the second cross-section is $\beta$, $$\alpha = Lx/Lr$$

$$\beta = Ly/Lr,$$

wherein, $$\alpha \neq \beta$$

$$\alpha < 1, \beta < 1$$

$$\alpha/\beta < 1.$$

That is, the expansion rate a in the first cross-section shown in FIG. 40A is smaller than the expansion rate $\beta$ in the second cross-section shown in FIG. 40B.

For example when Lr=30 mm, Lx=12 mm and Ly=18 mm, $$\alpha = 0.4$$

$$\beta = 0.6$$

α/β=0.67.

Embodiment 13

Figure 41:
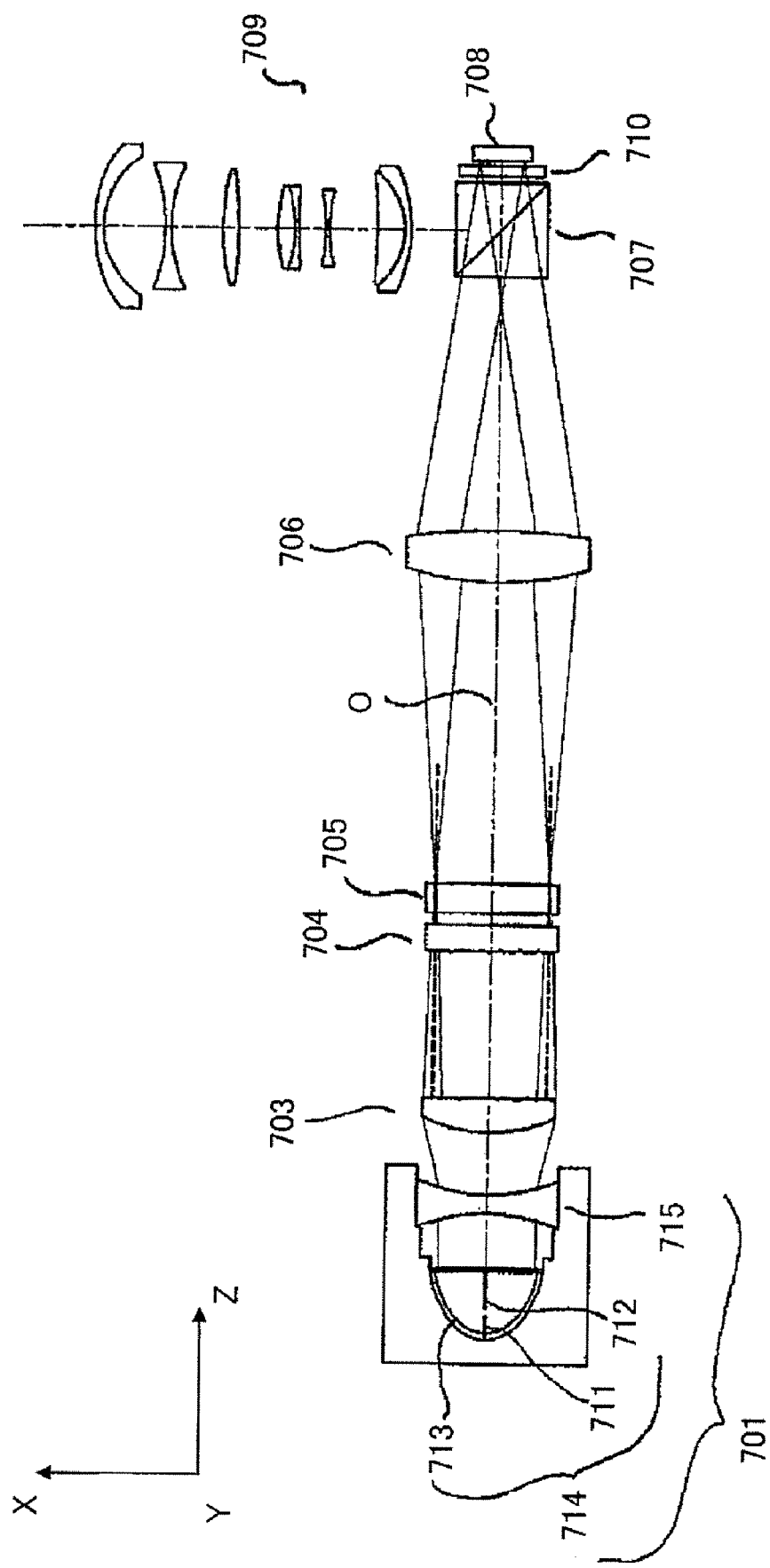
FIGS. 41 and 42 are XY and YZ cross-sectional views showing the optical configuration of a liquid crystal projector that is Embodiment 13 of the present invention.
Figure 42:
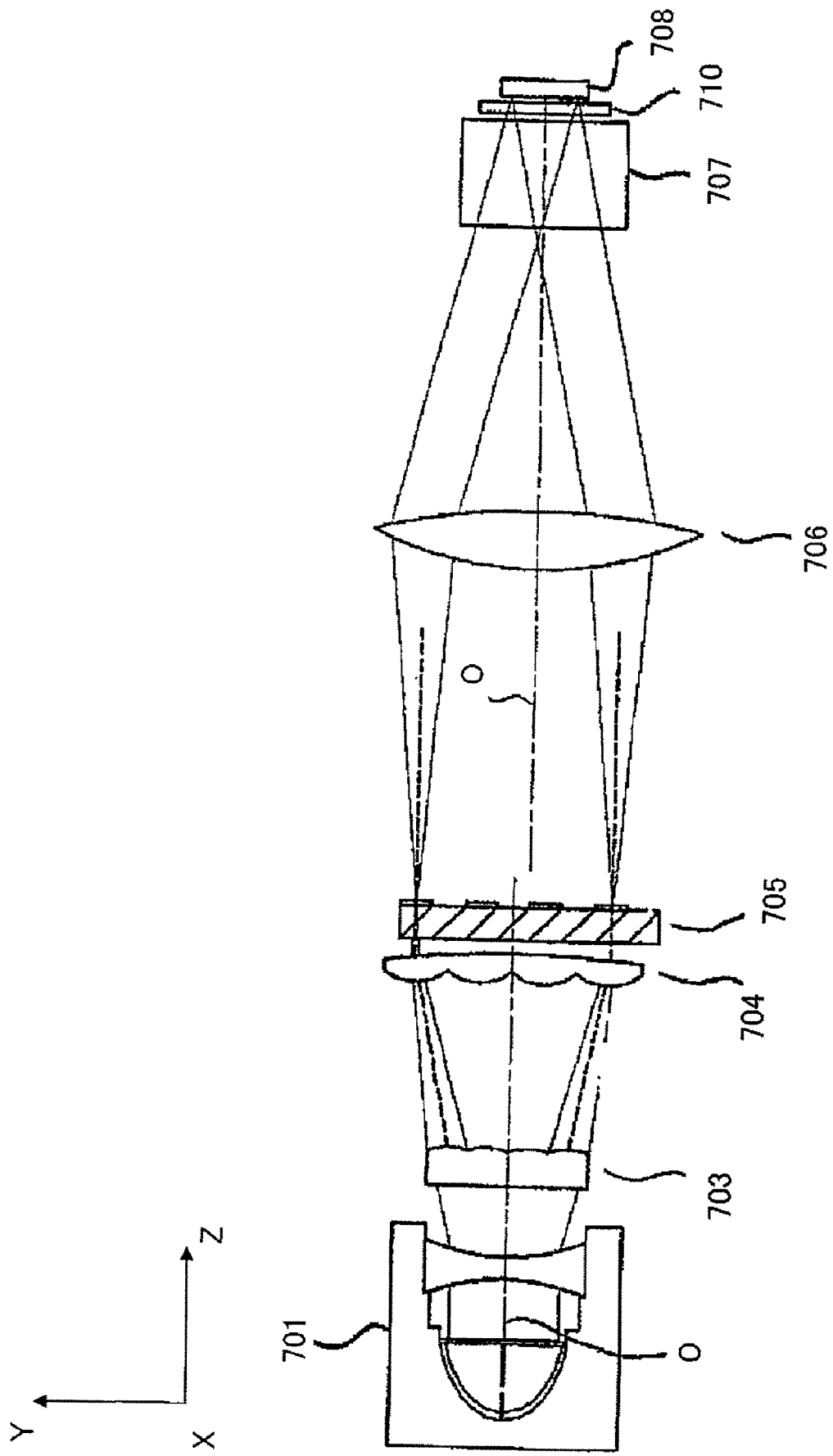

FIGS. 41 and 42 show an XZ cross-section and a YZ cross-section of an optical system for image projection that is Embodiment 13 including an illumination optical system.

In these figures, reference numeral 701 shows a light source unit, 703 a first lens array, and 704 a second lens array. Reference numeral 705 shows a polarization conversion element, 706 a condenser lens, 707 a polarization beam splitter (PBS), 708 a reflective liquid crystal panel (or a reflective image-forming element), 709 a projection lens, and 710 a phase plate.

The light source unit 701 is constituted by a light source portion 714 capable of emitting light with high intensity and a concave lens 715 provided on a light-emergence side of the light source unit 701. The light source portion 714 includes a light-emitting element in which light-emitting electrodes 711 and 712 are formed integrally with a parabolic reflector 713, such as a xenon lamp. A luminous flux emitted from the light source portion 714 is converted into a diverging luminous flux by the concave lens 715.

A dashed line o shows a reference axis (or an optical axis) of the illumination optical system, which coincides with an axis of rotational symmetry of the parabolic reflector 713 and an optical axis of the condenser lens 706. However, these axes do not necessarily need to coincide with each other.

The first lens array 703 has on its entrance side a cylindrical shape having a positive optical power in the XZ cross-section shown in FIG. 41.

When the focal length obtained from the above shape is fx, providing a focal point of the shape substantially at a focal point of the concave lens 715 collimates the luminous flux in this (XZ) cross-section.

Light rays shown by heavy dotted lines in FIG. 41 pass through the center of each lens array and are collimated. Thin solid lines shown from the first lens array 703 show that plural luminous fluxes divided by the first lens array 703 are superposed on the reflective liquid crystal panel 708. That is, the first lens array 703 is a collimator in the XZ cross-section.

The second lens array 704 has on its emergence side a cylindrical shape having a positive optical power in the YZ cross-section shown in FIG. 42.

When the focal length obtained from the above shape is fy, providing a focal point of the shape substantially at a focal point of the concave lens 715 collimates the luminous flux in this (YZ) cross-section. That is, the second lens array 704 is a collimator in the YZ cross-section.

According to FIGS. 41 and 42, the second lens array 704 is provided at position farther from the concave lens 715 than the first lens array 703, so that fx and fy have the following relationship:

$|fy|<|fx|.$

Therefore, the luminous flux from the parabolic reflector 713 as a luminous flux collector is converted into a luminous flux having different widths (or diameters) in the XZ and YZ cross-sections.

In this embodiment, the polarization conversion element 705 is configured such that the plural polarization conversion element portions are arrayed in a direction of the second cross-section in which the luminous flux width is wider. The polarization beam splitter 707 is configured such that the polarization beam splitting surface folds the luminous flux in a direction of the first cross-section in which the luminous flux width is narrower. This enables to improve contrast without a reduction of brightness.

Although FIGS. 41 and 42 shows the case where each of the first and second lens arrays 403 and 404 has a cylindrical shape on its one surface and a lens array shape on its other surface in FIGS. 41 and 42, the cylindrical shape and the lens array shape may be provided integrally with each other on the same surface.

Embodiment 14

Figure 43:
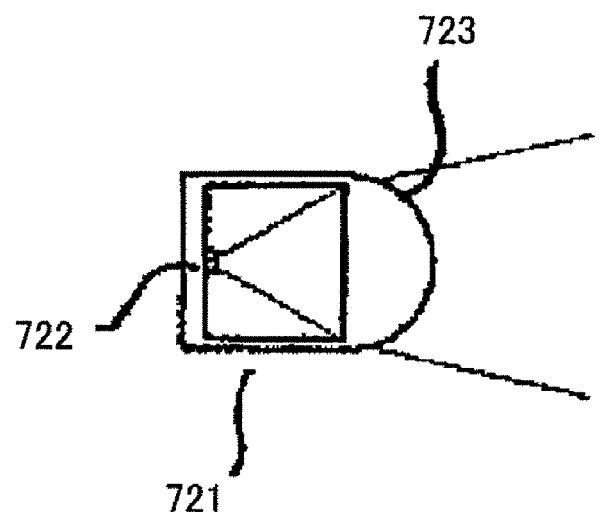
FIG. 43 is a sectional view showing a light source unit used in a projector that is Embodiment 14 of the present invention.

FIG. 43 shows a light source unit used for an illumination optical system in an optical system for image projection that is Embodiment 14.

The light source unit 721 has a configuration in which diverging light radiated from a light source 722 mounted on a chip such as an LED chip or an LD (laser diode) chip is converted into a luminous flux having a small divergent angle by a convex lens 723 and causes it to emerge therefrom. In FIG. 43, the emerging light is shown by thin solid lines.

Figure 44:
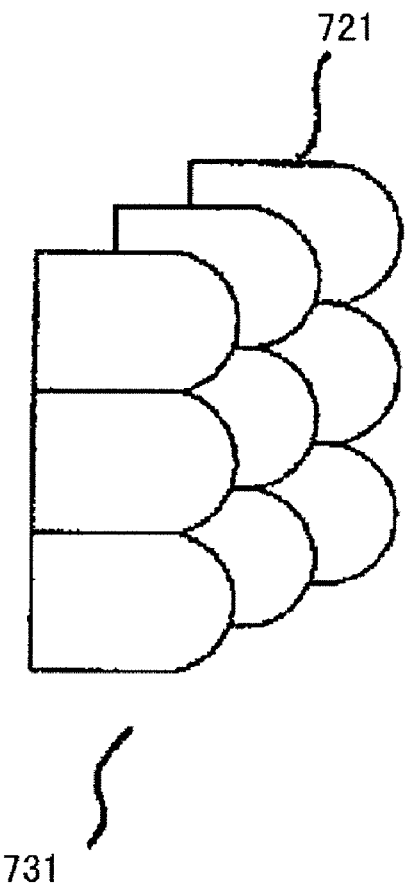
FIG. 44 is a figure showing a light source unit including a plurality of the light source unit shown in FIG. 43.

When using only one light source 721, the amount of light may be insufficient, so that it is preferable to use a light source unit 731 in which a plurality of the light source units 721 are arranged as shown in FIG. 44.

Figure 45:
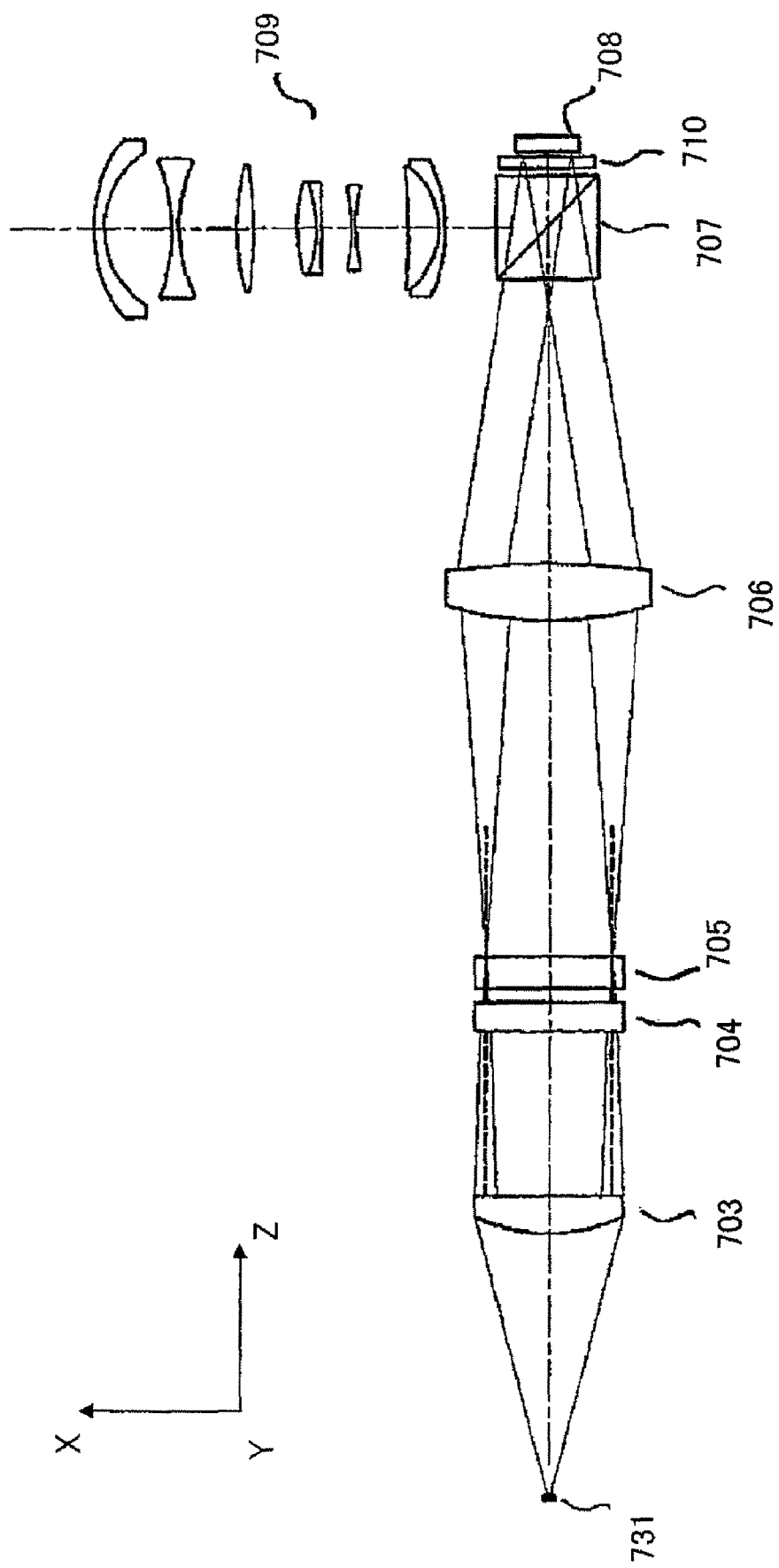
FIGS. 45 and 46 are XY and YZ cross-sectional views showing the optical configuration of a liquid crystal projector that is Embodiment 15 of the present invention.
Figure 46:
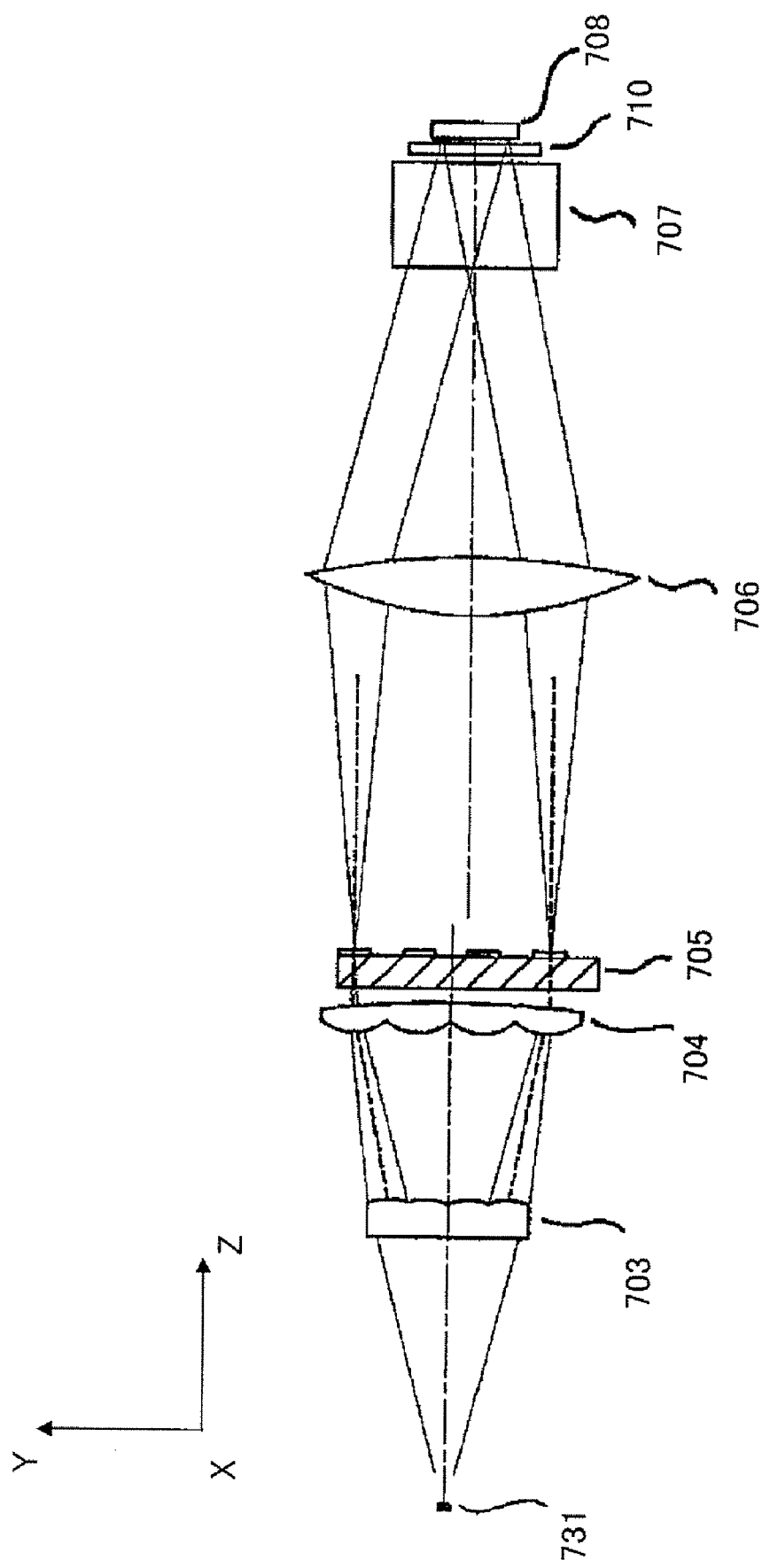

FIGS. 45 and 46 show an XZ cross-section and a yz cross-section of an optical system for image projection including an illumination optical system using the light source unit 731 shown FIG. 44. In FIGS. 45 and 46, the members identical to those described in Embodiment 13 are designated with the same reference numerals, and description thereof is omitted.

As a light source for the optical system of this embodiment, a discharge tube having no electrode may be used.

Embodiment 15

Figure 47:
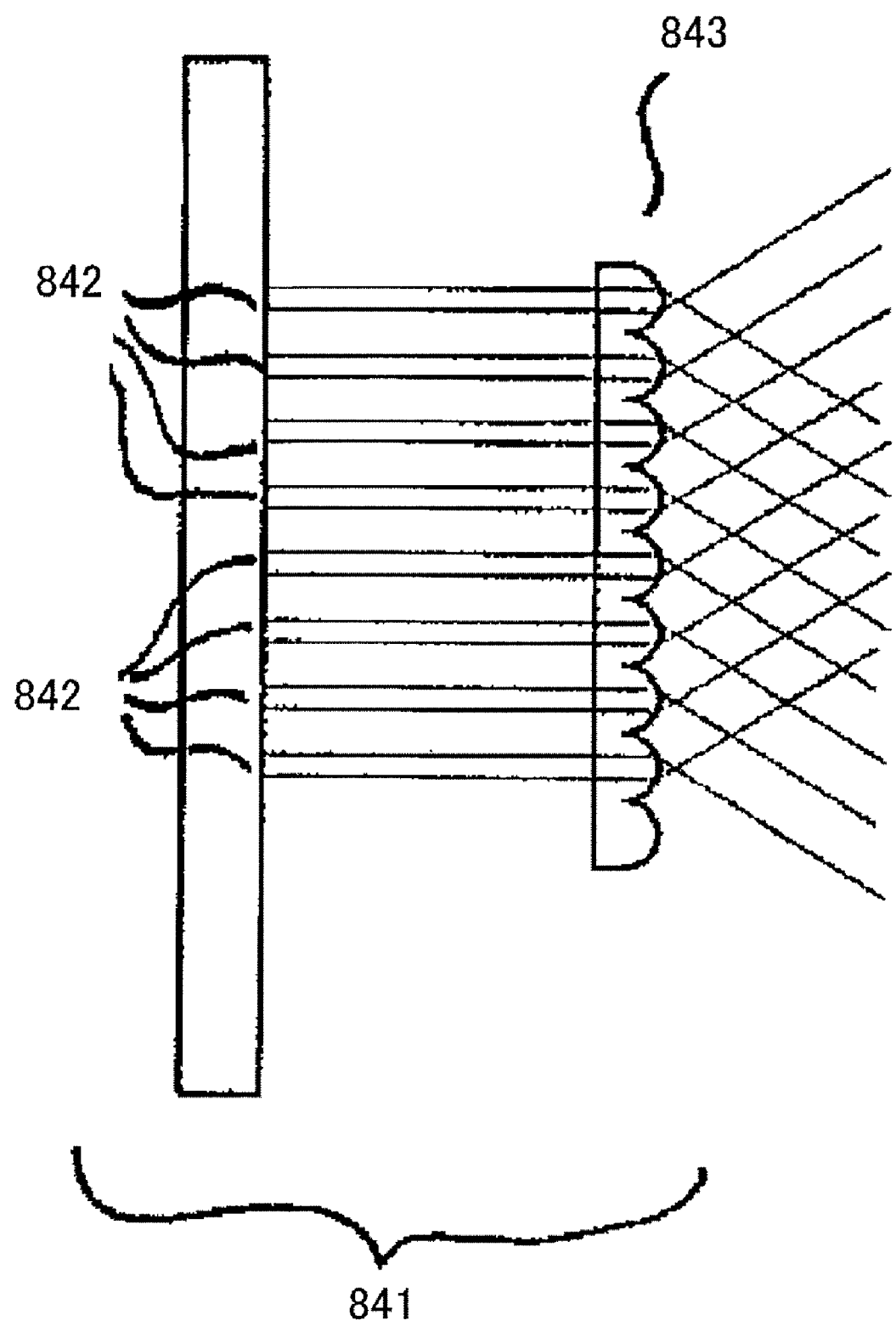
FIG. 47 is a sectional view showing another light source unit used in the projector of Embodiment 15.

FIG. 47 shows another light source unit used for an illumination optical system in an optical system for image projection that is Embodiment 15.

In this embodiment, parallel luminous fluxes from plural light sources 842 are respectively converged once by a lens array 843 having plural lens cells corresponding to the plural light sources 842 and then introduced to the illumination optical system, not shown, as diverging luminous fluxes. The luminous fluxes are shown by thin solid lines.

Furthermore, the present invention is not limited to these preferred embodiments and various variations and modifications may be made without departing from the scope of the present invention.

This application claims foreign priority benefits based on Japanese Patent Applications Nos. 2006-160000, filed on Jun. 8, 2006, 2007-120515, filed on May 1, 2007, and 2007-150814, filed on Jun. 6, 2007, and each of which is hereby incorporated by reference herein in its entirety as if fully set forth herein.

What is claimed is:

1. An illumination optical system which introduces a luminous flux emitted from a light source to an image-forming element, said illumination optical system comprising:
a optical surface having a light splitting function,
wherein said illumination optical system further comprises, in order from a light source side, a first optical lens having positive optical powers in a first cross-section and a second cross-section perpendicular to each other, a second optical element having a first negative optical power in the second cross-section, and a third optical element having a second negative optical power that is different from the first negative optical power in the first cross-sections;

wherein the first cross-section is parallel to a normal to the optical surface and a normal to an entrance surface of the image-forming element, and the second cross-section is perpendicular to the first cross-section and is parallel to the normal to the entrance surface of the image-forming element, and wherein a diameter of the luminous flux emerging from the third optical element in the first cross-section is smaller than a diameter of the luminous flux emerging from the second optical element in the second cross-section.

2. An image projection apparatus comprising an illumination optical system according to claim 1.

3. An illumination optical system according to claim 1, wherein, in the first cross-section, a luminous flux converged by the first optical element is collimated by the third optical element.

4. An illumination optical system according to claim 1, wherein the second optical element is a first lens array or a first cylindrical lens, and wherein the third optical element is a second lens array or a second cylindrical lens.

* * * * *